US011259074B2

(12) United States Patent
Uchimura

(10) Patent No.: US 11,259,074 B2
(45) Date of Patent: Feb. 22, 2022

(54) INFORMATION PROCESSING DEVICE, AND INFORMATION PROCESSING METHOD, AND PROGRAM

(71) Applicant: SONY CORPORATION, Tokyo (JP)

(72) Inventor: Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 489 days.

(21) Appl. No.: 16/323,318

(22) PCT Filed: Aug. 7, 2017

(86) PCT No.: PCT/JP2017/028554
§ 371 (c)(1),
(2) Date: Feb. 5, 2019

(87) PCT Pub. No.: WO2018/047558
PCT Pub. Date: Mar. 15, 2018

(65) Prior Publication Data

US 2021/0289254 A1 Sep. 16, 2021

(30) Foreign Application Priority Data

Sep. 8, 2016 (JP) ............................ JP2016-175899

(51) Int. Cl.
*H04N 21/434* (2011.01)
*H04N 21/2343* (2011.01)
*H04N 21/236* (2011.01)
*H04N 21/262* (2011.01)

(52) U.S. Cl.
CPC .................. *H04N 21/4345* (2013.01); *H04N 21/23605* (2013.01); *H04N 21/234309* (2013.01); *H04N 21/26258* (2013.01)

(58) Field of Classification Search
CPC ......... H04N 21/4345; H04N 21/26258; H04N 21/23605; H04N 21/234309
See application file for complete search history.

(56) References Cited

U.S. PATENT DOCUMENTS 9,710,473 B2 * 7/2017 Macaulay .......... G06F 16/4387
2008/0130885 A1 6/2008 Yamamoto et al.
2009/0074079 A1 * 3/2009 Lee ...................... H04L 1/0047 375/240.25
2010/0086285 A1 * 4/2010 Sasaki ................ H04N 9/8227 386/212

(Continued)

FOREIGN PATENT DOCUMENTS

EP 1887796 A1 2/2008
JP 2011-023071 A 2/2011

(Continued)

*Primary Examiner* — Fernando Alcon
(74) *Attorney, Agent, or Firm* — Paratus Law Group, PLLC

(57) ABSTRACT

A configuration capable of recording MMT format data in a medium as BDAV or SPAV format data and enabling the MMT format data to be reproduced is realized. MMT format data input via a broadcast wave or the like is input, and record data according to a BDAV format or an SPAV format is generated. A data processing unit generates an MMT format stream file storing the MMT format data as reproduction data and further generates a playlist file storing reproduction control information of the MMT format stream file and a clip information file.

20 Claims, 53 Drawing Sheets

(56) References Cited

U.S. PATENT DOCUMENTS

| | | | | |
|---|---|---|---|---|
| 2012/0036277 | A1* | 2/2012 | Stokking | H04N 7/24 709/231 |
| 2012/0117128 | A1* | 5/2012 | Hamada | H04N 21/4334 707/822 |
| 2016/0099026 | A1 | 4/2016 | Iguchi et al. | |

FOREIGN PATENT DOCUMENTS

| | | | |
|---|---|---|---|
| JP | 2012-018728 | A | 1/2012 |
| JP | 2012-059350 | A | 3/2012 |
| JP | 2015-023574 | A | 2/2015 |
| WO | WO 2006/121049 | A1 | 11/2006 |

* cited by examiner

| VIDEO | AUDIO | SUBTITLE | MMT-SI | APPLICATION | Content download, etc. | | | |
|---|---|---|---|---|---|---|---|---|
| HEVC | AAC | TTML | | HTML5 | File delivery method | | | |
| TIME INFORMATION NTP | | | | | | | | |
| | | | MMT | | | UDP/IP | TLV | PHY |
| TLV-SI | | | | | | | | |

FIG. 11

| | Syntax | No. of bits | Mnemonic |
|---|---|---|---|
| | PlayList() { | | |
| | length | 32 | uimsbf |
| | reserved_for_word_align | 12 | bslbf |
| 101 | PL_CPI_type | 4 | bslbf |
| 102 | number_of_PlayItems | 16 | uimsbf |
| | if (<Virtual-PlayList> && PL_CPI_type==1) { | | |
| 103 | number_of_SubPlayItems | 16 | uimsbf |
| | }else{ | | |
| | reserved_for_word_align | 16 | bslbf |
| | } | | |
| | for (PlayItem_id=0;<br>PlayItem_id<number_of_PlayItems;<br>PlayItem_id++) { | | |
| 104 | PlayItem() | | |
| | } | | |
| | if (<Virtual-PlayList> && PL_CPI_type==1) { | | |
| | for (i = 0; i < number_of_SubPlayItems; i++) { | | |
| | SubPlayItem() | | |
| | } | | |
| | } | | |
| | } | | |

FIG. 15

(1) CPI TYPE RECORD DATA OF RELATED ART
(ONLY MPEG-2 TS-COMPATIBLE DATA IS RECORDED)

| PL__CPI__type | MEANING |
|---|---|
| 0 | RESERVED |
| 1 | MPEG-2 TS-COMPATIBLE EP MAP |
| 2 | MPEG-2 TS-COMPATIBLE TU MAP |
| 3 TO 15 | RESERVED |

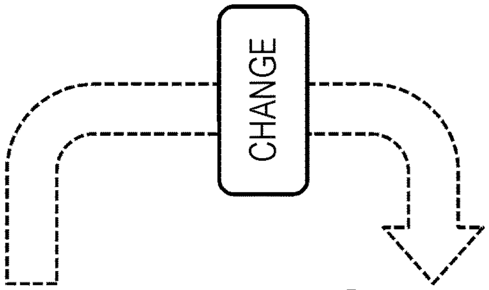

(2) NEW CPI TYPE RECORD DATA
(MPEG-2 TS-COMPATIBLE DATA AND MMT-COMPATIBLE DATA ARE RECORDED)

| PL__CPI__type | MEANING |
|---|---|
| 0 | RESERVED |
| 1 | MPEG-2 TS-COMPATIBLE EP MAP |
| 2 | MPEG-2 TS-COMPATIBLE TU MAP |
| 3 | MMT-COMPATIBLE EP MAP |
| 4 TO 15 | RESERVED |

FIG. 16

| | Syntax | No. of bits | Mnemonic |
|---|---|---|---|
| | PlayItem() { | | |
| | length | 16 | uimsbf |
| 111 | **Clip_Information_file_name** | 8*5 | bslbf |
| | **Clip_codec_identifier** | 8*4 | bslbf |
| | reserved_for_future_use | 12 | bslbf |
| | **connection_condition** | 4 | uimsbf |
| | if (*CPI_type*==1) { /* the CPI_type is defined in CPI() of the Clip information file referred to by the Clip_Information_file_name. */ | | |
| 112 | **ref_to_STC_id** | 8 | uimsbf |
| | } else { | | |
| | reserved_for_word_align | 8 | bslbf |
| | } | | |
| 113 | **IN_time** | 32 | uimsbf |
| 114 | **OUT_time** | 32 | uimsbf |
| | if(<Virtual-PlayList> && *connection_condition==3*){ | | |
| | **BridgeSequenceInfo()** | | |
| | } | | |
| | } | | |

FIG. 17

(1) PLAY ITEM INFORMATION RECORD DATA OF RELATED ART (MPEG-2 TS-COMPATIBLE PLAYLIST)

| RECORDING FIELD | MEANING |
|---|---|
| IN__time | REPRODUCTION START TIME INFORMATION OF PLAY ITEM (PlayItem) REPRODUCTION START POINT. ELAPSED TIME INFORMATION FROM SYSTEM TIME CLOCK [STC (45KHz CLOCK)]) START POINT IS RECORDED |
| OUT__time | REPRODUCTION END TIME INFORMATION OF PLAY ITEM (PlayItem) REPRODUCTION END POINT. ELAPSED TIME INFORMATION FROM SYSTEM TIME CLOCK [STC (45KHz CLOCK)]) START POINT IS RECORDED |

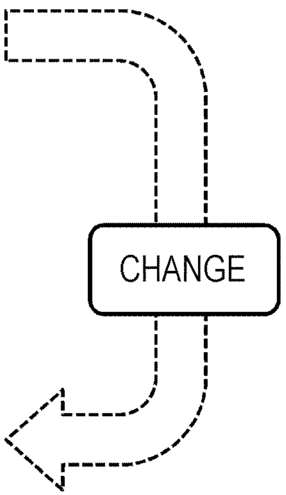

(2) NEW PLAY ITEM INFORMATION RECORD DATA (MMT-COMPATIBLE PLAYLIST)

| RECORDING FIELD | MEANING |
|---|---|
| IN__time | REPRODUCTION START TIME INFORMATION OF PLAY ITEM (PlayItem) REPRODUCTION START POINT. TIME INFORMATION ACCORDING TO NETWORK TIME PROTOCOL (NTP) IS RECORDED |
| OUT__time | REPRODUCTION END TIME INFORMATION OF PLAY ITEM (PlayItem) REPRODUCTION END POINT. TIME INFORMATION ACCORDING TO NETWORK TIME PROTOCOL (NTP) IS RECORDED |

FIG. 18

| Syntax | No. of bits | Mnemonic |
|---|---|---|
| MMT_Package_Table () { | | |
| table_id | 8 | uimsbf |
| version | 8 | uimsbf |
| length | 16 | uimsbf |
| reserved | 6 | bslbf |
| MPT_mode | 2 | bslbf |
| MMT_package_id_length | 8 | uimsbf |
| for (i=0; i<N; i++) { | | |
| MMT_package_id_byte | 8 | bslbf |
| } | | |
| MPT_descriptors_length | 16 | uimsbf |
| for ( i=0; i<N; i++) { | | |
| MPT_descriptors_byte | 8 | bslbf |
| } | | |
| number_of_assets | 8 | uimsbf |
| for (i=0; i<N; i++) { | | |
| identifier_type | 8 | uimsbf |
| asset_id_scheme | 32 | uimsbf |
| asset_id_length | 8 | uimsbf |
| for (j=0; j<M; j++) { | | |
| asset_id_byte | 8 | uimsbf |
| } | | |
| asset_type | 32 | char |
| reserved | 7 | bslbf |
| asset_clock_relation_flag | 1 | bslbf |
| location_count | 8 | uimsbf |
| for (j=0; j<M; j++) { | | |
| MMT_general_location_info () | | |
| } | | |
| asset_descriptors_length | 16 | uimsbf |
| for (j=0; j<M; j++) { | | |
| asset_descriptors_byte | 8 | bslbf |
| } | | |
| } | | |
| } | | |

ASSET TYPE

ASSET DESCRIPTOR

FIG. 19

| CHARACTERS | MEANING OF ASSET TYPE |
|---|---|
| hvc1 | HEVC SPECIFIED IN ITU-T RECOMMENDATION H.265 |
| mp4a | ISO/IEC 14496-3 AUDIO |
| stpp | TIMED TEXT (SUBTITLE AND CHARACTER SUPER) |
| aapp | APPLICATION |
| asgd | SYNCHRONOUS GENERAL-PURPOSE DATA |
| aagd | ASYNCHRONOUS GENERAL-PURPOSE DATA |

FIG. 20

| Syntax | No. of bits | Mnemonic |
|---|---|---|
| MPU_Timestamp_Descriptor (){ | | |
| descriptor_tag | 16 | uimsbf |
| descriptor_length | 8 | uimsbf |
| for (i=0; i<N; i++) { | | |
| mpu_sequence_number | 32 | uimsbf |
| mpu_presentation_time | 64 | uimsbf |
| } | | |
| } | | |

FIG. 21

| | Syntax | No. of bits | Mnemonic |
|---|---|---|---|
| | PlayListMark() { | | |
| | **length** | 32 | uimsbf |
| 121 | **number_of_PlayList_marks** | 16 | uimsbf |
| | for(i=0; i < *number_of_PlayList_marks*; i++) { | | |
| | **mark_invalid_flag** | 1 | uimsbf |
| 122 | **mark_type** | 7 | uimsbf |
| | **mark_name_length** | 8 | uimsbf |
| | **maker_ID** | 16 | uimsbf |
| | **ref_to_PlayItem_id** | 16 | uimsbf |
| 123 | **mark_time_stamp** | 32 | uimsbf |
| 124 | **entry_ES_PID** | 16 | uimsbf |
| | *if (mark_type==0x01 \|\| mark_type==0x02) {* | | |
| | **ref_to_menu_thumbnail_index** | 16 | uimsbf |
| | *} else {* | | |
| | **ref_to_mark_thumbnail_index** | 16 | uimsbf |
| | *}* | | |
| 125 | **duration** | 32 | uimsbf |
| | **makers_information** | 32 | bslbf |
| | **mark_name** | 8*24 | bslbf |
| | } | | |
| | } | | |

FIG. 22

(1) PLAYLIST MARK INFORMATION RECORD DATA OF RELATED ART (MPEG-2 TS-COMPATIBLE PLAYLIST)

| RECORDING FIELD | MEANING |
|---|---|
| Mark_time_stamp | TIME STAMP OF MARK SETTING POSITION IS RECORDED (45KHz CLOCK) |
| Entry_ES_PID | PACKET ID OF TS PACKET OF MARK SETTING POSITION IS RECORDED |
| duration | REPRODUCTION TIME INTERVAL BETWEEN PRECEDING MARK AND SUBSEQUENT MARK IS RECORDED (45KHz CLOCK) |

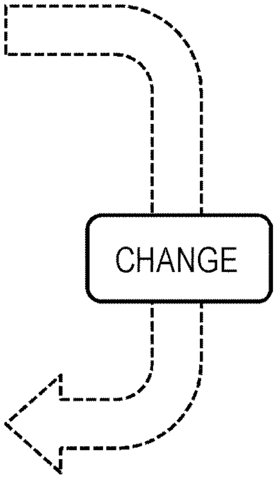

(2) NEW PLAYLIST MARK INFORMATION RECORD DATA (MMT-COMPATIBLE PLAYLIST)

| RECORDING FIELD | MEANING |
|---|---|
| Mark_time_stamp | TIME STAMP OF MARK SETTING POSITION IS RECORDED AS TIME INFORMATION ACCORDING TO NETWORK TIME PROTOCOL (NTP) |
| Entry_ES_PID | PACKET ID OF MMT PACKET OF MARK SETTING POSITION IS RECORDED |
| duration | REPRODUCTION TIME INTERVAL BETWEEN PRECEDING MARK AND SUBSEQUENT MARK IS RECORDED (45KHz CLOCK) (CALCULATED ON BASIS OF DATA AMOUNT BETWEEN MARKS) |

FIG. 23

| | Syntax | No. of bits | Mnemonic |
|---|---|---|---|
| | zzzzz. clpi{ | | |
| | type Indicator | 8*4 | bslbf |
| | version number | 8*4 | bslbf |
| | SequenceInfo start address | 32 | uimsbf |
| | ProgramInfo start address | 32 | uimsbf |
| | CPI start address | 32 | uimsbf |
| | ClipMark start address | 32 | uimsbf |
| | ExtensionData start address | 32 | uimsbf |
| | reserved | 96 | bslbf |
| 201 | ClipInfo() | | |
| | for(i=0;i<N1;i++){ | | |
| | padding word | 16 | bslbf |
| | } | | |
| 202 | SequenceInfo() | | |
| | for(i=0;i<N2;i++){ | | |
| | padding word | 16 | bslbf |
| | } | | |
| 203 | ProgramInfo() | | |
| | for(i=0;i<N3;i++){ | | |
| | padding word | 16 | bslbf |
| | } | | |
| 204 | CPI() | | |
| | for(i=0;i<N4;i++){ | | |
| | padding word | 16 | bslbf |
| | } | | |
| | ClipMark() | | |
| | for(i=0;i<N5;i++){ | | |
| | padding word | 16 | bslbf |
| | } | | |
| | ExtensionData() | | |
| | for(i=0;i<N6;i++){ | | |
| | padding word | 16 | bslbf |
| | } | | |
| | } | | |

FIG. 24

| | Syntax | No. of bits | Mnemonic |
|---|---|---|---|
| | ClipInfo() { | | |
| | **length** | 32 | uimsbf |
| | reserved_for_future_use | 8 | bslbf |
| 211 | **application_type** | 8 | bslbf |
| 212 | **Clip_stream_type** | 8 | uimsbf |
| | reserved_for_word_align | 4 | bslbf |
| | **encode_condition** | 2 | bslbf |
| 213 | **transcode_mode_flag** | 1 | bslbf |
| | **controlled_time_flag** | 1 | bslbf |
| 214 | **TS_average_rate** | 32 | uimsbf |
| 215 | **TS_recording_rate** | 32 | uimsbf |
| 216 | **num_of_source_packets** | 32 | uimsbf |
| | **BD_system_use** | 1024 | bslbf |
| | **TS_type_info_block()** | | |
| | if (Clip_stream_type == 2) { | | |
| | **preceding_Clip_Information_file_name** | 8*5 | bslbf |
| | **Clip_codec_identifier** | 8*4 | bslbf |
| | reserved_for_future_use | 8 | bslbf |
| | **SPN_exit_from_preceding_Clip** | 32 | uimsbf |
| | **following_Clip_Information_file_name** | 8*5 | bslbf |
| | **Clip_codec_identifier** | 8*4 | bslbf |
| | reserved_for_future_use | 8 | bslbf |
| | **SPN_enter_to_following_Clip** | 32 | uimsbf |
| | } | | |
| | } | | |

FIG. 25

(1) CLIP INFORMATION (ClipInfo) RECORD DATA OF RELATED ART
(MPEG-2 TS-COMPATIBLE CLIP INFORMATION FILE)

| Application__type | MEANING |
|---|---|
| 0 | RESERVED |
| 1 | MAIN TS FOR A MAIN-PATH OF MOVIE |
| 2 | MAIN TS FOR A MAIN-PATH OF TIME BASED SLIDE SHOW |
| 3 TO 255 | RESERVED |

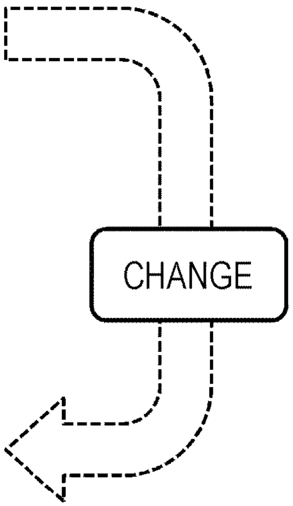

(2) NEW CLIP INFORMATION (ClipInfo) RECORD DATA
(MPEG-2 TS/MMT-COMPATIBLE CLIP INFORMATION FILE)

| Application__type | MEANING |
|---|---|
| 0 | RESERVED |
| 1 | MAIN TS FOR A MAIN-PATH OF MOVIE |
| 2 | MAIN TS FOR A MAIN-PATH OF TIME BASED SLIDE SHOW |
| 3 | MAIN MMT FOR A MAIN-PATH OF MOVIE |
| 4 TO 255 | RESERVED |

FIG. 26

(1) CLIP INFORMATION (ClipInfo) RECORD DATA OF RELATED ART (MPEG-2 TS-COMPATIBLE CLIP INFORMATION FILE)

| Clip_stream_type | MEANING |
|---|---|
| 0 | RESERVED |
| 1 | A CLIP AV STREAM OF BDAV MPEG-2 TRANSPORT STREAM |
| 2 | A BRIDGE-CLIP AV STREAM OF BDAV MPEG-2 TRANSPORT STREAM |
| 3 TO 255 | RESERVED |

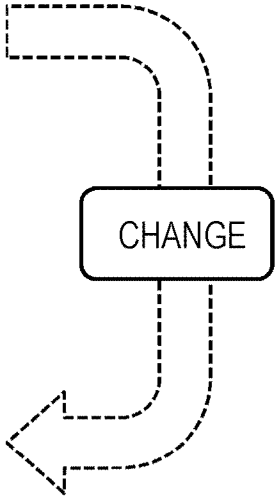

(2) NEW CLIP INFORMATION (ClipInfo) RECORD DATA (MPEG-2 TS/MMT-COMPATIBLE CLIP INFORMATION FILE)

| Clip_stream_type | MEANING |
|---|---|
| 0 | RESERVED |
| 1 | A CLIP AV STREAM OF BDAV MPEG-2 TRANSPORT STREAM |
| 2 | A BRIDGE-CLIP AV STREAM OF BDAV MPEG-2 TRANSPORT STREAM |
| 3 | A CLIP AV STREAM OF BDAV MMT |
| 4 TO 255 | RESERVED |

FIG. 27

| | Syntax | No. of bits | Mnemonic |
|---|---|---|---|
| | SequenceInfo() { | | |
| | **length** | 32 | uimsbf |
| | reserved_for_word_align | 8 | bslbf |
| | **num_of_ATC_sequences** | 8 | uimsbf |
| | for (*atc_id=0; atc_id<num_of_ATC_sequences; atc_id++*) { | | |
| 221 | **SPN_ATC_start***[atc_id]* | 32 | uimsbf |
| 222 | **num_of_STC_sequences***[atc_id]* | 8 | uimsbf |
| | **offset_STC_id***[atc_id]* | 8 | uimsbf |
| | for (***stc_id*** = *offset_STC_id[atc_id];* ***stc_id*** *<(num_of_STC_sequences[atc_id]+offset_STC_id[atc_id]);* ***stc_id***++) { | | |
| 223 | **PCR_PID***[atc_id][stc_id]* | 16 | uimsbf |
| 224 | **SPN_STC_start***[atc_id][stc_id]* | 32 | uimsbf |
| 225 | **presentation_start_time***[atc_id][stc_id]* | 32 | uimsbf |
| 226 | **presentation_end_time***[atc_id][stc_id]* | 32 | uimsbf |
| | } | | |
| | } | | |
| | } | | |

FIG. 29

| | Syntax | No. of bits | Mnemonic |
|---|---|---|---|
| | ProgramInfo() { | | |
| | length | 32 | uimsbf |
| | reserved_for_word_align | 8 | bslbf |
| 231 | num_of_program_sequences | 8 | uimsbf |
| | for(i=0; i<*num_of_program_sequences*; i++){ | | |
| 232 | SPN_program_sequence_start*[i]* | 32 | uimsbf |
| 233 | program_map_PID*[i]* | 16 | bslbf |
| | num_of_streams_in_ps*[i]* | 8 | uimsbf |
| | num_of_groups*[i]* | 8 | uimsbf |
| | for (*stream_index*=0; *stream_index* < *num_of_streams_in_ps[i]*; *stream_index*++) { | | |
| | stream_PID*[i][stream_index]* | 16 | uimsbf |
| | StreamCodingInfo(*i*, *stream_index*) | | |
| | } | | |
| | if (*num_of_groups[i]* > 1) { | | |
| | for(j=0; j<*num_of_groups[i]*; j++) { | | |
| | num_of_streams_in_group*[i][j]* | 8 | uimsbf |
| | for (k=0; k<*num_of_streams_in_group[i][j]*;k++) { | | |
| | ref_to_stream_index*[i][j][k]* | 8 | uimsbf |
| | } | | |
| | if (num_of_streams_in_group*[i][j]*%2==0) { | | |
| | reserved_for_word_align | 8 | bslbf |
| | } | | |
| | } | | |
| | } | | |
| | } | | |
| | } | | |

FIG. 30

| Syntax | No. of bits | Mnemonic |
|---|---|---|
| CPI() { | | |
| **length** | 32 | uimsbf |
| reserved_for_word_align | 12 | bslbf |
| **CPI_type** | 4 | uimsbf |
| if (CPI_type == 1) { | | |
| **EP_map()** (241) | | |
| } else if (CPI_type == 2) { | | |
| **TU_map()** | | |
| } | | |
| } | | |

FIG. 31

| Syntax | No. of bits | Mnemonic |
|---|---|---|
| EP_map(){ | | |
| reserved_for_word_align | 8 | bslbf |
| **number_of_stream_PID_entries** | 8 | uimsbf |
| for (*k=0; k<number_of_stream_PID_entries; k++*) { | | |
| **stream_PID***[k]* | 16 | bslbf |
| reserved_for_word_align | 10 | bslbf |
| **EP**_stream_type*[k]* | 4 | uimsbf |
| num_**EP**_coarse_entries*[k]* | 16 | uimsbf |
| num_**EP**_fine_entries*[k]* | 18 | uimsbf |
| **EP**_map_for_one_stream_**PID**_start_address*[k]* | 32 | uimsbf |
| } | | |
| for (i=0; i<X; i++) { | | |
| padding_word | 16 | bslbf |
| } | | |
| for (*k=0; k<number_of_stream_PID_entries; k++*) { | | |
| **EP_map_for_one_stream_PID(***EP_stream_type[k],* *num_EP_coarse_entries[k],* *num_EP_fine_entries[k]***)** (242) | | |
| for (i=0; i<Y[k]; i++) { | | |
| padding_word | 16 | bslbf |
| } | | |
| } | | |
| } | | |

FIG. 32

| | Syntax | No. of bits | Mnemonic |
|---|---|---|---|
| | EP_map_for_one_stream_PID(*EP_stream_type, Nc, Nf*) { | | |
| | **EP_fine_table_start_address** | 32 | uimsbf |
| | for (i=0; i<*Nc*; i++) { | | |
| 251 | **ref_to_EP_fine_id***[i]* | 18 | uimsbf |
| 252 | **PTS_EP_coarse***[i]* | 14 | uimsbf |
| 253 | **SPN_EP_coarse***[i]* | 32 | uimsbf |
| | } | | |
| | for (i=0; i<X; i++) { | | |
| | **padding_word** | 16 | bslbf |
| | } | | |
| | for *(EP_fine_id = 0;*<br>*EP_fine_id < Nf;*<br>*EP_fine_id ++)* { | | |
| | **EP_video_type***[EP_fine_id]* | 1 | bslbf |
| | **I_end_position_offset***[EP_fine_id]* | 3 | bslbf |
| 254 | **PTS_EP_fine***[EP_fine_id]* | 11 | uimsbf |
| 255 | **SPN_EP_fine***[EP_fine_id]* | 17 | uimsbf |
| | } | | |
| | } | | |

(a) COARSE EP MAP (EP_coarse)

(b) FINE EP MAP (EP_fine)

FIG. 34

(a) MMT FORMAT DATA-COMPATIBLE EP MAP EXAMPLE 1

| | EP_map_for_one_stream_PID(){ | No. of bits | Mnemonic |
|---|---|---|---|
| | length | 32 | uimsbf |
| | number_of_entries | 32 | uimsbf |
| | for (entry_id=0; entry_id<number_of_entries; i++) { | | |
| 261 | NTP_time (64-bit NTP TIME) | 64 | uimsbf |
| 262 | MMT_byte_address (BYTE ADDRESS FROM BEGINNING OF MMT FILE) | 64 | uimsbf |
| | MPU_presentation_time_leap_indicator | 2 | uimsbf |
| | } | | |
| | reserved_for_future_use | 32 | uimsbf |
| | } | | |

(b) MMT FORMAT DATA-COMPATIBLE EP MAP EXAMPLE 2 (COMPRESSION EXAMPLE)

| | EP_map_for_one_stream_PID(){ | No. of bits | Mnemonic |
|---|---|---|---|
| | length | 32 | uimsbf |
| | number_of_entries | 32 | uimsbf |
| | for (entry_id=0; entry_id<number_of_entries; i++) { | | |
| 263 | NTP_time (32-bit NTP TIME) | 64 | uimsbf |
| 264 | MMT_byte_address (BYTE ADDRESS FROM BEGINNING OF MMT FILE OR PRECEDING ENTRY) | 32 | uimsbf |
| | MPU_presentation_time_leap_indicator | 2 | uimsbf |
| | } | | |
| | reserved_for_future_use | 32 | uimsbf |
| | } | | |

FIG. 35

(c) MMT FORMAT DATA-COMPATIBLE EP MAP EXAMPLE 3 (DIVISION EXAMPLE)

| Ref. | EP_map_for_one_stream_PID(){ | No. of bits | Mnemonic |
|---|---|---|---|
| | length | 32 | uimsbf |
| | number_of_coarse_entries | 32 | uimsbf |
| | for (i=0; i<number_of_coarse_entries; i++) { | | |
| 265 | NTP_coarse | 32 | uimsbf |
| 266 | MMT_byte_coarse | 64 | uimsbf |
| | MPU_presentation_time_leap_indicator | 2 | uimsbf |
| 267 | ref_to_fine_id | 32 | uimsbf |
| | } | | |
| | number_of_fine_entries | 32 | uimsbf |
| | for (entry_fine_id=0; entry_fine_id<number_of_fine_entries; entry_fine_id++) { | | |
| 268 | NTP_fine | 32 | uimsbf |
| 269 | MMT_byte_fine | 64 | uimsbf |
| | } | | |
| | reserved_for_future_use | 32 | uimsbf |
| | } | | |

NTP_coarse: UPPER 32 bits OF 64-bit NTP TIME (SECOND UNIT)

MMT_byte_coarse: BYTE ADDRESS OF COARSE NTP TIME (NTP_coarse) CORRESPONDENCE DATA POSITION ref_to_fine_id: IDENTIFIER OF FINE NTP TIME (NTP_fine)

NTP_fine: LOWER 32 bits OF 64-bit NTP TIME (SECOND UNIT OR LESS)

MMT_byte_fine: BYTE ADDRESS OF FINE NTP TIME (NTP_fine) CORRESPONDENCE DATA POSITION

FIG. 36

(d) MMT FORMAT DATA-COMPATIBLE EP MAP EXAMPLE 4 (DIVISION & COMPRESSION EXAMPLE)

| | EP_map_for_one_stream_PID(){ | No. of bits | Mnemonic |
|---|---|---|---|
| | length | 32 | uimsbf |
| | number_of_coarse_entries | 32 | uimsbf |
| | for (i=0; i<number_of_coarse_entries; i++) { | | |
| 271 | NTP_coarse | 32 | uimsbf |
| 272 | MMT_byte_coarse | 32 | uimsbf |
| | MPU_presentation_time_leap_indicator | 2 | uimsbf |
| 273 | ref_to_fine_id | 32 | uimsbf |
| | } | | |
| | number_of_fine_entries | 32 | uimsbf |
| | for (entry_fine_id=0; entry_fine_id<number_of_fine_entries; entry_fine_id++) { | | |
| 274 | NTP_fine | 32 | uimsbf |
| 275 | MMT_byte_fine | 32 | uimsbf |
| | } | | |
| | reserved_for_future_use | 32 | uimsbf |
| | } | | |

NTP_coarse: UPPER 32 bits OF 64-bit NTP TIME (SECOND UNIT)

MMT_byte_coarse: BYTE ADDRESS DIFFERENCE FROM BEGINNING OF MMT FILE OR PRECEDING ENTRY OF COARSE NTP TIME (NTP_coarse) CORRESPONDENCE DATA POSITION ref_to_fine_id: IDENTIFIER OF FINE NTP TIME (NTP_fine)

NTP_fine: LOWER 32 bits OF 64-bit NTP TIME (SECOND UNIT OR LESS)

MMT_byte_fine: BYTE ADDRESS DIFFERENCE FROM BEGINNING OF MMT FILE OR PRECEDING ENTRY OF FINE NTP TIME (NTP_fine) CORRESPONDENCE DATA POSITION

FIG. 37

| Syntax | No. of bits | Mnemonic |
|---|---|---|
| MMTP_packet () { | | |
| version | 2 | uimsbf |
| packet_counter_flag 1 bslbf | | |
| FEC_type | 2 | uimsbf |
| reserved | 1 | bslbf |
| extension_flag | 1 | bslbf |
| RAP_flag (283: RANDOM ACCESS POINT INFORMATION FLAG) | 1 | bslbf |
| reserved | 2 | bslbf |
| payload_type | 6 | uimsbf |
| packet_id | 16 | uimsbf |
| timestamp | 32 | uimsbf |
| packet_sequence_number | 32 | uimsbf |
| if (packet_counter_flag == 1) { | | |
| packet_counter | 32 | uimsbf |
| } | | |
| if (extension_flag == 1) { | | |
| extension_type | 16 | uimsbf |
| extension_length | 16 | uimsbf |
| for (i=0; i<N; i++) { | | |
| header_extension_byte | 8 | bslbf |
| } | | |
| } | | |
| MMTP_payload () | | |
| } | | |

281 (version through closing brace of extension block)

282 (MMTP_payload ())

FIG. 39

| | Syntax | No. of bits | Mnemonic |
|---|---|---|---|
| | ClipMark() { | | |
| | length | 32 | uimsbf |
| | if (length != 0) { | | |
| | maker_ID | 16 | uimsbf |
| 294 | number_of_Clip_marks | 16 | uimsbf |
| | for(i=0; i < *number_of_Clip_marks*; i++) { | | |
| | mark_invalid_flag | 1 | uimsbf |
| 295 | mark_type | 7 | uimsbf |
| | ref_to_STC_id | 8 | uimsbf |
| 296 | mark_time_stamp (64-bit NTP TIME) | 32 | uimsbf |
| 297 | entry_ES_PID | 16 | uimsbf |
| | ref_to_mark_thumbnail_index | 16 | uimsbf |
| 298 | representative_picture_time_stamp (64-bit NTP TIME) | 32 | uimsbf |
| 299 | duration | 32 | uimsbf |
| | makers_information | 32 | bslbf |
| | } | | |
| | } | | |
| | } | | |

FIG. 42

| | |
|---|---|
| (1) VIDEO | AT LEAST ONE VIDEO STREAM IS RECORDED |
| (2) AUDIO | (2a) AT LEAST ONE AUDIO STREAM IS RECORDED |
| | (2b) AUDIO STREAMS CORRESPONDING TO PLURALITY OF LANGUAGES ARE RECORDED |
| (3) SUBTITLE | (3a) MAXIMUM OF TWO LANGUAGES ARE RECORDED |
| | (3b) NO RECORD |
| (4) CONTROL INFORMATION (MMT−SI) | (4a) ONLY MMT PACKAGE TABLE (MPT) IS RECORDED |
| | (4b) INFORMATION IS SELECTED IN ACCORDANCE WITH RECORD VIDEO, AUDIO, OR SUBTITLE AND RECORDED |

FIG. 43

| Syntax | No. of bits | Mnemonic |
|---|---|---|
| MMT_Package_Table () { | | |
| table_id | 8 | uimsbf |
| version | 8 | uimsbf |
| length | 16 | uimsbf |
| reserved | 6 | bslbf |
| MPT_mode | 2 | bslbf |
| MMT_package_id_length | 8 | uimsbf |
| for (i=0; i<N; i++) { | | |
| MMT_package_id_byte | 8 | bslbf |
| } | | |
| MPT_descriptors_length | 16 | uimsbf |
| for ( i=0; i<N; i++) { | | |
| MPT_descriptors_byte (MPT DESCRIPTOR) | 8 | bslbf |
| } | | |
| number_of_assets | 8 | uimsbf |
| for (i=0; i<N; i++) { | | |
| identifier_type | 8 | uimsbf |
| asset_id_scheme | 32 | uimsbf |
| asset_id_length | 8 | uimsbf |
| for (j=0; j<M; j++) { | | |
| asset_id_byte | 8 | uimsbf |
| } | | |
| asset_type (ASSET TYPE) | 32 | char |
| reserved | 7 | bslbf |
| asset_clock_relation_flag | 1 | bslbf |
| location_count | 8 | uimsbf |
| for (j=0; j<M; j++) { | | |
| MMT_general_location_info () | | |
| } | | |
| asset_descriptors_length | 16 | uimsbf |
| for (j=0; j<M; j++) { | | |
| asset_descriptors_byte (ASSET DESCRIPTOR) | 8 | bslbf |
| } | | |
| } | | |
| } | | |

FIG. 44

| | |
|---|---|
| (A) MPT DESCRIPTOR | (a1) MH−PARENTAL RATE DESCRIPTOR |
| | (a2) CONTENT COPY CONTROL DESCRIPTOR |
| | (a3) CONTENT USE CONTROL DESCRIPTOR |
| (B) ASSET DESCRIPTOR | (b1) MPU TIME STAMP DESCRIPTOR |
| | (b2) MPU TIME STAMP EXTENSION DESCRIPTOR |
| | (b3) MH−MPEG−4 AUDIO DESCRIPTOR |
| | (b4) MH−MPEG−4 AUDIO EXTENSION DESCRIPTOR |
| | (b5) MH−HEVC VIDEO DESCRIPTOR |
| | (b6) VIDEO COMPONENT DESCRIPTOR |
| | (b7) MH−STREAM IDENTIFICATION DESCRIPTOR |
| | (b8) MH−AUDIO COMPONENT DESCRIPTOR |
| | (b9) MH−DATA ENCODING SCHEME DESCRIPTOR |

FIG. 45

| Syntax | No. of bits | Mnemonic |
|---|---|---|
| MMT_Package_Table () { | | |
| table_id | 8 | uimsbf |
| version | 8 | uimsbf |
| length | 16 | uimsbf |
| reserved | 6 | bslbf |
| MPT_mode | 2 | bslbf |
| MMT_package_id_length | 8 | uimsbf |
| for (i=0; i<N; i++) { | | |
| MMT_package_id_byte | 8 | bslbf |
| } | | |
| MPT_descriptors_length | 16 | uimsbf |
| for ( i=0; i<N; i++) { | | |
| MPT_descriptors_byte | 8 | bslbf |
| } | | |
| number_of_assets | 8 | uimsbf |
| for (i=0; i<N; i++) { | | |
| identifier_type | 8 | uimsbf |
| asset_id_scheme | 32 | uimsbf |
| asset_id_length | 8 | uimsbf |
| for (j=0; j<M; j++) { | | |
| asset_id_byte | 8 | uimsbf |
| } | | |
| asset_type | 32 | char |
| reserved | 7 | bslbf |
| asset_clock_relation_flag | 1 | bslbf |
| location_count | 8 | uimsbf |
| for (j=0; j<M; j++) { | | |
| MMT_general_location_info () | | |
| } | | |
| asset_descriptors_length | 16 | uimsbf |
| for (j=0; j<M; j++) { | | |
| asset_descriptors_byte | 8 | bslbf |
| } | | |
| } | | |
| } | | |

table_id: FIXED TO 0x20
MPT_mode: FIXED TO 00
MMT_package_id_length: FIXED TO TWO BYTES
MMT_package_id_byte: RECORD WITHOUT CHANGE
MPT_descriptors_byte: MPT DESCRIPTOR
number_of_assets: DECIDE IN ACCORDANCE WITH NUMBER OF RECORDED ASSETS
identifier_type: FIXED TO 0x00
asset_id_scheme: RECORD WITHOUT CHANGE
asset_id_byte: RECORD WITHOUT CHANGE
asset_type: ASSET TYPE
asset_clock_relation_flag: FIXED TO 0
location_count: FIXED TO 1
MMT_general_location_info (): RECORD WITHOUT CHANGE
asset_descriptors_byte: ASSET DESCRIPTOR

400 INFORMATION PROCESSING DEVICE

INFORMATION PROCESSING DEVICE, AND INFORMATION PROCESSING METHOD, AND PROGRAM

CROSS REFERENCE TO PRIOR APPLICATION

This application is a National Stage Patent Application of PCT International Patent Application No. PCT/JP2017/028554 (filed on Aug. 7, 2017) under 35 U.S.C. § 371, which claims priority to Japanese Patent Application No. 2016-175899 (filed on Sep. 8, 2016), which are all hereby incorporated by reference in their entirety.

TECHNICAL FIELD

The present disclosure relates to an information processing device, an information processing method, and a program. More particularly, the present disclosure relates to an information processing device, an information processing method, and a program which are capable of receiving MPEG media transport (MMT) format data which is being standardized as a future data transmission standard in broadcast waves or the like, recording the MMT format data in medium, and enabling the MMT format data to be reproduced.

BACKGROUND ART

Currently, standardization for realizing data transmission of a high quality image, such as broadcasting of a 4K image, an 8K image, or the like has been conducted, and a data delivery scheme using an MPEG media transport (MMT) format is under review as one of them.

The MMT format is a format specifying a data transfer scheme (transport format) for transmitting encoded data constituting content such as a video, an audio, or a subtitle via a broadcast wave or a network.

The MMT format is planned to be used, for example, for broadcasting next generation content such as, for example, a 4K image, a high dynamic range (HDR) image, or the like.

Meanwhile, an MPEG-2 TS format is being widely used as a transmission format of a video, an audio, a subtitle, or the like or a data recording format for a medium.

For example, data according to the MPEG-2 TS format is often recorded in a Blu-ray (registered trademark) disc (BD) which is an information recording medium (medium) used for recording/reproducing of content, a flash memory, a hard disk (HD), or the like.

In the future, in a case where an information processing device such as a television receives delivery data according to the MMT format transmitted from a broadcast station or the like, and the information processing device records the received data in a BD, a flash memory, or an HD, in the case of reproduction target content such as a video, an audio, or a subtitle data, either a process of converting the MMT format into the MPEG-2 TS format and then recording the content or a process of recording the content in the MMT format without change is performed.

However, in a case where content such as a video, an audio, or a subtitle is reproduced from a medium such as a Blu-ray (registered trademark) disc (BD), a flash memory, an HD, or the like, reproduction control information and index information for performing the process of reproducing the content is necessary. The reproduction control information and the index information are generally referred to as a database file.

The reproduction control information and the index information differ depending on a reproducing application which executes the process of reproducing record data in a medium.

For example, there are BDMV and BDAV standards (formats) as the current recording/reproducing application standard (format). The application standards have been established mainly as a data recording/reproducing application standard using a Blu-ray (registered trademark) disc (BD).

Further, the BDMV and the BDAV are data recording/reproducing application standards mainly using a BD, but these standards are not limited to a BD and can be applied to data recording/reproducing using a medium other than a BD such as a flash memory or an HD.

A data recording/reproduction process configuration using a BD is described in, for example, Patent Document 1 (Japanese Patent Application Laid-Open No. 2011-023071) or the like.

The BDMV is an application standard developed for BD-ROMs in which, for example, movie content or the like is recorded in advance and is widely used mainly in non-rewritable BD-ROMs such as package content.

On the other hand, the BDAV is a standard developed to be applied mainly to a data recording/reproducing process using a rewritable BD-RE type disc, a BD-R type, disc in which recording can be performed only once, or the like. For example, the BDAV is used for recording and reproducing videos captured by a user using a video camera and the like or recording and reproducing television broadcasts.

In order to record the delivery content according to the MMT format in the information recording medium (medium) and perform a content reproduction process from the medium using a BDAV format-compatible reproducing application, it is necessary to perform data recording in accordance with the BDAV format.

As described above, in the BDAV format, the database file such as a playlist file and a clip information file is specified as a recording file of the reproduction control information, and the BDAV-compatible reproducing application records the data reproduction process with reference to recording information such as the reproduction control information file (database file).

However, the database file such as the playlist file or the clip information file specified in the BDAV format is originally a file specified as a file which can be generated on the basis of delivery data of the MPEG-2 TS format.

Delivery data according to the MMT format which is a format different from the MPEG-2 TS format is recorded in the playlist file or the clip information file specified in the current BDAV format, but there are cases in which it is data which is unable to be used by the current BDAV-compatible reproducing application.

Therefore, in order to make it possible to record MMT format data in a medium and perform content reproduction using a BDAV format-compatible application, it is necessary to generate the playlist file or the clip information file corresponding to the MMT format data when a process of recording the MMT format data in a medium is performed.

Further, when the MMT format data recorded in the medium is reproduced, it is necessary to perform reproduction using the playlist file or the clip information file corresponding to the MMT format data.

However, these processes are not embodied at the present time.

CITATION LIST

Patent Document

Patent Document 1: Japanese Patent Application Laid-Open No. 2011-023071

SUMMARY OF THE INVENTION

Problems to be Solved by the Invention

The present disclosure was made in light of, for example, the above problems, and it is an object to provide an information processing device, an information processing method, and a program which are capable of receiving delivery data according to the MMT format, generating the database file specified in the BDAV format, recording the database file in a medium, and enabling medium-recorded content to be reproduced using the database file.

Solutions to Problems

A first aspect of the present disclosure is in an information processing device, including:

a data processing unit that receives MPEG media transport (MMT) format data and generates record data according to a BDAV format or an SPAV format which is a data recording format for an information recording medium, in which the data processing unit generates an MMT format stream file in which the MMT format data is stored as reproduction data, and further generates an MMT format-compatible reproduction control information file storing reproduction control information of the MMT format stream file.

In addition, a second aspect of the present disclosure is in an information processing device, including:

a data processing unit that executes a reproduction process of record data of an information recording medium, in which the information recording medium is an information recording medium storing data in which MPEG media transport (MMT) format data is recorded according to a BDAV format or an SPAV format, and the data processing unit executes reproduction control by applying an MMT format-compatible reproduction control information file in which reproduction control information of an MMT format stream file is stored when a data reproduction process using the MMT format stream file storing the MMT format data is performed.

In addition, a third aspect of the present disclosure is in an information processing method executed in an information processing device, the information processing device including a data processing unit that receives MPEG media transport (MMT) format data and generates record data according to a BDAV format or an SPAV format which is a data recording format for an information recording medium, the information processing method including:

generating, by the data processing unit, an MMT format stream file in which the MMT format data is stored as reproduction data, and further generating, by the data processing unit, an MMT format-compatible reproduction control information file storing reproduction control information of the MMT format stream file.

In addition, a fourth aspect of the present disclosure is in an information processing method executed in an information processing device, the information processing device including a data processing unit that executes a reproduction process of record data of an information recording medium, the information recording medium being an information recording medium storing data in which MPEG media transport. (MMT) format data is recorded according to a BDAV format or an SPAV format, the information processing method including:

executing, by the data processing unit, reproduction control by applying an MMT format-compatible reproduction control information file in which reproduction control information of an MMT format stream file is stored when a data reproduction process using the MMT format stream file storing the MMT format data is performed.

In addition, a fifth aspect of the present disclosure is in a program causing,an information processing to be executed in an information processing device, the information processing device including a data processing unit that receives MPEG media transport (MMT) format data and generates record data according to a BDAV format or an SPAV format which is a data recording format for an information recording medium, the program causing the data processing unit to:

generate an MMT format stream file in which the MMT format data is stored as reproduction data, and further generate an MMT format-compatible reproduction control information file storing reproduction control information of the MMT format stream file.

In addition, a sixth aspect of the present disclosure is in a program causing an information processing to be executed in an information processing device, the information processing device including a data processing unit that executes a reproduction process of record data of an information recording medium, the information recording medium being an information recording medium storing data in which MPEG media transport (MMT) format data is recorded according to a EDAV format or an SPAV format, the program causing the data processing unit to:

execute reproduction control by applying an MMT format-compatible reproduction control information file in which reproduction control information of an MMT format stream file is stored when a data reproduction process using the MMI format stream file storing the MMT format data is performed.

Further, a program of the present disclosure is, for example, a program which can be provided by means of a storage medium or a communication medium provided in a computer readable format to an information processing device or computer system which can execute various program codes. Since such a program is provided in a computer readable format, a process corresponding to the program is implemented on an information processing device or a computer system.

Still other objects, features, and advantages of the present disclosure will become apparent from further detailed description based on an embodiment of the present disclosure embodiment to be described later and the appended drawings. Further, in this specification, a system refers to a logical aggregate configuration of a plurality of devices and not limited to one in which devices of respective components are within a single housing.

Effects of the Invention

According to one embodiment of the present disclosure, a configuration capable of recording MPEG media transport (MMT) format data in a medium as BDAV or SPAV format data and enabling the MMT format data to be reproduced is realized.

Specifically, MMT format data input via a broadcast wave or the like is input, and record data according to a BDAV format or an SPAV format is generated. A data processing unit generates an MMT format stream file storing the MMT format data as reproduction data and further generates a playlist file storing reproduction control information of the MMT format stream file and a clip information file.

With the present configuration, a configuration capable of recording MMT format data in a medium as BDAV or SPAV format data and enabling the MMT format data to be reproduced is realized.

Further, an effect described in this specification is merely an example and not limited, and additional effects may be included.

BRIEF DESCRIPTION OF DRAWINGS

FIG. 11 is a diagram for describing a data configuration of a playlist file.

FIG. 15 is a diagram for describing CPI type record data of a playlist file.

FIG. 16 is a diagram for describing a data configuration of a play item of a playlist file.

FIG. 17 is a diagram for describing play item record data of a playlist file.

FIG. 18 is a diagram showing a data configuration (syntax) of an MMT package table (MPT).

FIG. 19 is a diagram for describing a specific example of an asset type (asset_type) recorded in an MMT package table (MPT).

FIG. 20 is a diagram showing a data configuration (syntax) of an MPU time stamp descriptor recorded in an MMT package table (MPT).

FIG. 21 is a diagram for describing a playlist mark which is a component of a playlist file.

FIG. 22 is a diagram for describing record data of playlist mark information.

FIG. 23 is a diagram showing a data configuration (syntax) of a clip information file.

FIG. 24 is a diagram showing a data configuration (syntax) of clip information [ClipInfo( )] of a clip information file.

FIG. 25 is a diagram for describing a recording example of an application type recorded in clip information [ClipInfo( )] of a clip information file.

FIG. 26 is a diagram for describing a recording example of a clip stream type recorded in clip information [ClipInfo( )] of a clip information file.

FIG. 27 is a diagram illustrating a data configuration (syntax) of sequence information [SequenceInfo( )] of a clip information file.

FIG. 29 is a diagram illustrating a data configuration (syntax) of program information [ProgramInfo( )] of a clip information file.

FIG. 30 is a diagram illustrating a data configuration (syntax) of CPI information [CPI( )] of a clip information file.

FIG. 31 is a diagram for describing a data configuration of an EP map recorded in CPI information [CPI( )] of a clip information file.

FIG. 32 is a diagram for describing a data configuration of an EP map recorded in CPI information [CPI( )] of a clip information file.

FIG. 34 is a diagram for describing a data configuration of an MMT format data-compatible PP map recorded in CPI information [CPI( )] of a clip information file.

FIG. 35 is a diagram for (describing a data configuration of an MMT format data-compatible EP map recorded in CPI information [CPI( )] of a clip information file.

FIG. 36 is a diagram for describing a data configuration of an MMT format data-compatible EP map recorded in CPI information [CPI( )] of a clip information file.

FIG. 37 is a diagram for describing a data configuration of an MMT package table (MPT) for acquiring random access point information necessary for generating an MMT format data-compatible EP map.

FIG. 39 is a diagram illustrating a data configuration (syntax) of a clip mark [ClipMark( )] of a clip information file.

FIG. 42 is a diagram for describing an example of PINT format data recorded in a clip AV stream file.

FIG. 43 is a diagram for describing data of an MMT package table (MPT) which is control information in MMT format data recorded in a clip AV stream file.

FIG. 44 is a diagram for describing data of an MMT package table (MPT) which is control information in MMT format data recorded in a clip AV stream file.

FIG. 45 is a diagram for describing data of an MPT which is control information in MMT package table (MPT) format data to be recorded in a clip AV stream file.

MODE FOR CARRYING OUT THE INVENTION

Figure 1:
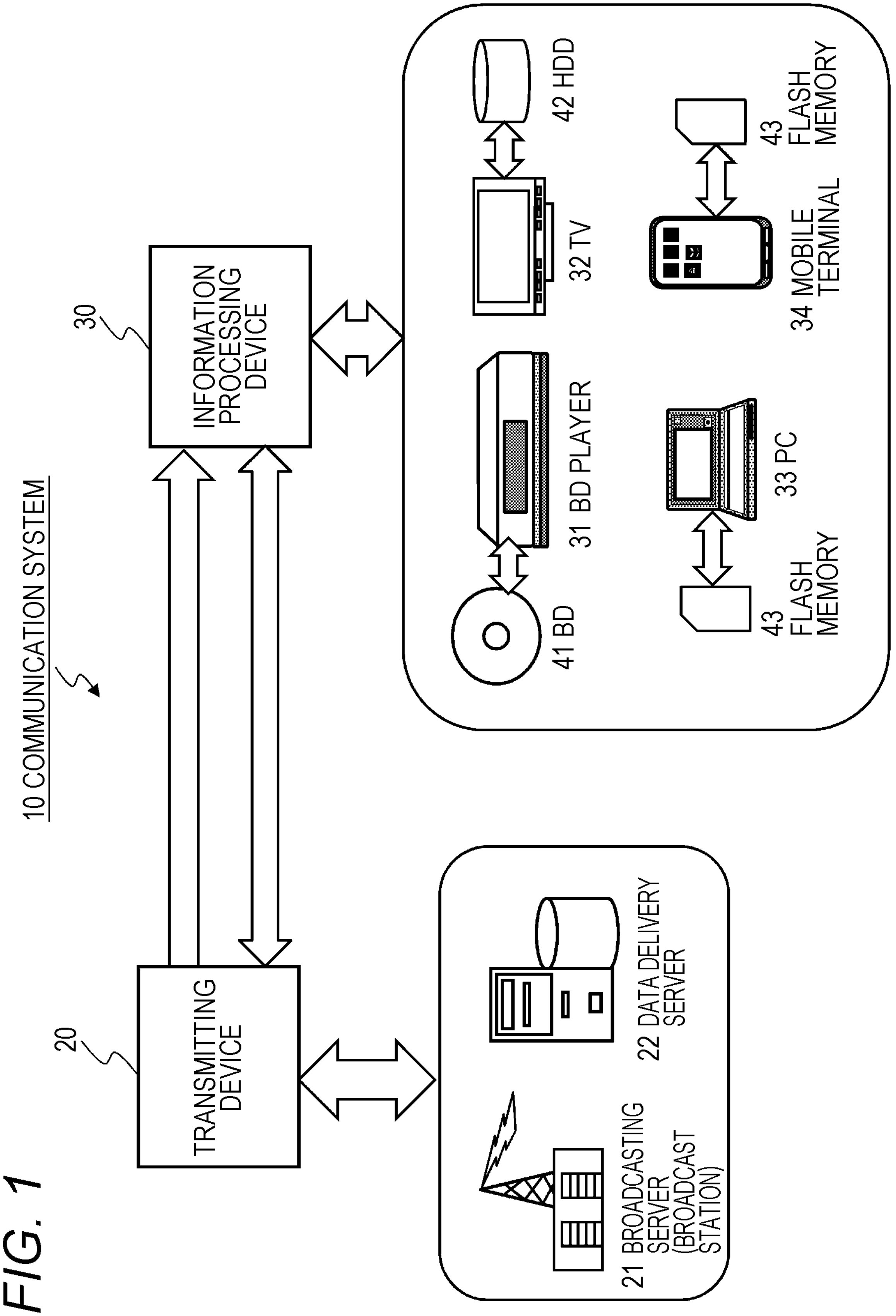
FIG. 1 is a diagram for describing a usage configuration example of an information processing device which executes a process of the present disclosure.

Hereinafter, an information processing device, an information processing method, and a program of the present disclosure will be described in detail with reference to the appended drawings. Further, the description will proceed in accordance with the following items.

1. Configuration example of communication system
2. MPEG media transport (MMT) format
3. BDAV format and SPAV format
4. Process in case where MMT format data is recorded in accordance with BDAV format
5. Playlist file corresponding to MMT format data
6. Clip information file corresponding to MMT format data
7. Full recording and partial recording of MMT format data
8. Configuration and process of information processing device which executes data recording process to information recording medium
9. Configuration, and process of information processing device which executes data reproduction process from information recording medium
10. Configuration example of information processing device
11. Conclusion of configuration of the present disclosure

[1. Configuration Example of the Communication System]

First, an example of a communication system which is a usage configuration example of an information processing device which executes the process of the present disclosure will be described with reference to FIG. 1.

An information processing device 30 illustrated in FIG. 1 includes a medium such as a Blu-ray (registered trademark) disc (BD), a flash memory, a hard disk (HDD), or the like installed therein, and executes a data recording process to the installed medium or a data reproduction process from the installed medium.

The data recorded in the medium by the information processing device 30 is, for example, transmission content which is provided by a transmitting device 20 such as a broadcast station (broadcasting server) 21 and a data delivery server 22. Specifically, it is a broadcast program provided by a television station and the like.

The transmission content is transmitted from the transmitting device 20 to the information processing device 30 via a broadcast wave or a network such as the Internet.

The information processing device 30 is, for example, a BD player 31, a television 32, a PC 33, a mobile terminal 34, or the like, and these information processing devices include various medium installed therein such as, for example, a Blu-ray (registered trademark) disc (BD) 41, an HDD 42, and a flash memory 43 and executes a data recording process to such mediums and a data reproduction process from such mediums.

Data transmission from the transmitting device 20 to the information processing device 30 is executed in accordance with an MPEG media transport (MMT) format.

The MMT format is a format specifying a data transfer scheme (transport port format) when encoded data which is content configuration data such as a video, an audio, or a subtitle is transmitted via a broadcast wave or a network.

The transmitting device 20 encodes content data, generates a data file including the encoded data and metadata of the encoded data, stores the generated encoded data in an MMT protocol (MMTP) packet specified in the MMT, and transmits the MMTP packet via a broadcast wave or a network.

Data provided from the transmitting device 20 to the information processing device 30 is constituted by guide information such as a program guide, notification information, control information, and the like in addition to reproduction target data such as a video, an audio, or a subtitle

[2. MMT Format]

As described above, the data transmission from the transmitting device 20 to the information processing device 30 is executed in accordance with the MMT format.

The MMT format will be described with reference to FIG. 2 and subsequent drawings.

Figure 2:
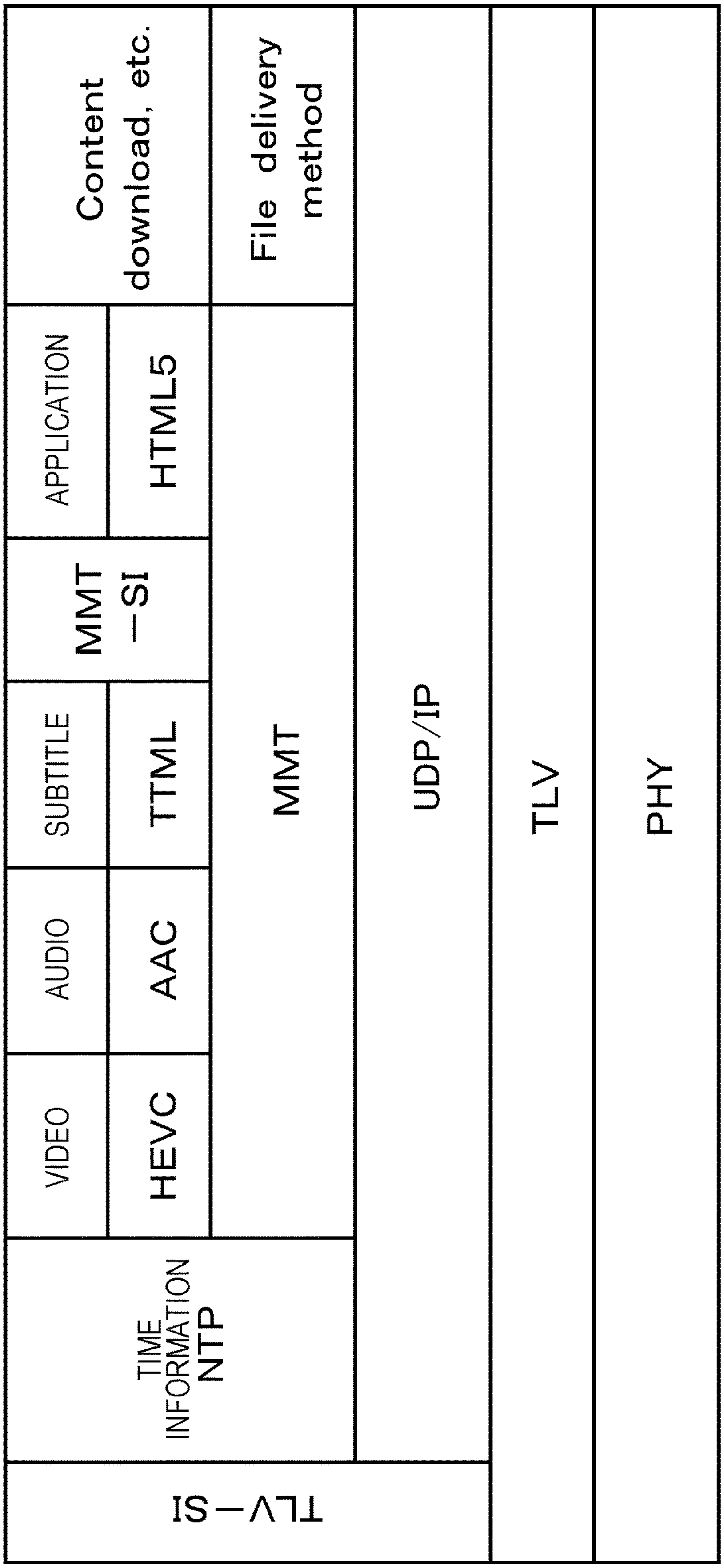
FIG. 2 is a diagram for describing an MMT format.

FIG. 2 is a diagram illustrating an MMT format stack model.

In the MMT stack model illustrated in FIG. 2, there is a physical layer (PHY) as the lowermost layer. The physical layer is divided into a broadcasting) layer that performs a process of a broadcast system and a broadband layer that performs a process of a network system.

The MMT enables a process using two communication networks, that is, a broadcasting system and a network system.

As a layer higher than the physical layer (PHY), there is a type length value (TLV) layer. The TLV is a format specifying layer specifying a multiplexing scheme of an IP packet. A plurality of IP packets are multiplexed and transmitted as a TLV packet. A TLV-SI is a transmission layer of signaling information according to the TLV format.

The signaling information is constituted by setting information necessary for the information processing device 30 side to receive content (program), guide information such as a program guide, notification information, control information, and the like.

Signaling information stored in the TLV packet which is generated by a process in the TLV layer is the TLV-SI, and signaling information stored in the MMTP packet which is a packet generated in accordance with an MMT protocol (MMTP) is an MMT-ST illustrated on the top layer.

A UDP/IP layer is set above the TLV layer.

In detail, the UDP/IP layer can be divided into an IP layer and a UDP layer, and it is a layer specifying transmission in which a UDP packet is stored in a payload of an IP packet.

An MMT layer and a File delivery method layer are set above the UDP/IP layer.

It is a setting which both a scheme in which the MMTP packet is stored in the IP packet and transmitted and a scheme of transmitting data as an IP packet using the File delivery method which is a data transmission scheme without using the MMTP packet can be used.

The following layers are set above the MMT layer:

video data which is encoded video data according to high efficiency video coding (HEVC) which is an image coding standard;

audio data which is encoded audio data according to advanced audio coding (AAC) which is an audio encoding standard;

subtitle data which is encoded subtitle data according to a timed text markup language (TTML) which is a subtitle encoding standard;

signaling information (MMT-SI) transmitted using the MMTP packet; and further, various applications described in accordance with a hyper text markup language 5 (HTML 5).

Each of such data is stored in the MMTP packet and transmitted.

The signaling information (MMT-SI) is signaling information transmitted through the MMTP packet and is constituted by setting information necessary for the information processing device 30 side to receive content (program), guidance information such as a program guide, notification information, control information, and the like.

Further, time information (network time protocol (NTP) is absolute time information and is directly stored in the UDP packet and transmitted.

A data service of delivering other data, content downloading, and the like can be performed using a file delivery method different from the MMT.

As illustrated in FIG. 2, a video, an audio, a subtitle, the signaling information (MMT-SI) including various notification information or control information, or an application are transmitted through the MMTP packet.

A specific configuration example of the MMTP packet will be described with reference to FIG. 3.

Figure 3:
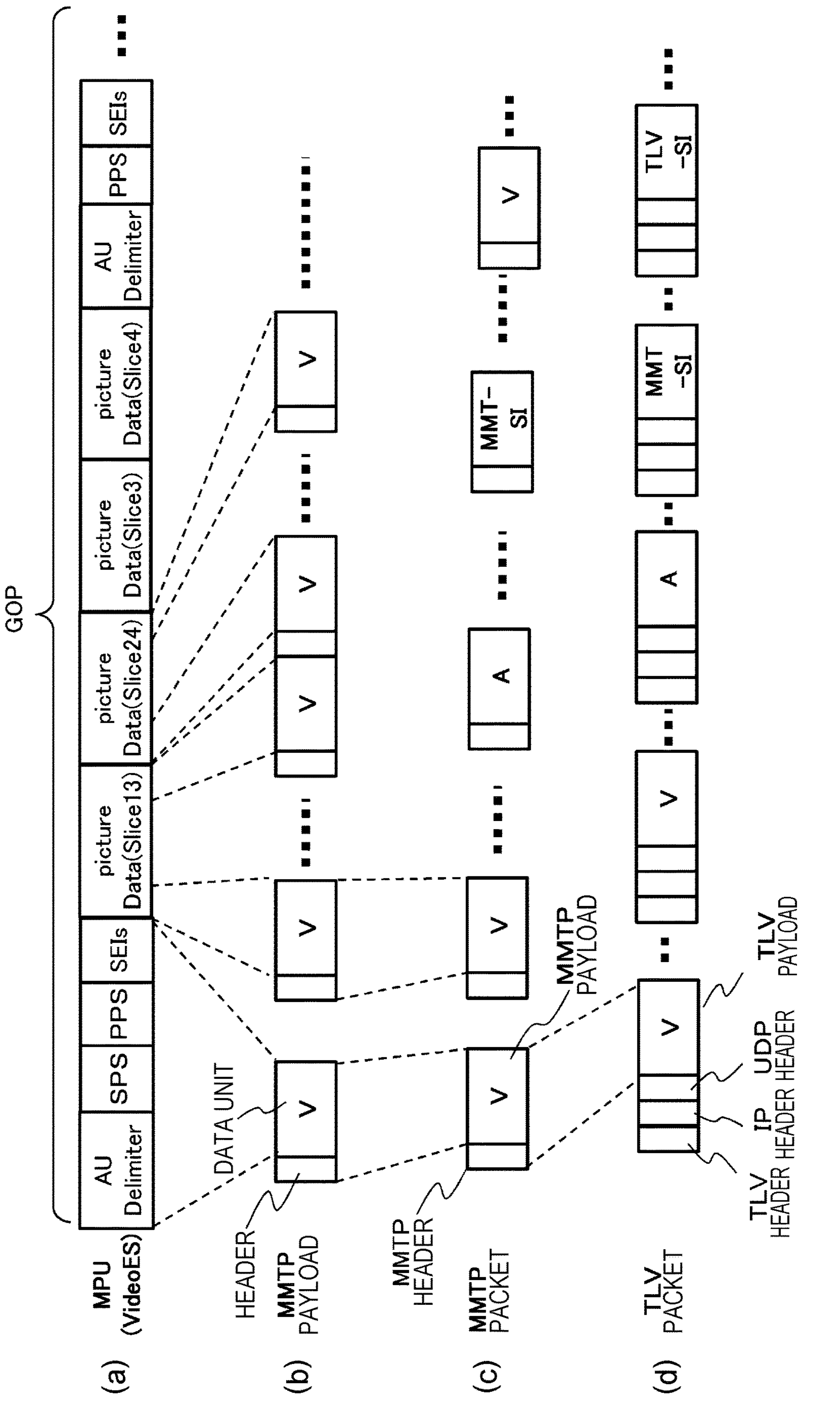
FIG. 3 is a diagram for (describing an example of a video data storage configuration according to an MMT format.

FIG. 3 illustrates a data configuration example of the following four types.

(a) a media presentation unit (MPU);

(b) an MMTP payload;

(c) an MMTP packet; and (d) a TLV packet.

(d) The TLV packet is a packet transmitted via a broadcast wave or a network, and header information of each of a UDP header, an IP header, and a TLV header is set in the TLV packet. The TLV packet is set as an individual packet for each data type.

In other words, one type of data is stored in a TLV payload of one TLV packet. Specifically, data of any one type of, for example, a video (V), an audio (A), a subtitle (S), the signaling information (MMT-SI) stored in the MMTP packet, the signaling information (TLV-SI) transmitted through the TLV packet is stored in a separate TLV packet.

An example of the TLV payload that is the payload of the TLV packet is the MMTP packet illustrated in FIG. 3(*c*).

The MMTP packet illustrated in FIG. 3(*c*) is constituted by an MMTP header and an MMTP payload.

One type of data is stored in the MMTP payload of one MMTP packet. Specifically, data of anyone type of, for example, the video (V), the audio (A), the subtitle (S), and the signaling information (MMT-SI) stored in the MMTP packet is stored in an individual MMTP packet.

FIGS. 3(*a*) and 3(*b*) illustrate a detailed configuration of video data stored in the MMTP payload of the MMTP packet illustrated in FIG. 3(*c*).

FIG. 3(*b*) illustrates only a part in which the MMTP payload is the video data (V) in the MMTP packet illustrated in FIG. 3(*c*).

The MMTP payload illustrated in FIG. 3(*b*) is constituted by a header and a data unit.

As illustrated in FIG. 3(*a*), video data and the following various kinds of parameters are stored in the data unit:

an access unit delimiter (AU delimiter);

a sequence parameter set (SPS);

a picture parameter set (PPS); and supplemental enhancement information (SEIs).

These parameters are parameters used for image display.

A media presentation unit (MPU) illustrated in FIG. 3(*a*) is one data processing unit in the MMT format. An example illustrated in FIG. 3(*a*) is an example of the MPU of the video data which is the same unit as a Group of Pictures (GOP) serving as a so-called encoding and decoding processing unit.

As described above, for example, as illustrated in FIG. 3(*a*), the video data is divided into parameters and image configuration data specified in the MMT format, stored in the MMTP payload illustrated in FIG. 3(*b*), and configured as the MMTP packet illustrated in FIG. 3(*c*).

Further, the MMTP packet is set as a payload of the TIN packet illustrated n FIG. 3(*d*), and the TLV packet is transmitted via a broadcast wave or a network.

Further, for each piece of data such as an audio or a subtitle and each piece of data of the MMT-SI, an MMTP packet and a TLV packet of each data type unit are set and transmitted.

The TLV-SI is stored in the TLV packet and transmitted instead of the MMTP packet.

[3. BDAV Format and SPAV Format]

Next, a BDAV format and an SPAV format which are record data formats in a case where delivery content according to the MMT format is recorded in a medium such as, for example, a Blu-ray (registered trademark) disc (BD), a flash memory, or an HD and reproduced will be described with reference to FIG. 4 and subsequent drawings.

In a case where content such as a video, an audio, or a subtitle is reproduced from medium such as, for example, a Blu-ray (registered trademark) disc (BD), a flash memory, or an HD, reproduction control information and index information for carrying out a process of reproducing such content are necessary. The reproduction control information and the index information are generally referred to as a database file.

The reproduction control information and the index information differ depending on a reproducing application which executes the process of reproducing record data in a medium.

As described above, there are BDMV and BDAV standard (data recording formats) as the current recording/reproducing application standard (=data recording format) The application standards have been established mainly as a data recording/reproducing application standard using a Blu-ray (registered trademark) disc (BD).

Further, the BDMV and the BDAV are data recording/reproducing application standards and data recording formats (standards) mainly using a BD, but these standards are not limited to a BD and can be applied to data recording/reproducing using a medium other than a BD such as a flash memory.

The BDMV is an application standard developed for BD-ROMs in which, for example, movie content or the like is recorded in advance and is widely used mainly in non-rewritable BD-ROMs such as package content.

On the other hand, the BDAV is a standard developed to be applied mainly to a data recording/reproducing process using a rewritable BD-RE type disc, a BD-R type disc in which recording can be performed only once, or the like. For example, the BDAV is used for recording and reproducing videos captured by a user using a video camera and the like or recording and reproducing television broadcasts.

In order to perform a content reproduction process from the medium in which the delivery content according to the MMT format is recorded using a BDAV format-compatible reproducing application, it is necessary to perform data recording in accordance with the BDAV format.

As described above, in the BDAV format, the playlist file, the clip information file, and the like are specified as a recording file of the reproduction control information, and the BDAV-compatible reproducing application records the data reproduction process using recording information such as the reproduction control information file (database file).

Figure 4:
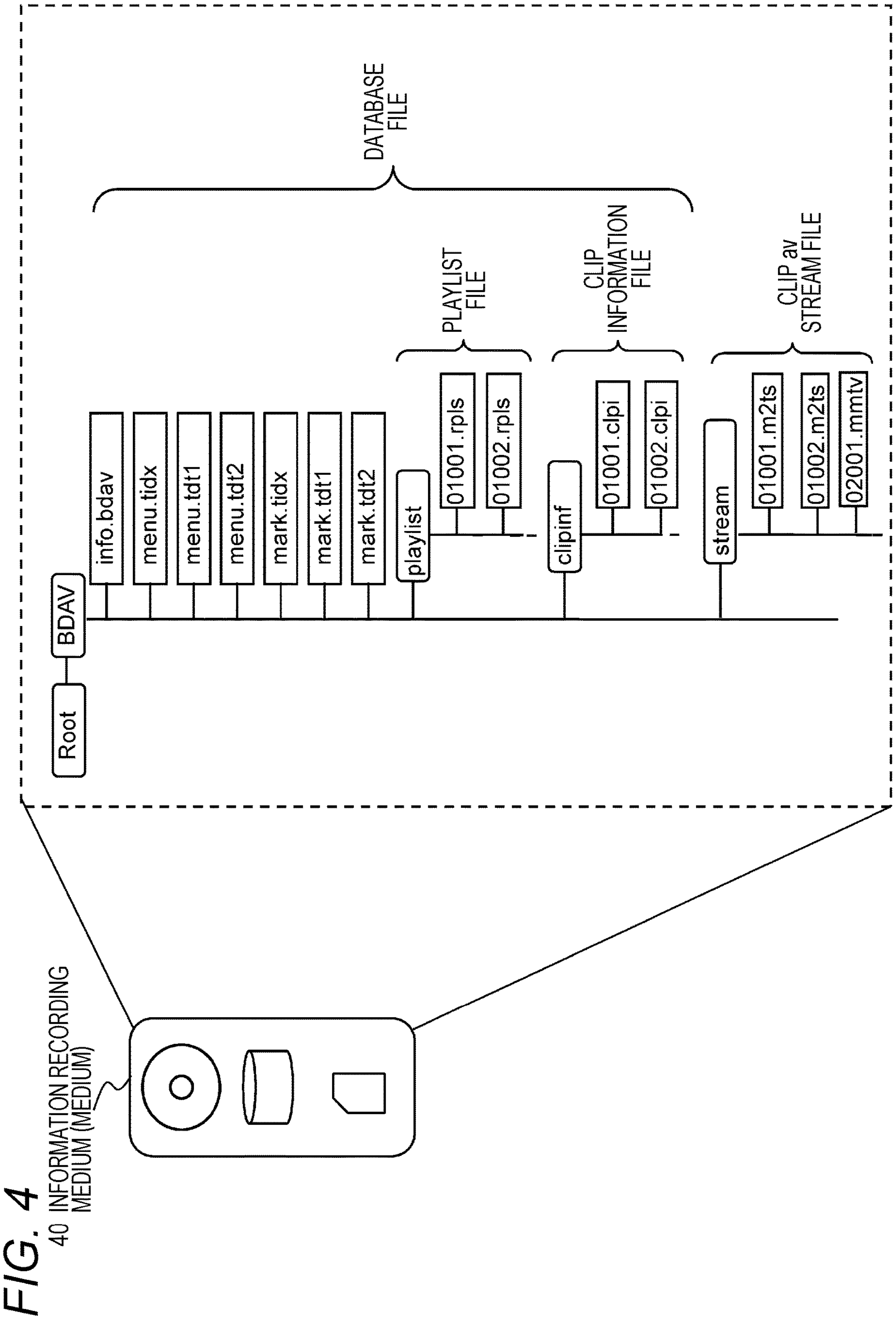
FIG. 4 is a diagram for describing a BDAV format.

FIG. 4 is a diagram illustrating a directory configuration example of data recorded in an information recording medium (medium) 40 in accordance with the BDAV format.

Storage files of various management information, reproduction control information, and reproduction target data are set in a directory as illustrated in FIG. 4.

The management information file is constituted by, for example, an info file (info), a menu file (menu), a mark file (mark), and the like illustrated in FIG. 4. The files store management information of titles or the like shown to a user mainly.

Further, for example, the following files are recorded as the reproduction control information file:

a playlist file (playlist);

a clip information file (clipinf).

Further, a clip AV stream file (stream) is recorded as the reproduction data storage file.

The playlist file is a file specifying a reproduction order of content, for example, in accordance with program information of a reproduction program designated by a title, and includes, for example, designation information of the clip information file in which reproduction position information or the like is recorded, or the like.

The clip information file is a file specified by the playlist file and includes reproduction position information of the clip AV stream file or the like.

The clip AV stream file is a file storing AV stream data serving as a reproduction target. The clip AV stream file is constituted by a packet storing each piece of data such as a video, an audio, or a subtitle, or the like which is a reproduction target.

Further, broadcast data and network delivery information of the related art are MPEG-2 TS format data constituted by a transport stream (TS) packet, but data including high definition images such as a 4K image, an 8K image, or the like in the future is expected to be MMT format data constituted by an MMTP packet.

In FIG. 4, the following two types of stream files are illustrated as the clip AV stream file (stream):

a stream file (nnnnn.m2ts) including MPEG-2 TS format data constituted by the TS packet; and MMT format data (nnnnn.mmtv) constituted by the MMTP packets.

The directory example illustrated in FIG. 4 is a directory example having a setting in which data received by the information processing device 30 is recorded in a medium as the MPEG-2 TS format data without change in a case where the received data is the MPEG-2 TS format data, and the received data is recorded in a medium as the MMT format data in a case where the received data is the MMT format data.

This directory examples an example, and for example, in a case where the information processing device 30 has a format conversion function, the following processes may be performed.

In a case where the received data is the MMT format data, all clip AV stream files to be recorded in a medium are converted into the MPEG-2 TS format data and recorded by converting the MMT format into an MPEG-2 TS format.

On the other hand, when format conversion from the MPEG-2 TS format to the MMT format is performed, a process of converting all clip AV stream files recorded in a medium into the MMT format data may be executed.

These processes will be reviewed in the future.

The data files such as the management information file, the playlist file, and the clip information file are files storing management information, reproduction control information, and reproduction data attribute information applied to the reproduction process of a video, an audio, a subtitle, or the like which is reproduction data stored in the clip AV stream file and referred to as database files.

A sequence of reproducing content recorded in the information recording medium is as follows.

(a) First, a specific title is designated from the management information file by the reproducing application.

(b) A playlist associated with the designated title is selected.

(c) In accordance with the clip information specified in the selected playlist, an AV stream or a command serving as actual content data is read out, reproduction of the AV stream or a command execution process is performed.

Figure 5:
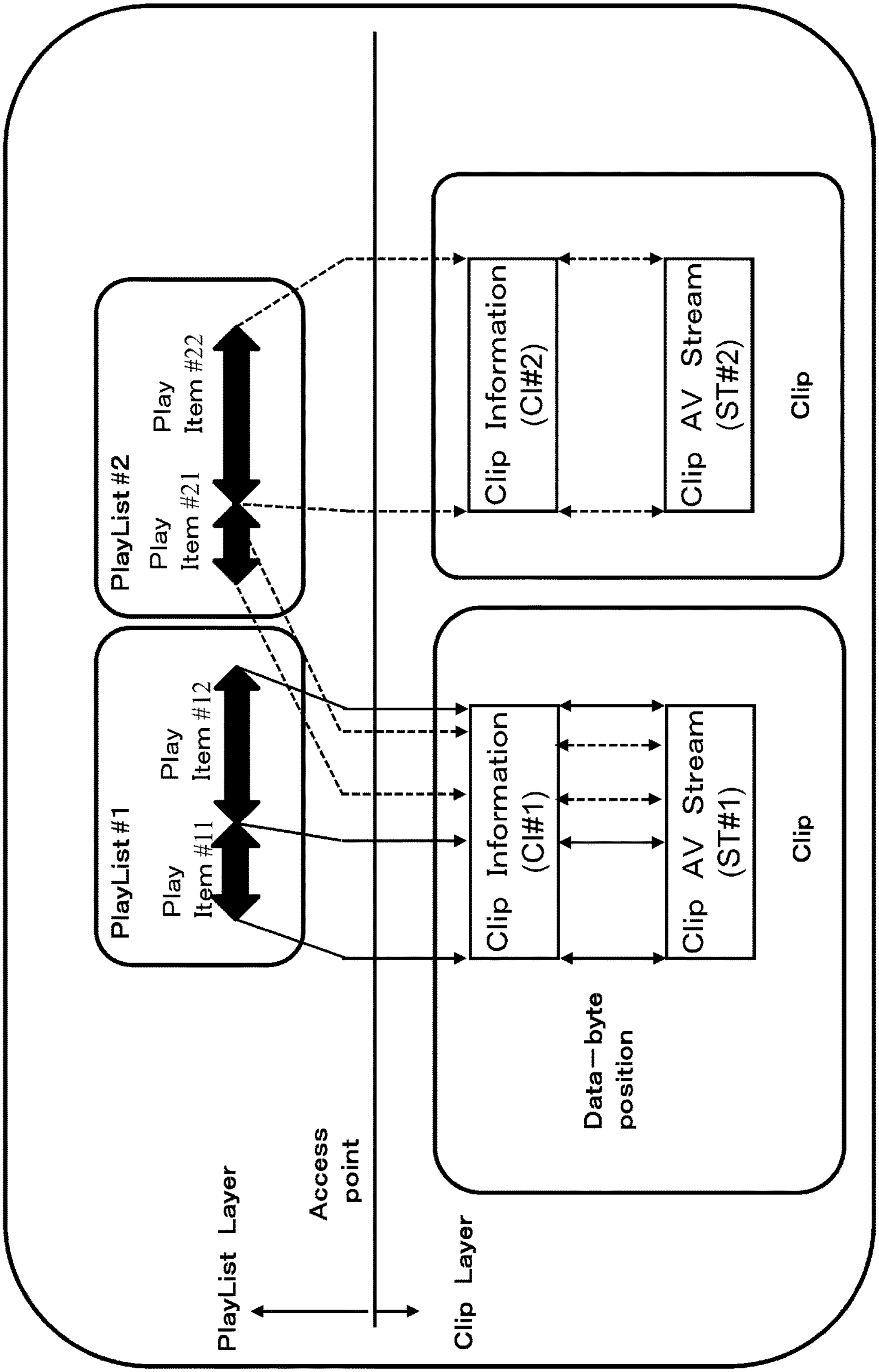
FIG. 5 is a diagram for describing a data reproduction process example according to a BDAV format.

FIG. 5 is a diagram for describing a correspondence relation of the following data recorded in the information recording medium (medium) 40:

a playlist file;

a clap information file; and a clip AV stream file.

An AV stream including reproduction target data such as a video, an audio, or a subtitle which is actual reproduction target data is recorded as the clip AV stream (Clip AV Stream) file, and the playlist (PlayList) file and the clip information (Clip Information) file are specified as the management information and the reproduction control information file of the AV stream.

As illustrated in FIG. 5, files of a plurality of categories are classified into the following two layers:

a playlist layer including the playlist (Playlist) file; and a clip layer including the clip AV stream (Clip AV Stream) file and the clip information (Clip Information) file;

Further, one clip information (Clip Information) file is associated with One Clip AV stream (Clip AV Stream) file, this pair is regarded as one object, and these are collectively referred to as a clip or a clip file.

Management information such as an EP map in which detailed information of data included in the clip AV stream file, for example, picture position information of MPEG data, and the like is recorded is recorded in the clip information file.

Further, the clip AV stream (Clip AV Stream) file is constituted by the TS packet in a case where it is MPEG-2 TS format data.

Further, the clip AV stream (Clip AV Stream) file is constituted by the MMTP packet in a case where it is MMT format data.

For example, the clip information (Clip Information) file stores management information for acquiring a reproduction start position or the like of storage data of the clip ATV stream file or the like, such as correspondence data of a data position of byte string data of the clip AV stream file and a reproduction time position such as an entry point (EP) which is a reproduction start point in a case where it is developed on a time axis.

The playlist includes information indicating an access point corresponding to a reproduction start position or a reproduction end position of a clip (Clip) with a time stamp which is information on the time axis.

For example, it is possible to acquire a data read position of the clip AV streak that is, an address serving as the reproduction start point with reference to the clip information file on the basis of the time stamp indicating a reproduction time elapsed position from a start point of content.

The clip information file (Clip Information file) is used for finding address information to start decoding of a stream in the clip AV stream file from the time stamp.

As described above, the playlist (PlayList) file includes designation information of a reproduction interval for reproducible data included in the clip (=clip information file+clip AV stream file) layer.

At least one play item (PlayItem) is set in the playlist (PlayList) file, and each play items includes the designation information of the reproduction interval for reproducible data included in the clip (=clip information file+clip AV stream file) layer.

Further, as described above, the clip AV stream (Clip AV Stream) file storing the reproduction target data is constituted by the TS packet in a case where it is the MPEG-2 TS format data of the related art.

Further, in the case of high definition video data such as a 4K image or an 8K image which is expected to be increasingly used in the future, it is constituted by the MMTP packet in a case where it is the MMT format data.

The MMT format and the MPEG-2 TS format will be described with reference to FIGS. 6 and 7.

First, the MPEG-2 TS format will be described with reference to FIG. 6.

The MPEG-2 TS format is a format specifying a data storage format (container format) of encoded data or the like when encoded data which is content configuration data such as a video, an audio, or a subtitle is stored in a recording medium (medium) or transmitted via a broadcast wave or a network.

The MPEG-2 TS format is a format standardized n ISO 13818-1 and is used for, for example, data recording in a Blu-ray (registered trademark) disc (BD) digital broadcasting, and the like.

Figure 6:
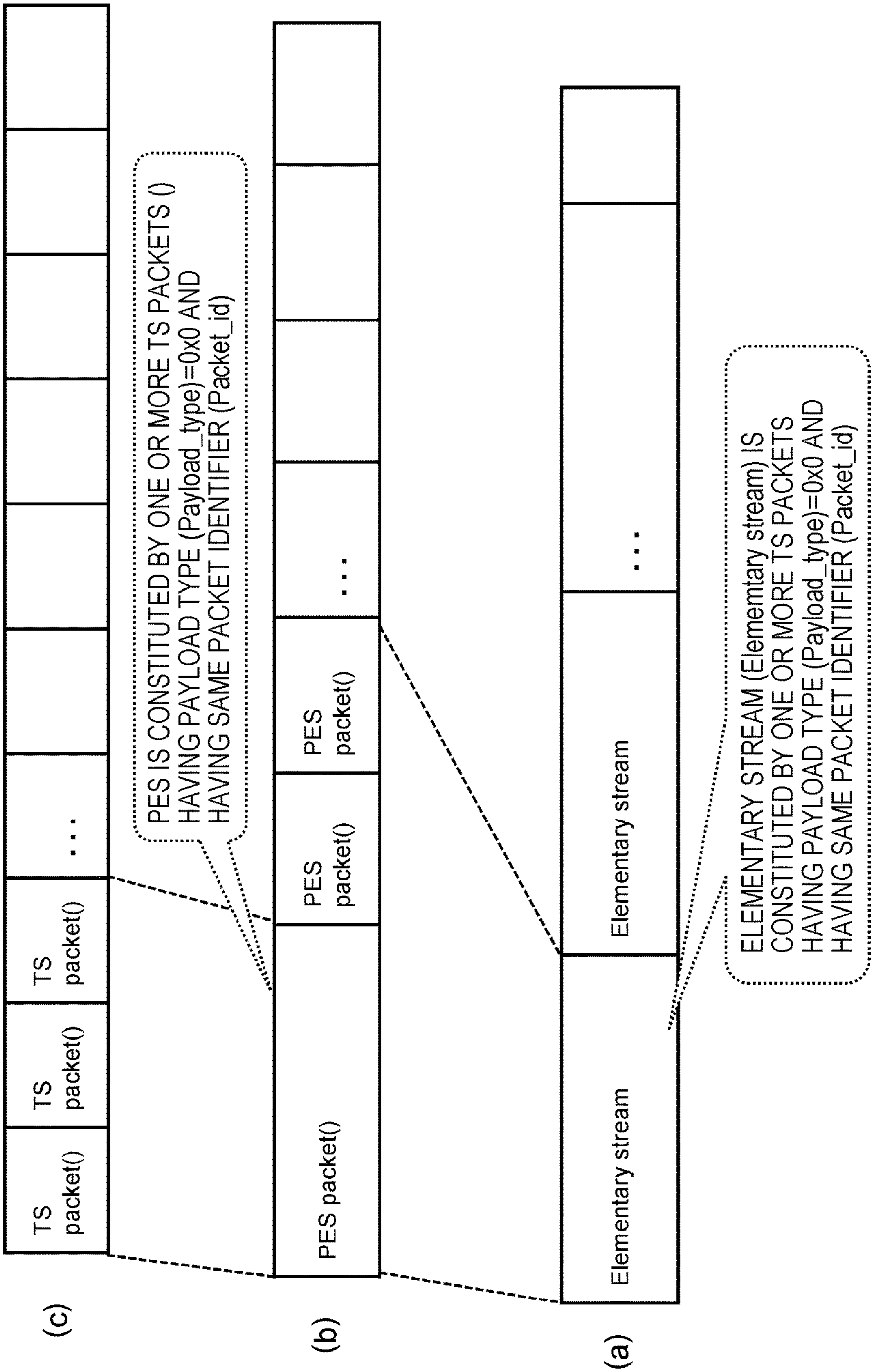
FIG. 6 is a diagram for describing an MPEG-2 TS format.

FIGS. 6(*a*) to 6(*c*) are diagrams illustrating a configuration of the MPEG-2 TS format data.

FIG. 6(*a*) illustrated at the bottom illustrates is a diagram illustrating an overall configuration of the MPEG-2 TS format data.

As illustrated in FIG. 6(*a*), the MPEG-2 TS format data is constituted by a plurality of elementary streams (Elementary streams).

The elementary stream (Elementary stream) is a unit which is set as one unit such as, for example, a video, an audio, or a subtitle, or the like.

As illustrated in FIG. 2(*b*), one elementary stream (Elementary stream) is constituted by one or more packetized elementary stream (PES) packets.

Specifically, one elementary stream (Elementary stream) is constituted by one or more PES packets having a payload type (Payload_type)=0x0 and the same packet identifier (Packet_id).

As illustrated in FIG. 6(*c*), one PES packet is constituted by one or more TS packets.

Specifically, one PES packet is constituted by one or more TS packets having a payload type (Payload_type)=0x0 and having the same packet identifier (Packet_id).

Unlike the MMTP packet, the TS packet has a fixed length, and a packet size of one TS packet is fixed to 188 bytes.

Next, the MMT format will be described with reference to FIG. 7.

Figure 7:
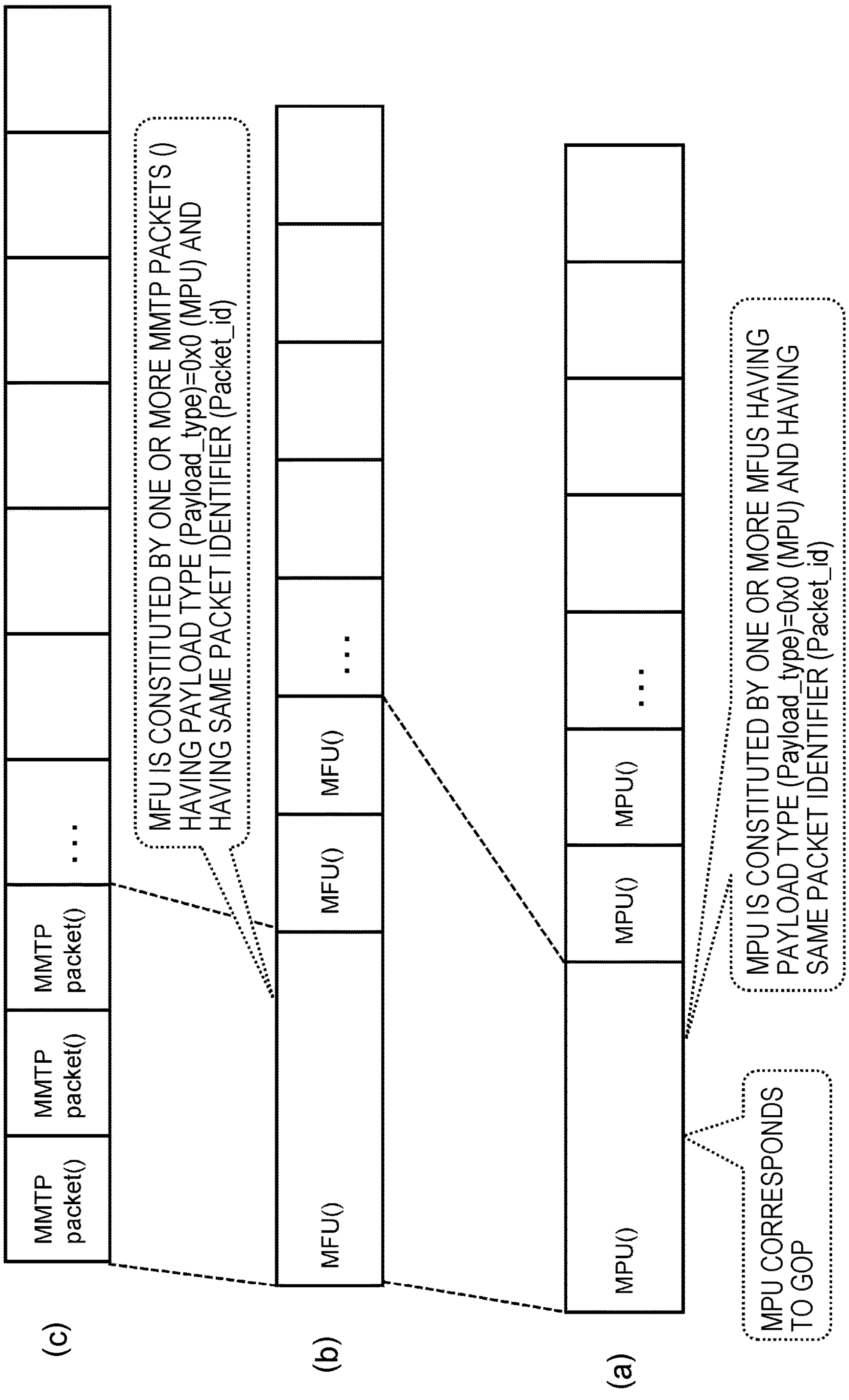
FIG. 7 is a diagram for describing an MMT format.

The MMT format has been described above with reference to FIG. 3, but an explanatory diagram of the MMT format illustrated in FIG. 7 is a diagram describing a correspondence relation with the MPEG-2 TS format described with reference to FIG. 6 to facilitate understanding thereof.

As described above, the MMT format is a format specifying a data transfer scheme (transport format) when encoded data which is content configuration data such as a video, an audio, or a subtitle, or the like is transmitted via a broadcast wave or a network.

FIG. 7 is a diagram for describing the MMT format which is a file format specified in ISO/IEC 23008-1.

FIGS. 7(*a*) to 7(*c*) illustrate a configuration of the MMT format data.

FIG. 7(*a*) illustrated at the bottom is a diagram illustrating an overall configuration of the MMT format data.

As illustrated in FIG. 7(*a*), the MMT format data is constituted by a plurality of medium presentation units (MPUs).

The MPU is a unit which is set as one unit of a video, an audio, a subtitle, or the like, for example. For example, in the case of an image, one MPU corresponds to one GOP which is one MPEG-compressed image unit.

As illustrated in FIG. 7(*b*), one MPU is constituted by one or more medium fragment units (MFUs).

Specifically, one MPU is constituted by one or more MFUs having a payload type (Payload_type)=0x0 (MPU) and the same packet identifier (Packet_id)).

One MFU is constituted by one or more MMTP packets as illustrated in FIG. 7(*c*).

Specifically, one MFU is constituted by one or more MMTP packets having a payload type (Payload_type)=0x0 (MPU) and the same packet identifier (Packet_id).

The MMTP packet has a variable length and can be set to various packet sizes.

Each of the MMTP packets constituted by a header (MMTP header) which stores attribute information or the like and a payload (MMPT payload) which stores actual data of an encoded image or the like.

Further, as a format similar to the BDAV format, there is an SPAV format. As described above, the BDMV and the BDAV are the data recording/reproducing application standard mainly using the BD. On the other hand, the SPAV format is a data recording/reproducing application standard mainly for a hard disk.

Here, both the BDAV format and the SPAV format are formats which can be used for recording/reproducing using various mediums such as a BD, a flash memory, and an HD.

Data recording/reproducing can be performed on SPAV format data using a process similar to the data recording/ reproducing process in the BDAV format. Here, the SPAV format is partially different from the BDAV format in a file name setting.

Figure 8:
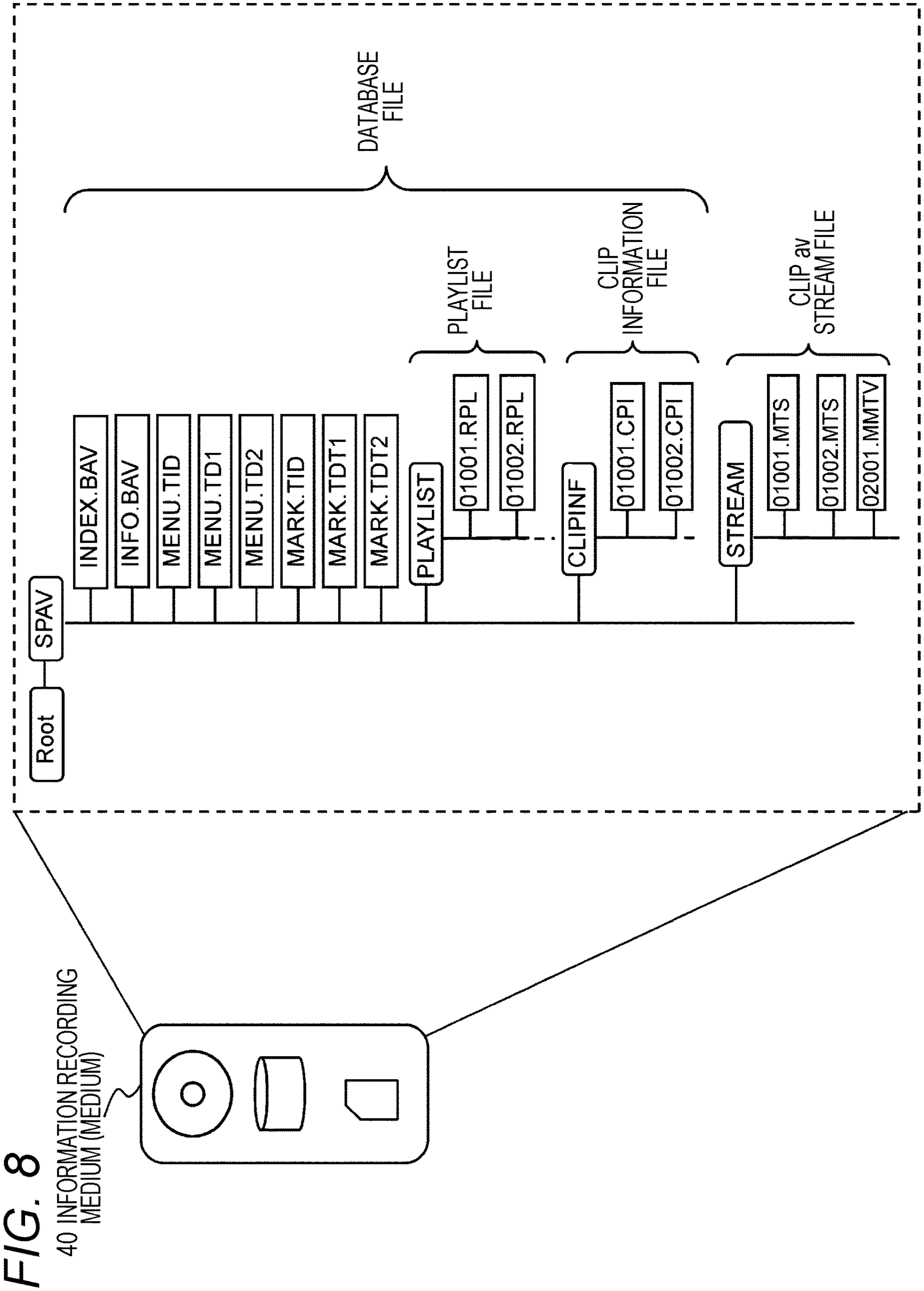
FIG. 8 is a diagram for describing an SPAV format.

FIG. 8 illustrates a directory configuration example of the SPAV format.

Storage files of various management information, reproduction control information, and reproduction target data are set in the directory of the SPAV format illustrated in FIG. 8, similarly to the BDAV format described above with reference to FIG. 4.

The management information file is constituted by, for example, an info file (INFO), a menu file (MENU), a mark file (MARK), and the like illustrated in FIG. 8. The files store management information of titles or the like shown to a user mainly.

Further, for example, the following files are recorded as the reproduction control information file:

playlist file (PLAYLIST); and clip information file (CLIPINF).

Further, a clip AV stream file (STREAM) is recorded as the reproduction data storage file.

As illustrated in FIG. 8, a setting of an extension of a directory name or each file of the SPAV format is different from the BDAV format described above with reference to FIG. 4.

Here, the data stored in each file and a role of each file are similar to those of the BDAV format.

In the following embodiment, a process example of recording the MMT format data as the BDAV format data and reproducing it will be described, but an embodiment to be described below can be applied to a process of recording the MMT format data as the SPAV format data and reproducing it as well.

[4. Process in Case Where MMT Format Data is Recorded in Accordance with BDAV Format]

Next, a process in a case where the MKT format data is recorded in accordance with the BDAV format will be described.

As described above, the MMT format is the data delivery format which is a format according to the stack described above with reference to FIG. 3.

On the other hand, the BDAV format is a data recording format for a medium, and as described above with reference to FIG. 4, the database file including the reproduction control information file such as the playlist file or the clip information file is specified.

Further, the BDAV format is the data recording format and is compatible with the data recording/reproducing application standard as well, and a process of reproducing data recorded in a medium in accordance with the BDAV format is performed using the BDAV format-compatible reproducing application.

Therefore, in order to record the delivery content according to the MMT format in the medium and perform the content reproduction process from the recorded medium using the BDAV format-compatible reproducing application, it is necessary to record the data in accordance with the BDAV format.

It is desirable that data of each of a video, an audio, a subtitle, or the like serving as the reproduction target data is recorded as the MMT format without change or may be converted into an MEG-2 TS file and recorded as a clip AV stream file as described above.

However, the BDAV format specifies a database file specific to the BDAV format such as the playlist file or the clip information file which are the reproduction control information files, and the BDAV-compatible reproducing application executes the data reproduction process using recording information of the reproduction control information files (database file).

As described above, the database file such as the playlist or the clip information file specified in the BDAV format is originally a file specified as a file which can be generated on the basis of delivery data of the MPEG-2 TS format.

Delivery data according to the MMT format which is a format different from the MPEG-2 TS format is recorded in the playlist file or the clip information file specified in the current BDAV format, but there are cases in which it is data which is unable to be used by the current BDAV-compatible reproducing application.

Therefore, in order to make it possible to record MMT format data in a medium and perform content reproduction using a BDAV format-compatible application, it is necessary to generate the playlist file or the clip information file corresponding to the MMT format data and record it in a medium when a process of recording the MMT format data in a medium is performed.

Further, when the MMT format data recorded in the medium is reproduced, it is necessary to perform reproduction using the playlist file or the clip information file corresponding to the MMT format data.

Figure 9:
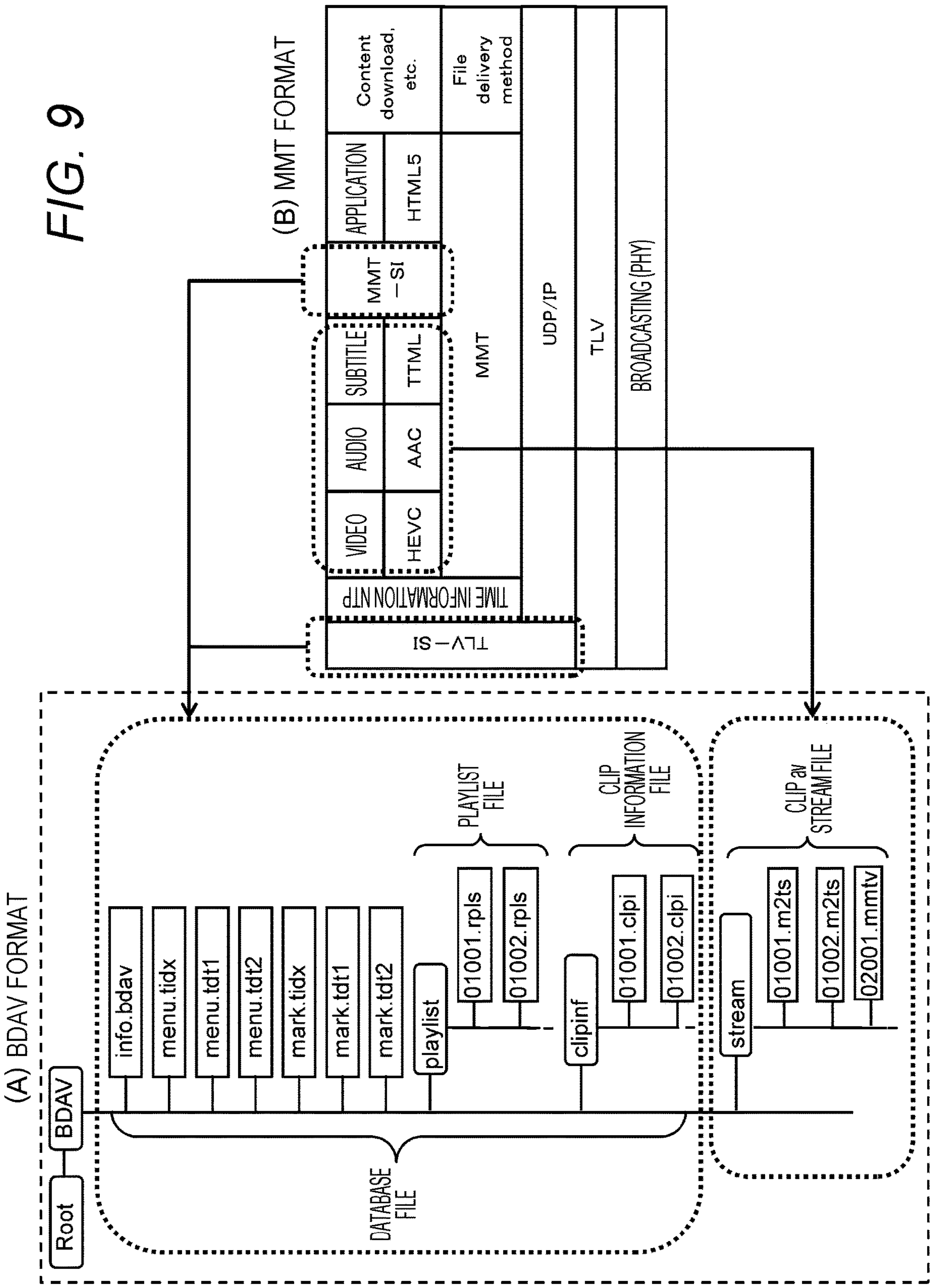
FIG. 9 is a diagram for describing a process example in a case where MMT format data is recorded as BDAV format data.

FIG. 9 is a diagram for describing a process example of generating the BDAV format data for medium recording on the basis of the delivery data according to the MMT format.

As illustrated in FIG. 9, data of each of a video, an audio, or a subtitle serving as the reproduction target is recorded as the clip AV stream file. It is possible to perform various processes such as a process of recording the MMT format without change and a process of converting the MMT format into the TS format and recording it on the reproduction target data.

On the other hand, the management information file specified in the BDAV format, the database files such as the playlist file or the clip information file are not included in the MMT format.

As described above with reference to FIG. 2, the MMT format data includes the setting information necessary for receiving content, guide information such as a program guide, notification information, control information, and the like.

The signaling information stored in the TLV packet which is generated by a process in the TLV layer is the TLV-SI, and signaling information stored in the MMTP packet which is a packet generated in accordance with an MMTP is an MMT-SI.

In the information processing device 30 which receives the MMT format data and records the received data in a medium, it is necessary to select information to be recorded in the database file of the BDAV format from the signaling information such as the TLV-SI and the MMT-SI included in the MMT format and generate the playlist file, the clip information file, or the like specified in the BDAV format.

Various data is recorded in the playlist file or the clip information file specified in the BDAV format as the reproduction control information of the clip AV stream file. For example, attribute information of content stored in the clip AV stream file is recorded.

As described above with reference to FIG. 4, the following two types of stream files are included in the clip AV stream file (stream) storing the reproduction target data such as a video and an audio:

a stream file (nnnnn.m2ts) including MPEG-2 TS format data constituted by the TS packet; and MMT format data (nnnnn.mmtv) constituted by the MMTP packets.

As described above with reference to FIG. 4, the directory example illustrated in FIG. 4 is a directory example having a setting in which data received by the information processing device 30 is recorded in a medium as the MPEG-2 TS format data without change in a case where the received data is the MPEG-2 TS format data, and the received data is recorded in a medium as the MMT format data in a case where the received data is the MMT format data.

As described above, for example, in a case where the MMT format data constituting program content received from a broadcast station is recorded in accordance with the BDAV format illustrated in FIG. 4, the MMT format data (nnnnn.mmtv) constituted by the MMTP packet illustrated in FIG. 4 is recorded as the clip AV stream file (stream).

As described above with reference to FIGS. 3 to 7, the MMT format data (nnnnn.mmtv) is data having a format different from the MPEG-2 TS format data.

Therefore, it is necessary for the playlist file or the clip information file which is a generation control information file applied to reproduction of the MMT format data (nnnnn.mmtv) to have a data configuration for realizing reproduction of the MMT format data (nnnnn.mmtv). The playlist file or the clip information file applied to the reproduction of the MPEG-2 TS format data (nnnnn.m2ts) of the related art is unable to be used without change.

Figure 10:
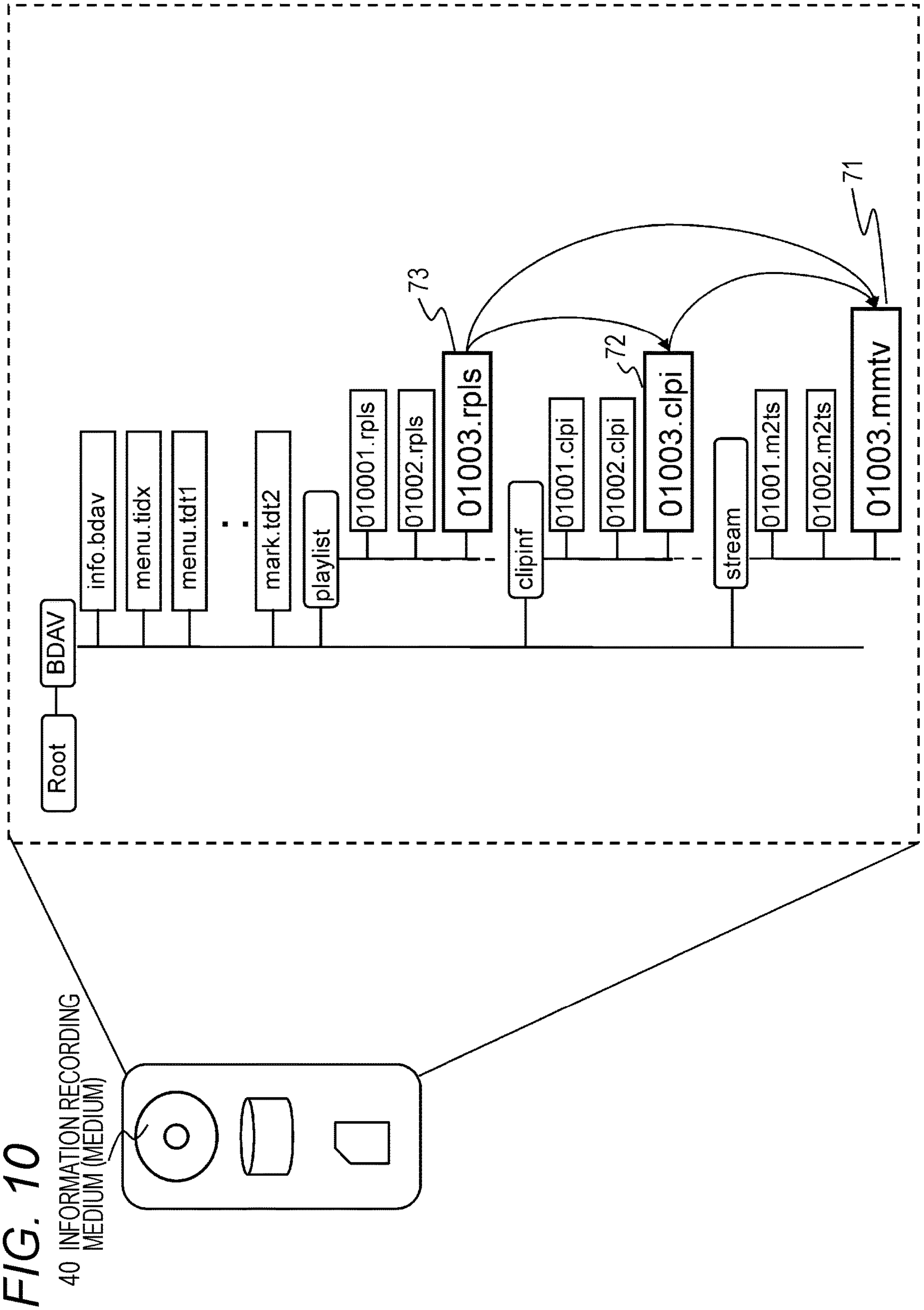
FIG. 10 is a diagram for describing a process example in a case where MMT format data is recorded as BDAV format data.

For example, in a case where MMT format data constituting program content transmitted from the transmitting device 20 such as the broadcasting server (broadcast station) 21 as received and recorded in a medium (information recording medium) such as the BD, the flash memory, or the HD, the information processing device 30 such as the television 32 illustrated in FIG. 1 executes the recording process for an MMT format data-stored clip AV stream file (nnnnn.mmtv) 71 storing data according to the MMT format as the clip AV stream file in the BDAV directory illustrated in FIG. 10.

In parallel to the recording process for the MMT format data-stored clip AV stream file (nnnnn.mmtv) 71, it is necessary for the information processing device 30 such as the television 32 to record the reproduction control information for enabling the MMT format data-stored clip AV stream file (nnnnn.mmtv) 71 to be reproduced using the BDAV recording/reproducing application.

Specifically, it is necessary to generate a clip information file (nnnnn.clpi) 72 and a playlist file (nnnnn.rpls) 73 corresponding to the MMT format data-stored clip AV stream file 71 illustrated in FIG. 10 and record them in a medium (a BD, a flash memory, an HD, or the like).

In a case where the MMT format data-stored clip AV stream 71 recorded in the medium is reproduced, it is possible to perform the reproduction process using the clip information file (nnnnn.clpi) 72 and the playlist file (nnnnn.rpls) 73 corresponding to this MMT format data-stored clip AV stream file 71.

However, as described above, data which is delivery data of a broadcast station and delivered in accordance with the MMT format does not include all pieces of recording data of the playlist file and the clip information file specified in the BDAV format.

Further, the MMT format data-stored clip AV stream file 71 has a data format different from the MPEG-2 TS format data, and has a problem in that a proper reproduction process is unable to be executed using a playlist file or a clip information file having data of the same format at the playlist file or the clip information file corresponding to the MPEG-2 TS format data.

Therefore, in order to record the MMT format data in the medium and perform content reproduction using the BDAV format-compatible application, it is necessary to generate a playlist file or a clip information file having a data format specific to the MMT format data capable of performing reproduction control for the MMT format data-stored clip AV stream file 71 and record the generated playlist file or clip information file in the medium.

A specific process will be described below.

[5. Playlist File Corresponding to MMT Format Data]

First, the playlist file corresponding to the MMT format data will be described with reference to FIG. 11 and subsequent drawings.

As described above, information related to data reproduced by applying the playlist is recorded in the playlist file. Specifically, for example, information related to a play item applied to the reproduction process of content and further designation information of the clip information file in which the reproduction position information or the like is recorded, and the like are included.

FIG. 11 is a diagram illustrating a data configuration (syntax) of [PlayList] recorded in one playlist (PlayList) file.

Main record data of [PlayList] illustrated in FIG. 11 will be described.

A version number (version_number) indicates a version number of the playlist.

A length indicates the number of bytes from a byte immediately after the length field to the end of playlist file configuration data.

A PL_CPI type (PL_CPI_type) 101 is information indicating a CPI type in the clip information file which is referred to by the play item (PlayItem) specified in the playlist file.

The number of play items (number_of_PlayItems) 102 indicates the number of play items (PlayItem) specified in the playlist file.

The number of sub play items (number_of_SubPlayItems) 103 indicates the number of play items (PlayItem) specified in this playlist file.

Detailed information of each play item and sub play item is recorded in play item information (PlayItem( )) 104.

Details (syntax) of the play item information (PlayItem( )) 104 will be described later.

As described above, the PL_CPI type (PL_CPI_type) 101 is information indicating the CPI type in the clip information file which is referred to by the play item (PlayItem) specified in the playlist file.

Characteristic point information (CPI) is record data of the clip information file, and is, for example, data for acquiring a data address of a reproduction start point at which random access reproduction can be started.

Further, as the CPI specified in the BDAV format, there are different types of maps such as, for example, an EP map (EP_map) and a TU map (TU_map).

Both of these maps are correspondence data of reproduction time information (a presentation time stamp (PTS)) serving as a random access point, for example, and a source packet number (SPN) which is a packet identifier of a packet at that position and is map information which can be used for acquiring a packet storing reproduction data of a random access point.

Both the EP map and the TU map are map data in which random access point information is recorded, but the EP map is map data in which finer random access point information is recorded, and the TU map is map data in which random access point information rougher than that of the EP map is recorded.

In the BDAV format, two type maps of the EP map and the TU map are specified, but, currently, the TU map is rarely used, and only the EP map is used.

EP_map and TU_map include address information for finding a location of an entry point (EP) at which decoding is started in an AV stream.

The EP map will be described with reference to FIG. 12 and subsequent drawings.

As described above with reference to FIG. 5, the playlist includes the information indicating the access point corresponding to the reproduction start position or the reproduction end position of the clip (Clip) with the time stamp which is the information on the time axis.

The clip information file (Clip Information file) is used for finding address information to start decoding of a stream in the clip AV stream file from the time stamp.

Figure 12:
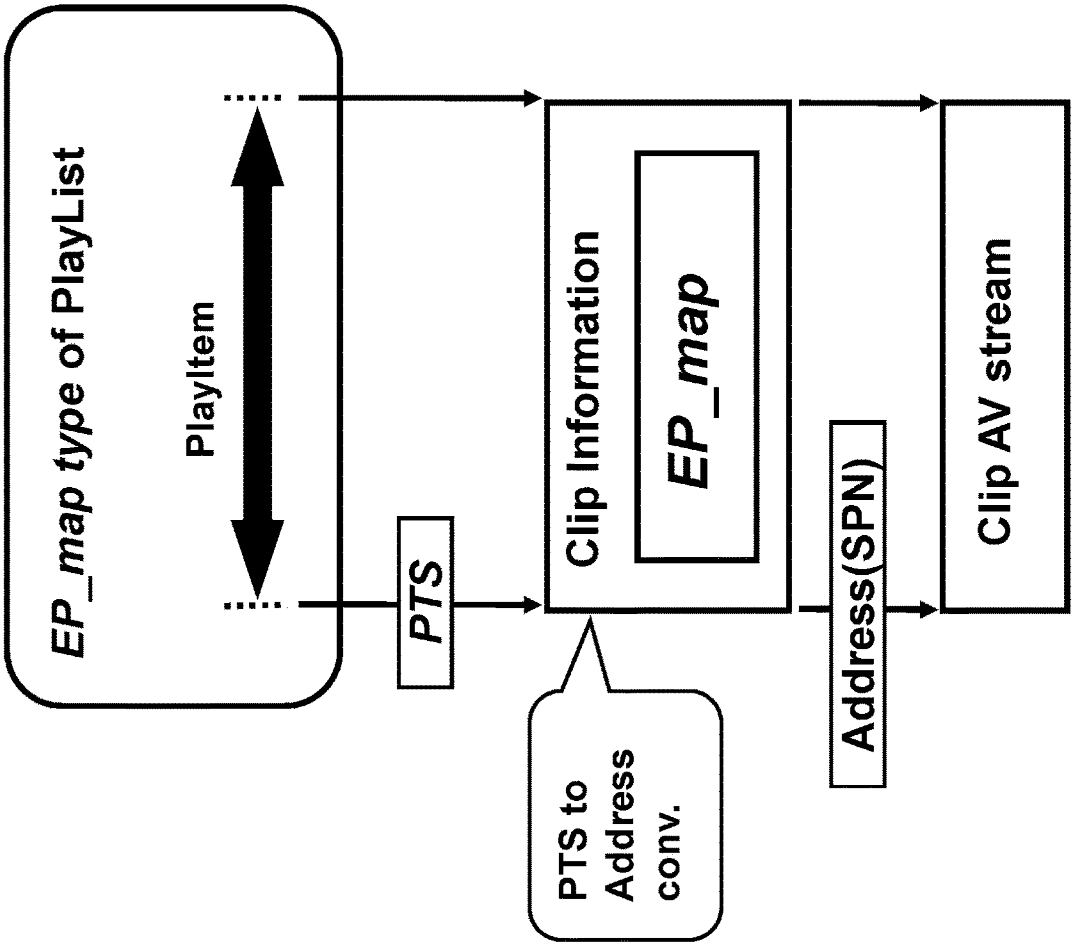
FIG. 12 is a diagram for describing an EP map.

Further, the clip information file (Clip Information file) has EP map (EP_map) illustrated in FIG. 12.

The access point information corresponding to the reproduction start position or the reproduction end position at which the random reproduction can be started in the reproduction data stored in the clip AV stream file is stored in the EP map.

In other words, correspondence data of a time stamp indicating the reproduction start position on the time axis and address information for acquiring a packet corresponding to the packet position information is recorded in the EP map.

Specifically, the following correspondence information is included:

(a) a presentation time stamp (PTS) indicating the access point on the time axis; and (b) a source packet number (SPN) corresponding to an address indicating a packet position in the clip AV stream file.

It is possible to acquire a corresponding address (SPN) on the basis of the time stamp with reference to the EP map having such correspondence information and find, for example, a deciding start point and the like which is the reproduction start position in the AV stream in accordance with the address (SPN).

Figure 13:
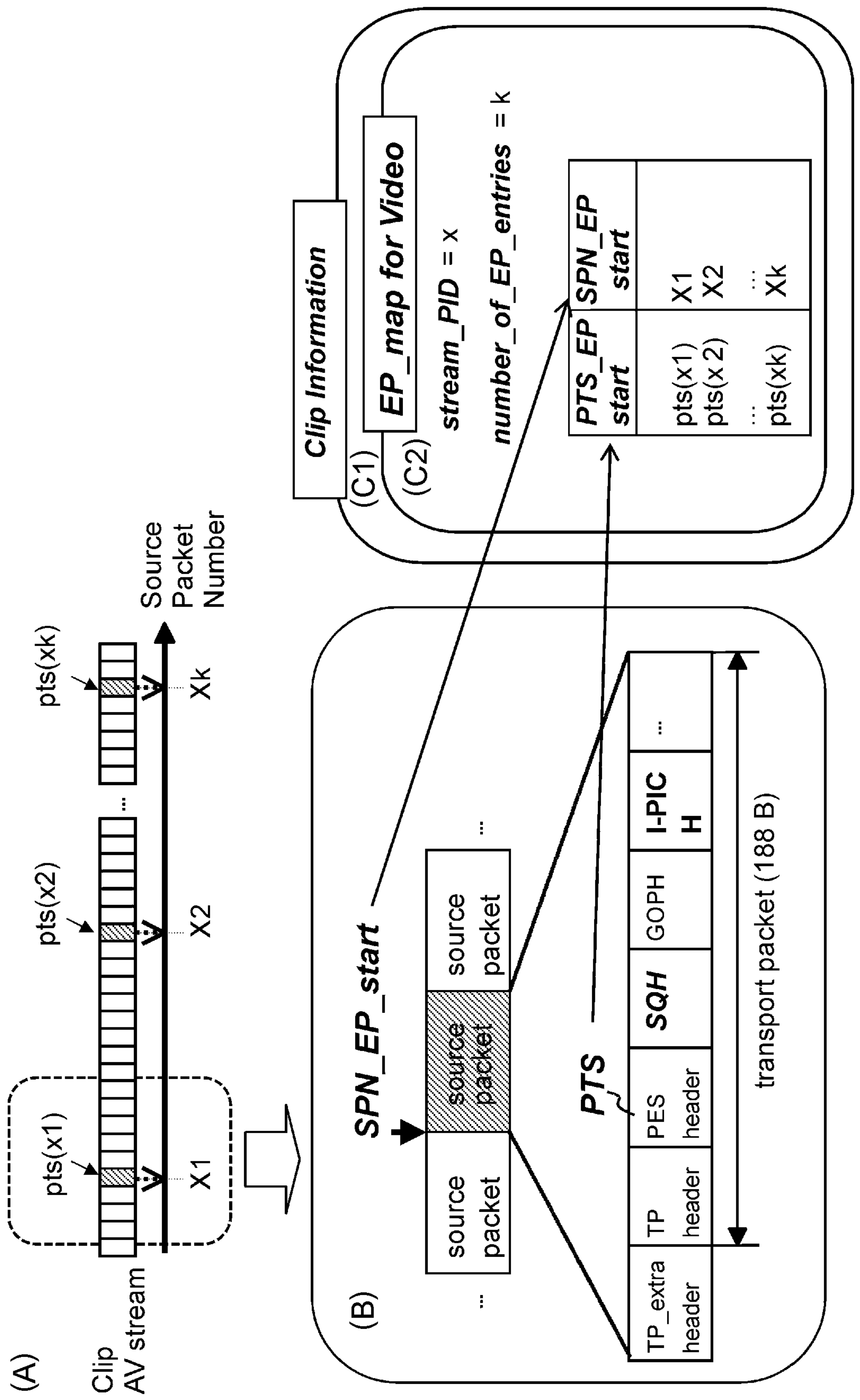
FIG. 13 is a diagram for describing an EP map.

FIG. 13 is a diagram for describing a specific configuration and a usage example of the EP map (EP_map). In the clip AV stream (Clip AV stream) illustrated in FIG. 13(A), a video stream including a source packet identified by a packet identifier (PID) is multiplexed. The video stream is distinguished for each source packet by a PID included in a header of a transport packet in the source packet.

The source packet of the video stream includes IPB pictures constituting MPEG data, that is, an I (Intra) picture, a P (Predictive) picture, and a B (Bidirectionally predictive) picture. The I picture is picture data which can be decoded independently, and in a case where the P picture and the B pictures are decoded, it is necessary to refer to I picture before and after them. For example, the reproduction start point by random access is set to a packet position having the I picture which can be decoded independently.

The EP map holds position information of the I picture as random accessible reproduction start point position information as correspondence data of the PTS and the SPN described above. In other words, the following correspondence information is included:

(a) a time stamp (PTS) indicating an access point on the time axis; and (b) a source packet number (SPN) corresponding to an address indicating the packet position in the clip AV stream file.

It is possible to obtain a location of the I picture which is the random accessible reproduction start position with reference to the EP map set as described above. The EP map (EP_map) is data included in the clip information file.

Detection of I picture position based on the EP map will be described with reference to FIG. 13. FIG. 13(A) illustrates a clip AV stream, and each rectangle indicates a source packet of 192 bytes.

In FIG. 13, a source packet including a first byte of the I (intra) picture is indicated by a hatched rectangle. A non-hatched white squire indicates a source packet including data which is not a random access point or a source packet including data of another stream.

For example, a source packet of a source packet number X1 including a first byte of a random accessible I picture of a video stream distinguished by PID=x is placed at a position of PTS=pts (x1) on a time axis of the clip AV stream. Similarly, a source packet including a first byte of a next random accessible I picture is a source packet of a source packet number X2 and is placed at a position of PTS=pts (x2).

As illustrated in FIG. 13(B), a source packet is configured such that a 4-byte header (TP_extra_header) is added to a 188-byte transport packet. The transport packet part includes a header portion (TP header) and a payload portion.

SPN_EP_start which is registration data of the EP map illustrated in FIG. 13(C2) indicates the source packet number (SPN) of the source packet including the first byte of the access unit (Access Unit) including the I picture starting from the sequence header (SQH).

Further, a series of numbers set in all packets in the clip AV stream file is the source packet number (SPN). In the clip AV stream file, a source packet number of a first source packet is zero, and a source packet number of a next packet is 1, and thereafter, the source packet number is incremented by one for each next packet.

As illustrated in FIG. 13(C2), the following data is recorded in the EP map (EP_map):

a stream PID (Stream_PID);

The number of EP entries (number_of_EP_entries);

a presentation time stamp EP start (PTS_EP_start); and a source packet number EP start (SPN_EP_start).

The stream PID (Stream_PID) is the packet identifier (PID) of the transport packet for transmitting the video stream.

The number of EP entries (number_of_EP_entries) is the number of entries of a pair of PTS_EP_start and SPN_EP_start included in EP_map.

The presentation time stamp EP start (PTS_EP_start) indicates the presentation time stamp (PTS) of the access unit starting from the random accessible I picture.

The source packet number EP start (SPN_EP_start) indicates the source packet number (SPN) including the first byte of the access unit which is referred to by a value of PTS_EP_start.

A value of the PID (packet identifier) of the video stream is stored in stream_PID, and EP_map( ) which is table information indicating a correspondence relation between PTS_EP_start and SPN_EP_start is generated.

For example, a table including correspondence data of the following PTSs and the following SPNs is described in the EP map of the video stream of PID=x:

PTS=pts (x1) and source packet number (SPN) X1;

PTS=pts (x2) and source packet number (SPN) X2; . . . , and

PTS=pts (xk) and source packet number (SPN) Xk.

The EP map (EP_map) including the table is stored in the clip information file corresponding to one clip AV stream.

The EP map (EP_map) including such data is referred to in order to specify the decoding start position, for example, when random access or the like is performed.

A method of calculating address information at which decoding of a stream is started in the clip AV stream file using EP_map when reproduction starts from a time x on the time axis in a clip will be described with reference to FIG. 14.

Figure 14:
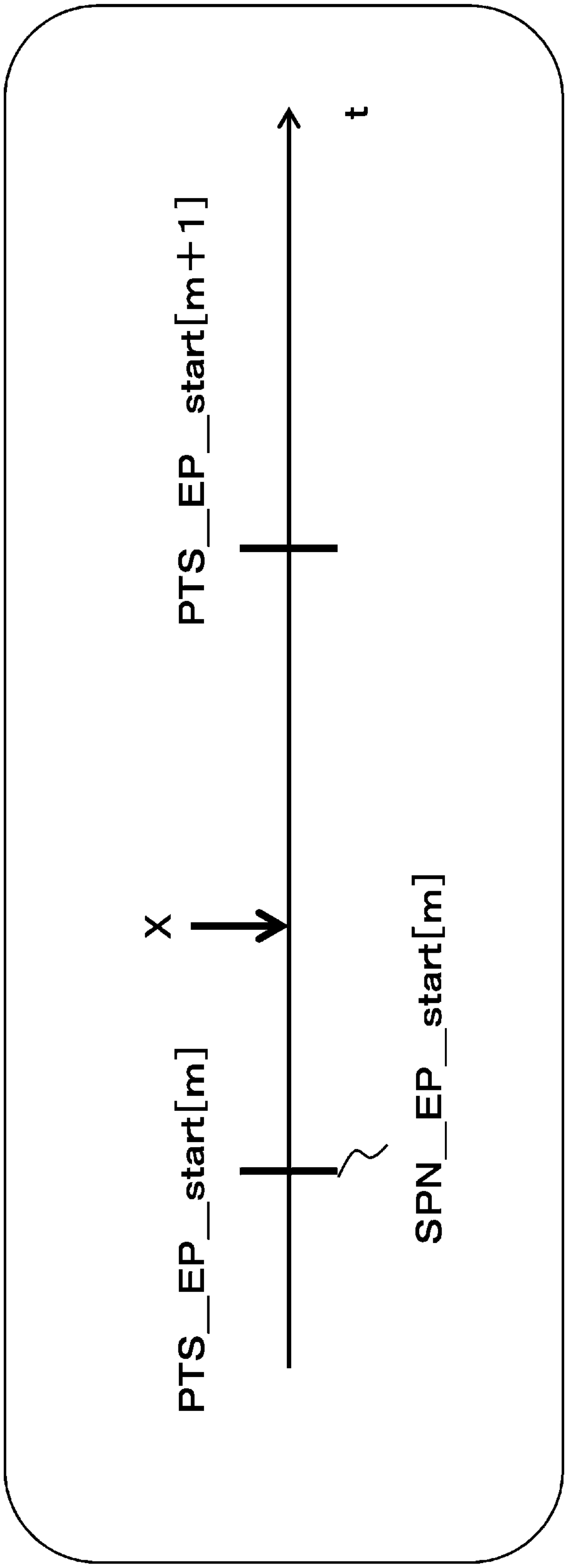
FIG. 14 is a diagram for describing an EP map.

As illustrated in FIG. 14, in a case where the playlist (PlayList) includes information specifying a reproduction start from the time x on the time axis in the clip, a time stamp [PTS_EP_start[m]] which is smaller than x and has the closest value is specified.

The source packet number [SPN_EP_start[m]] corresponding to the time stamp [PTS_EP_start[m]] is specified with reference to the EP map in the clip information file on the basis of the time stamp [PTS_EP_start[m]] specified in accordance with the playlist information.

As described above, the SPN that is the packet position information corresponding to the PTS, that is, [SPN_EP_start[m]] is acquired from the PTS which is the reproduction time information decided in accordance with the playlist information using the EP map.

It is possible to acquire the packet position [SPN_EP_start[m]] as the reproduction start point in the clip AV stream file, that is, the address information at which decoding is started, perform the decoding process, and perform the reproduction.

The usage example of the EP map described with reference to FIGS. 12 to 14 is a packet acquisition process example corresponding to the random access point using the MPEG-2 TS format data. As described above, in the MPEG-2 TS format data, the SPN that is the packet position information corresponding to the PTS, that is, [SPN_EP_start[m]] is acquired from the PTS which is the reproduction time information decided in accordance with the playlist information using the EP map.

However, since the MMT format data has a format different from the MPEG-2 TS format data, the random access point corresponding packet is unable to be acquired by executing a process similar to that of this MPEG-2 TS format data.

In other words, in a case where the reproduction target data is the MMT format data, it is necessary to perform data processing corresponding to the MMT format data different from the above-described process.

The EP map is specified in the clip information file, and it is necessary to record the MMT format data-compatible EP map for executing a random access point acquisition process corresponding to the MMT format data in the clip information file corresponding to MMT format data.

In other words, it is necessary to record the MMT format data-compatible EP map in the clip information file (nnnnn.clpi) 72 corresponding to the MMT format data-stored clip AV stream file 71 illustrated in FIG. 10. This specific example will be described later.

As described above, the EP map corresponding to the MPEG-2 TS format data and the EP map corresponding to the MMT format data are different data.

As described above with reference to FIG. 11, the PL_CPI type (PL_CPI_type) recorded in the playlist file illustrated in FIG. 11 is information indicating the CPI type in the clip information file which is referred to by the play item (PlayItem) specified in the playlist file.

The CPI is record data of the clip information file and is a region for recording data indicating a type of the EP map or the TU map for acquiring the data address of the reproduction start point (random access point).

Identification information of an MPEG-2 TS format data-compatible EP map or TU map is recorded in the PL_CPI type (PL_CPI_type) of the related art.

However, the EP map corresponding to the MMT format data is a map different from the MPEG-2 TS format data-compatible EP map of the related art.

Therefore, it is also necessary to set an identifier distinguishing it in the PL_CPI type (PL_CPI_type) of the playlist file.

FIG. 15 illustrates the following CPI type record data:

(1) CPI type record data of the related art (only MPEG-2 TS-compatible data is recorded); and (2) new CPI type record data (MPEG-2 TS-compatible data and MMT-compatible data are recorded).

Data illustrated in "(1) CPI type record data of the related art (only MPEG-2 TS-compatible data is recorded)" in FIG. 15 is data specified as the PL_CPI type (PL_CPI_type) of the playlist file of the related art.

A PL_CPI type (PL_CPI_type)=1 means that the CPI type in the clip information file which is referred to by the play item (PlayItem) specified in the playlist file is an MPEG-2 TS-compatible EP map.

A PL_CPI type (PL_CPI_type)=2 means that the CPI type in the clip information file which is referred to by the play item (PlayItem) specified in the playlist file is an MPEG-2 TS-compatible TU map.

As described above, only the MPEG-2 TS-compatible data is recorded in the CPI type record data of the related art.

"(2) New CPI type record data (MPEG-2 TS-compatible data and MMT-compatible data are recorded)" of FIG. 15 has a configuration in which a setting of the following bit value=3 is added to the above setting:

PL_CPI type (PL_CPI_type)=3.

A PL_CPI type (PL_CPI_type)=3 means that the CPI type in the clip information file which is referred to by the play item (PlayItem) specified in the playlist file is an MMT-compatible EP map.

As described above, as three CPI types of PL_CPI type (PL_CPI_type)=1 to 3 can be defined, three CPI types can be identified.

Next, the details (syntax) of the play item information (PlayItem( )) 104 recorded in [PlayList] described above with reference to FIG. 11 will be described with reference to FIG. 16 and subsequent drawings.

As described above, detailed information of each play item and each sub play item is recorded in the play item information (PlayItem( )) 104.

FIG. 16 is a diagram illustrating a data configuration (syntax) of the play item information (PlayItem( )) 104.

A file name of the clip information file to be applied to the reproduction process using the play item is recorded in the clip information file name (Clip_Information_file_name) 111.

A reference STC identifier (ref_to_STC_id) 112 indicates an STC identifier of a system time clock (STC) continuous interval to be referred to by the play item.

The STC is a reference clock at the time of AV stream reproduction, and one STC is used in a continuous reproduction interval. For example, one STC is used in the continuous reproduction interval in which one play item is reproduced, and a different STC is referred to by switching of the play item.

Information designating the STC to be referred to by the play item is recorded in the reference STC identifier (ref_to_STC_id) 112.

A start time (IN_time) 113 is a recording region of the reproduction start time of the play item.

An end time (OUT_time) 114 is a recording region of the reproduction end time of the play item.

A difference time information (45 KHzh clock) from the start time of the STC corresponding to the play item designated by the reference STC identifier (ref_to_STC_id) 112 in a case where the reproduction target is the MPEG-2 TS format data of the related art is recorded in the start time information and the end time information.

Further, the 45 KHz clock is a general clock used for recording/reproducing of the MPEG-2 TS format data.

However, in a case where the reproduction target data is the MMT format data, a configuration in which the individual STC is associated with each piece of reproduction target data (MMT format data) corresponding to the play item is not obtained unlike the MPEG-2 TS format data.

Therefore, it is necessary to cause the start time (IN_time) 113 and the end time (OUT_time) 114 which are recorded in the play item information (PlayItem( )) of the playlist having the MMT format data as the reproduction target to be specific to the MMT format data.

This modified example will be described with reference to FIG. 17.

FIG. 17 illustrates the following data example:

(1) play item information record data of the related art (MPEG-2 TS-compatible playlist); and (2) new play item information record data (MMT-compatible playlist).

"(1) Play item information record data of the related art (MPEG-2 TS-compatible playlist)" illustrated in FIG. 17(1) indicates record data of the start time (IN_time) and the end time (OUT_time) recorded in the play item information (PlayItem( )) in a case where the reproduction target data is the MPEG-2 TS format data.

The start time (IN_time) is reproduction start time information of a play item (PlayItem) reproduction start point, and records elapsed time information from an STC [system time clock (45 KHz clock)]) start point applied to the reproduction process using the play item as described above. The STC is an STC specified by the reference STC identifier (ref_to_STC_id) 112 described above with reference to FIG. 16.

Further, the end time (OUT_time) is reproduction end time information of a play item (PlayItem) reproduction end point, and records elapsed time information from an STC [system time clock (45 KHz clock)]) end point applied to the reproduction process using the play item, as described above. The STC is an STC specified by the reference STC identifier (ref_to_STC_id) 112 described above with reference to FIG. 16.

"(2) New play item information record data (MMT-compatible playlist)" illustrated in FIG. 17(2) indicates record data of the start time (IN_time) and the end time (OUT_time) recorded in the play item information (PlayItem( )) in a case where the reproduction target data is the MMT format data.

The start time (IN_time) is the reproduction start time information of the play item (PlayItem) reproduction start point. In a case where the reproduction target data is the MMT format data, time information according to the NTP is recorded.

The end time (OUT_time) is the reproduction end time information of the playitem (PlayItem) reproduction endpoint. In a case where the reproduction target data is the MMT format data, time information according to the NTP is recorded.

For example, the time information according to the NTP is transmitted along with the MMT format data including broadcast content or the like transmitted by the transmitting device 20 such as the broadcasting server (broadcast station) 21 illustrated in FIG. 1.

The information processing device 30 such as the television (TV) 32 acquires the time information according to the NTP transmitted by the transmitting device 20 and records the time information in the playlist.

The transmitting device 20 transmits, for example, control information in which the reproduction time information of an MPU unit which is one data processing unit in the MMT format described above with reference to FIG. 3 is recorded as the time information according to the NTP together with the reproduction target data (program content).

A specific example will be described with reference to FIG. 18 and subsequent drawings.

For example, in the information processing device 30 which receives the delivery content (program) from the transmitting device 20 such as the broadcasting server (broadcast station) 21 illustrated in FIG. 1 through the MMT format data and records the received content in the information recording medium (medium), it is necessary to extract various information from the received data and generate the playlist file or the clip information file.

As described above with reference to FIG. 2 and other drawings, the MMT format data includes the signaling information constituted by the setting information necessary for the information processing device 30 side to receive content (program), the guidance information such as the program guide, the notification information, the control information, and the like.

As the signaling information specified by the MMT format, there are signaling information (MMT-SI) transmitted through the MMTP packet and signaling information (TLV-SI) transmitted through the TLV packet.

For example, the information processing device 30 which receives the MMT format data and records the received data in the medium extracts various information from the signaling information such as the TLV-SI or the MMT-SI included in the MMT format and generates the playlist file or the clip information file.

An MMT package table (MPT) is one of the signaling information (MMT-SI) transmitted through the MMTP packet. The MMT package table (MPT) is a table in which attribute information (asset descriptor) of data is recorded in detail for each data type (asset type) such as, for example, a video, an audio, or a subtitle, or the like.

Further, the MMT package table (MPT) is stored in an MMTP packet with a packet ID=0x0000, and the information processing device can determine a packet storing the MMT package table (MPT) on the basis of the packet ID.

A configuration of the MMT package table (MPT) will be described with reference to FIG. 18.

FIG. 18 is a diagram illustrating a data configuration (syntax) of the MMT package table (MPT).

As described above, the MMT package table (MPT) specified in the MMT format is a table in which the attribute information (asset descriptor) of data is recorded in detail for each data type (asset type) such as, for example, a video, an audio, or a subtitle, or the like.

The MMT package table (MPT) includes the following data recording regions as illustrated in FIG. 18:

an asset type (asset_type); and an asset descriptor (asset_descriptors_byte).

The asset type (asset_type) is a region in which an identifier of each data type such as a video, an audio, or a subtitle is recorded. An asset is a data processing unit having a common attribute, and a video, an audio, or a subtitle, and the like are set as different assets.

A specific example of the asset type (asset_type) recorded in the MMT package table (MPT) is illustrated in FIG. 19.

As the asset type (asset_type) recorded in the MPT, for example, there are the following types as illustrated in FIG. 19:

hvc 1: an HEVC image;

mp4a: an audio;

stpp: a subtitle or the like; and aapp: an application.

For example, any one of the above type information is recorded in the asset type (asset_type) recording field of the MPT illustrated in FIG. 18.

In the following field illustrated in a lower part of the MPT in FIG. 18:

an asset descriptor (asset_descriptors_byte), various asset types (for example, a video, an audio, or a subtitle) and various attribute information corresponding to the data types are recorded.

The reproduction time information of a video, an audio, or the like is included in one piece of information recorded as the asset descriptor (asset_descriptors_byte).

The reproduction time information is recorded as the time information according to the NTP.

FIG. 20 illustrates a data configuration (syntax) of an MPU time stamp descriptor in which the reproduction time information. (time stamp) of the MPU unit recorded in the MMT package table (MPT) as the asset descriptor (asset_descriptors_byte) is recorded.

Further, as described above with reference to FIG. 3, the MPU is an MPU illustrated in FIG. 3(*a*) and is one data processing unit in the MMT format. The example illustrated in FIG. 3(*a*) is an example of the MPU of the video data which is the same unit as the GOP as a so-called encoding and decoding processing unit.

The MPU time stamp descriptor recorded in the MMT package table (MPT) corresponds to the reproduction time information of the MPU unit.

As illustrated in FIG. 20, the following data is recorded in the MPU time stamp descriptor:

an MPU sequence number (MPU_sequenc_number); and an MPU reproduction time (MPU_presentation_time).

An identifier of the MPU is recorded in the MPU sequence number (MPU_sequenc_number).

A reproduction time (presentation time) of the MPU is recorded in the MPU reproduction time (MPU_presentation_time) as the time information according to the NTP.

Further, the NTP time (NTP time stamp)) is, for example, absolute time information of 64-bit data, that is, absolute time information indicating an elapsed time from a reference time which is specified in advance. Time information (elapsed time information) of 1 second or more is indicated by upper 32 bits, and time information (elapsed time information) of 1 second or less is indicated by lower 32 bits.

Further, a setting using the NTP time information of a short length format in which it has a total of 32 bits, time information of 1 second or more is indicated by upper 16 bits, and time information of 1 second or less is indicated by lower 16 bits is also possible.

As described above, the MPU time stamp which is the reproduction time information (time stamp) of the MPU unit is recorded in the MMT package table (MPT) as the asset descriptor (asset_descriptors_byte).

As described above, the transmitting device 20 illustrated in FIG. 1 records the reproduction time information of the MPU unit which is one data processing unit in the MMT format in the MMT package table (MPT) as the NTP time information and transmits the resulting MMT package table (MPT) to the information processing device 30 such as the television.

The information processing device 30 acquires the time information and records the time information in the playlist.

In other words, in a case where data to be recorded in the information recording medium (medium) as the clip AV stream file is the MMT format data, the information processing device 30 records the NTP time information acquired from the MMT package table (MPT) in the playlist file which is the reproduction control information file.

As described above with reference to FIG. 17(2), in a case where the reproduction target data recorded in the information recording medium (medium) as the clip AV stream file is the MMT format data, the information processing device 30 records the time information according to the NTP as the start time (IN_time) and the end time (OUT_time) of the play item information (PlayItem( )) of the playlist file.

Next, a playlist mark (PlayListMark) which is another element recorded in the playlist file will be described with reference to FIG. 21.

First, a mark (Mark) will be described. The mark is data which can be recorded in the playlist file or the clip information file, for example, as a chapter delimiter, a scene change point, a book mark, a highlight, or time designation information of a characteristic scene of video data stored in the clip AV stream file.

The mark is recorded in the playlist file or the clip information file by a process of recording a time stamp indicating a time of the mark.

FIG. 21 is a diagram illustrating a data configuration (syntax) of the playlist mark (PlayListMark) which is an element of the playlist file.

The number of playlist marks (number_of_PlayList_marks) 121 indicates the number of marks stored in the playlist mark (PlayListMark).

A mark type (mark_type) 122 is a field indicating a type of mark. For example, information indicating a mark type to which each mark such as a representative image position of the playlist, a chapter start position, a chapter end position, a scene change position, or an edit position is recorded.

A mark time stamp (mark_time_stamp) 123 is a field in which a time stamp indicating a point at which a mark is set is recorded.

An elementary stream packet ID entry (entry_ES_PID) 124 is a field in which an identifier of a packet in which the mark is set is recorded.

A duration 125 is a field in which a time interval between adjacent marks, for example, a length of a chapter is recorded.

The record data of the playlist mark (PlaytistMark) illustrated in FIG. 21 in a case where the MPEG-2 TS format data of the related art is recorded as the clip AV stream file is specified, but in a case where the MMT format data is recorded as the clip AV stream file, it is not particularly specified.

Therefore, it is necessary to specify the record data of the playlist mark (PlayListMark) in a case where the MMT format data is recorded as the clip AV stream file.

FIG. 22 illustrates the following data example:

(1) playlist mark information record data of the related art (MPEG-2 TS-compatible playlist); and (2) new playlist mark information record data (MMT-compatible playlist).

"(1) Playlist mark information record data of the related art" illustrated in FIG. 22(1) indicates record data recorded in the playlist mark (PlayListMark) in a case where the reproduction target data is the MPEG-2 TS format data.

A mark time stamp (mark_time_stamp) is a field in which a time stamp indicating the point at which the mark is set is recorded in a case where the reproduction data is the MPEG-2 TS format data, a time stamp at a mark setting position is recorded here. The time stamp is recorded as the 45 KHz clock data which is a general clock used for recording/reproducing of the MPEG-2 TS format data.

An elementary stream packet ID entry (entry_ES_PID) is a field in which an identifier of a packet in which the mark is set is recorded. In a case where the reproduction data is the MPEG-2 TS format data, the packet ID (PID) of the TS packet at the mark setting position is recorded here.

A duration is a field in which a time interval between adjacent marks, for example a length of a chapter is recorded. In a case where the reproduction data is the MPEG-2 TS format data, here, the time interval between adjacent marks is recorded as the 45 KHz clock data which is a general clock used for recording/reproducing of the MPEG-2 TS format data.

"(2) New playlist mark information record data (MMT-compatible playlist)" illustrated in FIG. 22 indicates record data recorded in the playlist mark (PlayListMark) in a case where the reproduction target data is the MMT format data.

In a case where the reproduction target data is the MMT format data, a time stamp at a mark setting position is recorded in the mark time stamp (mark_time_stamp) as the time information according to the NTP.

The time information according to the NTP is acquired from, for example, the MPT described with reference to FIG. 18 and other drawings, that is, from the MMT package table (MPT) specified in the MMT format.

Further, the elementary stream packet ID entry (entry_ES_PID) is a field in which the identifier of the packet in which the mark is set as recorded, and in a case where the reproduction data is the MMT format data, an ID of an MMT packet is recorded as the packet ID at the mark setting position.

A duration is a field in which a time interval between adjacent marks, for example a length of a chapter is recorded. Even in a case where the reproduction data is the MMT format data, the time interval between adjacent, marks is recorded in this field as the 45 KHz clock data, similarly to the MPEG-2 TS format data. The time interval between marks can be calculated at the time of data recording and is set to be recorded together with a data recording format of the MPEG-2 TS format data of the related art.

[6. Clip Information File Corresponding to MMT Format Data]

Next, the clip information file corresponding to the MMT format data will be described with reference to FIG. 23 and subsequent drawings.

As described above, the information related to the data to be reproduced by applying the clip information file is recorded in the clip information file. Specifically, for example, the reproduction position information of the clip AV stream file or the like is included.

FIG. 23 is a diagram illustrating a data configuration (syntax) of one ciip information file.

Information related to reproduction data associated with the clip information is recorded in the clip information file. As illustrated in FIG. 23, for example, the following information is recorded:

clip information [ClipInfo( )] 201;

sequence information [SequenceInfo( )] 202;

program information [ProgramInfo( )] 203; and

CPI information [CPI( )] 204.

The clip information [ClipInfo( )] 201 records the attribute information of the AV stream file corresponding to the clip information file.

The sequence information [SequenceInfo( )] 202 records information related to a reproduction sequence of the reproduction target data stored in the AV stream file corresponding to the clip information file.

The program information [ProgramInfo( )] 203 records information related to a program including definition information of a reproduction interval or a time interval of the clip AV stream reproduced by the clip information file or the like.

The CPI information [CPI( )] 204 is, for example, data for acquiring the data address of the reproduction start point, and EP_map and TU_map described above with reference to FIGS. 12 to 14 are recorded.

As described above with reference to FIG. 11, the CPI type (CPI_type) is recorded in the playlist file. The CPI type (CPI_type) is information indicating the CPI type in the clip information file which is referred to by the play item (PlayItem) specified in the playlist file.

Next, a data configuration (syntax) of the clip information [ClipInfo( )] 201 recorded in the clip information file will be described with reference to FIG. 24.

As described above, the clip information [ClipInfo( )] 201 is a region in which the attribute information of the AV stream file corresponding to the clip information file is recorded.

As illustrated in FIG. 24, the following data is recorded in the clip information [ClipInfo ( )] 201:

(a) an application type (Application type) 211;

(b) a clip stream type (Clip_stream_type) 212;

(c) a transcode mode flag (transcode_mode_flag) 213;

(d) a TS average rate (TS_average_rate) 214;

(e) a TS recording rate (TS_recording_rate) 215; and (f) the number of source packets (num_of_source_packets) 216.

The application type (application type) 211 is information indicating a type of reproducing application by the clip information file, and specifically, a normal image reproduction type, a reproduction process type of a slide show, and the like are specified.

The clip stream type (Clip_stream_type) 212 is information indicating a type of data stored in the clip AV stream file which is the reproduction target data by the clip information file. As the MPEG-2 TS format data, in addition to the normal MPEG-2 TS stream, there is a stream type in which a black image is inserted between streams, and identification information of the types is recorded.

The transcode mode flag (transcode_mode_flag) 213 is a flag indicating whether the data stored in the clip AV stream file which is the reproduction target data by the clip information file, that is, the reproduction target data recorded in the information recording medium (medium) is data obtained by recording received data such as a broadcast without change or data obtained by performing a conversion process such as a predetermined compression process and recording resulting data.

In particular, flags of the following settings are recorded:

a flag value=0: there is no conversion at the time of recording (transparent)

a flag value=1: there is conversion at the time of recording (transcoded)

A TS average rate (TS_average_rate) 214 and a TS recording rate (TS_recording_rate) 215 indicate an average bit rate and a recording rate of a transport stream of the clip AV stream file which is the reproduction target data by the clip information file in units of bytes or seconds.

The number of source packets (num_of_source_packets) 216 is file size information of the clip AV stream file which is the reproduction target data by the clip information file, and in the case of the MPEG-2 TS format data, the number of source packets is recorded.

As described above, the following data is specified as the data to be recorded in the clip information [ClipInfo( )] 201 illustrated in FIG. 24:

(a) the application type (Application type) 211;

(b) the clip stream type (Clip_stream_type) 212;

(c) the transcode mode flag (transcode_mode_flag) 213;

(d) the TS average rate (TS_average_rate) 214;

(e) the TS recording rate (TS_recording_rate) 215; and (f) the number of source packets (num_of_source_packets) 216.

However, the data is specified on the assumption that the data stored in the clip AV stream file which is the reproduction target data by the clip information file is the MPEG-2 TS format data, and a case where the data stored in the clip AV stream file is the MMT format data is not assumed.

Therefore, it is necessary to specify the data recording form in a case where the data stored in the clip AV stream file is the MMT format data.

FIG. 25 is a diagram illustrating the following data for the application type (application type) 211 recorded in the clip information [ClipInfo( )] illustrated in FIG. 24:

(1) clip information (ClipInfo) record data of the related art (MPEG-2 TS-compatible clip information file); and (2) new clip information (ClipInfo) record data (MPEG-2 TS/MMT-compatible clip information file).

"(1) Clip information (ClipInfo) record data of the related art (MPEG-2 TS-compatible clip information file)" illustrated in FIG. 25(1) indicates correspondence data of a setting value of the application type (Application type) recorded in the clip information (ClipInfo) and the meaning thereof in a case where the reproduction target data is the MPEG-2 TS format data.

In a case where the reproduction target data is the MPEG-2 TS format data, the following setting is performed.

In a case where the application type (Application type)=1, it indicates that the type of the reproducing application by the clip information file is "Main TS for a main-path of Movies", that is, a reproducing application of a main TS corresponding to an image main path.

Further, it is possible to set a plurality of reproduction paths such as a main path and a sub path in as the image reproduction path, and it is possible to perform the reproduction using different play items.

Further, in a case where the application type (Application type)=2, it indicates that the type of the reproducing application by the clip information file is "Main TS for a main-path of Time based slide show", that is, a reproducing application of a main TS corresponding to a main path of a time base slide show.

As described above, in the related art, only the MPEG-2 TS format data is the reproduction target data, and the setting illustrated in FIG. 25(1) is used.

"(2) New clip information (ClipInfo) record data (MPEG-2 TS/MMT-compatible clip information file)" illustrated in FIG. 25(2) indicates correspondence data of a setting value of the application type (Application type) recorded in the clip information (ClipInfo) in a case where two different pieces of format data are assumed, that is, in a case where the reproduction target data is the MPEG-2 TS format data or the MMT format data and the meaning thereof.

In this setting, in addition to the application type (Application type)=1 and 2 described in FIG. 25(1), the following setting is added:

the application type (Application type)=3.

In the case of the application type (Application type)=3, it indicates that the type of the reproducing application by the clip information file is "Main MMT for a main-path of Movies", that is, a reproducing application of a main MMT corresponding to an image main path.

As such a setting is added, the reproducing device can check that the data stored in the clip AV stream recorded in the information recording medium (medium) is the MMT format data on the basis of the record data of the clip information file and execute the reproduction process corresponding to the MMT format data.

Next, the following data will be described with reference to FIG. 26 with respect to the clip stream type (Clip_stream_type) 212 recorded in the clip information [ClipInfo( )] illustrated in FIG. 24:

(1) clip information. (ClipInfo) record data of the related art (MPEG-2 TS-compatible clip information file); and (2) new clip information (ClipInfo) record data (MPEG-2 TS/MMT-compatible clip information file).

"(1) Clip information (ClipInfo) record data of the related art (MPEG-2 TS-compatible clip information file)" illustrated in FIG. 26(1) indicates correspondence data of a setting value of the clip stream type (Clip_stream_type) recorded in the clip information (ClipInfo) and the meaning thereof in a case where the reproduction target data is the MPEG-2 TS format data.

In a case where the reproduction target data is the MPEG-2 TS format data, the following setting is performed.

In a case where the clip stream type (Clip_stream_type)=1, at indicates that the type of the data stored in the clip AV stream file which is the reproduction target data by the clip information file is "A Clip AV stream of BDAV MPEG-2 TS", that is, a clip AV stream of a BDAV MPEG-2 TS format.

Further, in a case where the clip stream type (Clip_stream_type)=2, it indicates that the type of the reproduction data by the clip information file is "A Bridge-Clip AV stream of BDAV MPEG-2 TS", that is, a bridge type clip AV stream of a BDAV MPEG-2 TS format.

Further, the bridge type clip AV stream is a stream of type in which a black picture is inserted between streams.

As described above, in the related art, only the MPEG-2 TS format data is the reproduction target data, and the setting illustrated in FIG. 26(1) is used.

"(2) New clip information (ClipInfo) record data (MPEG-2 TS/MMT-compatible clip information file)" illustrated in FIG. 26(2) indicates correspondence data of a setting value of the clip stream type (Clip_stream_type)

recorded in the clip information (ClipInfo) in a case where two different pieces of format data are assumed, that is, in a case where the reproduction target data is the MPEG-2 TS format data or the MMT format data and the meaning thereof.

In the setting, in addition to the clip stream type (Clip_stream_type)=1 and 2 described in FIG. 26(1), the following setting is added:

the clip stream type (Clip_stream_type)=3

In a case where the clip stream type (Clip_stream_type)=3, it indicates that the type of the data stored in the clip AV stream file which is the reproduction target data by the clip information file is "A Clip AV stream of BDAV MMT", that is, a clip AV stream of a BDAV MMT format.

As such a setting is added, the reproducing device can check that the data stored in the clip AV stream recorded in the information recording medium (medium) is the MMT format data on the basis of the record data of the clip information file and execute the reproduction process corresponding to the MMT format data.

The following two pieces of data have been described as a modified example of the data to be recorded in the clip information [ClipInfo( )] 201 illustrated in FIG. 24:

(a) the application type (Application type) 211; and (b) the clip stream type (Clip_stream_type) 212.

Next, a data recording example corresponding to the MMT format data for the following data to be recorded in clip information [ClipInfo( )] 201 illustrated in FIG. 24 will be described:

(c) the transcode mode flag (transcode_mode_flag) 213;

(d) the TS average rate (TS_average_rate) 214;

(e) the TS recording rate (TS_recording_rate) 215; and (f) the number of source packets (num_of_source_packets) 216.

As described above, the transcode mode flag (transcode_mode_flag) 213 is a flag indicating whether the clip AV stream file-stored data which is the reproduction target data by the clip information file is data obtained by recording received data such as a broadcast without change or data obtained by performing a conversion process such as a predetermined compression process and recording resulting data.

In particular, flags of the following settings are recorded:

a flag value=0: there is no conversion at the time of recording (transparent)

a flag value=1: there is conversion at the time of recording (transcoded)

This setting can be used for the MMT format data with a similar setting.

The TS average rate (TS_average_rate) 214 and the TS recording rate (TS_recording_rate) 215 indicate an average bit rate and a recording rate of a transport stream of the clip AV stream file which is the reproduction target data by the clip information file in units of bytes or seconds as described above.

The bit rate information is assumed to be calculated on the basis of the TS packet, and in a case where the reproduction target data is the MMT format having MMT packet, it is necessary to record the bit rate corresponding to the MMT format. Alternatively, in a case where the reproduction target data is the MMT format, a setting in which an invalid value is recorded in this field so that the bit rate information is unable to be used may be performed.

Further, in a case where the bit rate corresponding to the MMT format is recorded, the bit rate corresponding to the MMT format is acquired and recorded by one of the following methods:

(example 1) the bit rate is calculated by dividing the file size by time between STC sequence and recorded;

(example 2) the bit rate is calculated on the basis of the record data information acquired in the compression process at the time of data recording and recorded; and (example 3) the bit rate information included in a content copy control descriptor included in received information from the transmitting device, for example, the signaling information (SI) which is the control information is acquired and recorded.

Further, the STC sequence in (example 1) is a sequence of source packets which are continuously reproduced by one STC. It possible to calculate the bit rate by dividing the file size by time between STC sequences and record the bit rate.

One STC is a clock which is specified on the basis of one program clock reference (PCR), and the source packets belonging to one STC sequence undergo the reproduction control by one STC (for example, 45 KHz).

Further, the STC will be described in detail in description of sequence information [SequenceInfo( )] to be described with reference to FIG. 27 and subsequent drawings.

The signaling information (SI) which is the control information in (example 3) is, for example, the signaling information (TLV-SI) according to the TLV format in the MMT format data described above with reference to FIG. 2 or the signaling information (MMT-SI) stored in the MMTP packet.

It is possible to acquire and record the bit rate information from the content copy control descriptor in the signaling information.

Further, the number of source packets (num_of_source_packets) 216 is file size information of the clip AV stream file which is the reproduction target data by the clip information file.

As described above, in a case where the reproduction target, data is the MPEG-2 TS format data, the number of source packets is recorded.

As described above with reference to FIG. 6, the TS packet has a fixed length unlike the MMTP packet, and the packet size of one TS packet is fixed to 188 byte.

Therefore, there is a feature that the data size can be detected on the basis of the number of packets.

However, in a case where the reproduction target data is the MMT format data, the MMTP packet serving as the configuration packet of the MMT format data has a variable length and can be set to various packet sizes as described above with reference to FIG. 7.

Therefore, even though the number of packets is recorded in the field of the number of source packets (num_of_source_packets) 216, the data size is unable to be detected.

In a case where the reproduction target data is the MMT format, the file size of the MMTP packet according to the MMT format, that is, the file size of the MMTP packet illustrated in FIG. 7(*c*) or FIG. 3(*c*) is acquired and recorded.

Alternatively, in a case where the reproduction target data is the MMT format, an invalid value may be recorded in this field so that it is used as an unused field.

Next, a data configuration (syntax) of the sequence information [SequenceInfo( )] 202 recorded in the clip information file described above with reference to FIG. 23 will be described with reference to FIG. 27.

As described above, information related to the reproduction sequence of the reproduction target data stored in the AV stream file corresponding to the clip information is recorded in the sequence information [SequenceInfo( )] 202.

As illustrated in FIG. 27, the following data is recorded in the sequence information [SequenceInfo( )] 202:

(a) an ATC start position SPN (SPN_ATC_start) 221;

(b) the number of STC sequences (num_of_STC_sequence) 222;

(c) a program clock reference packet ID (PCR_PID) 223;

(d) an STC start position SPN (SPN_STC_start) 224;

(e) a display start time (presentation_start_time) 225; and (f) a display end time (presentation_end_time) 226.

Before the above data is described, a packet configuration and a reproduction process example of the clip AV stream file storing the reproduction target data will be described with reference to FIG. 28.

Figure 28:
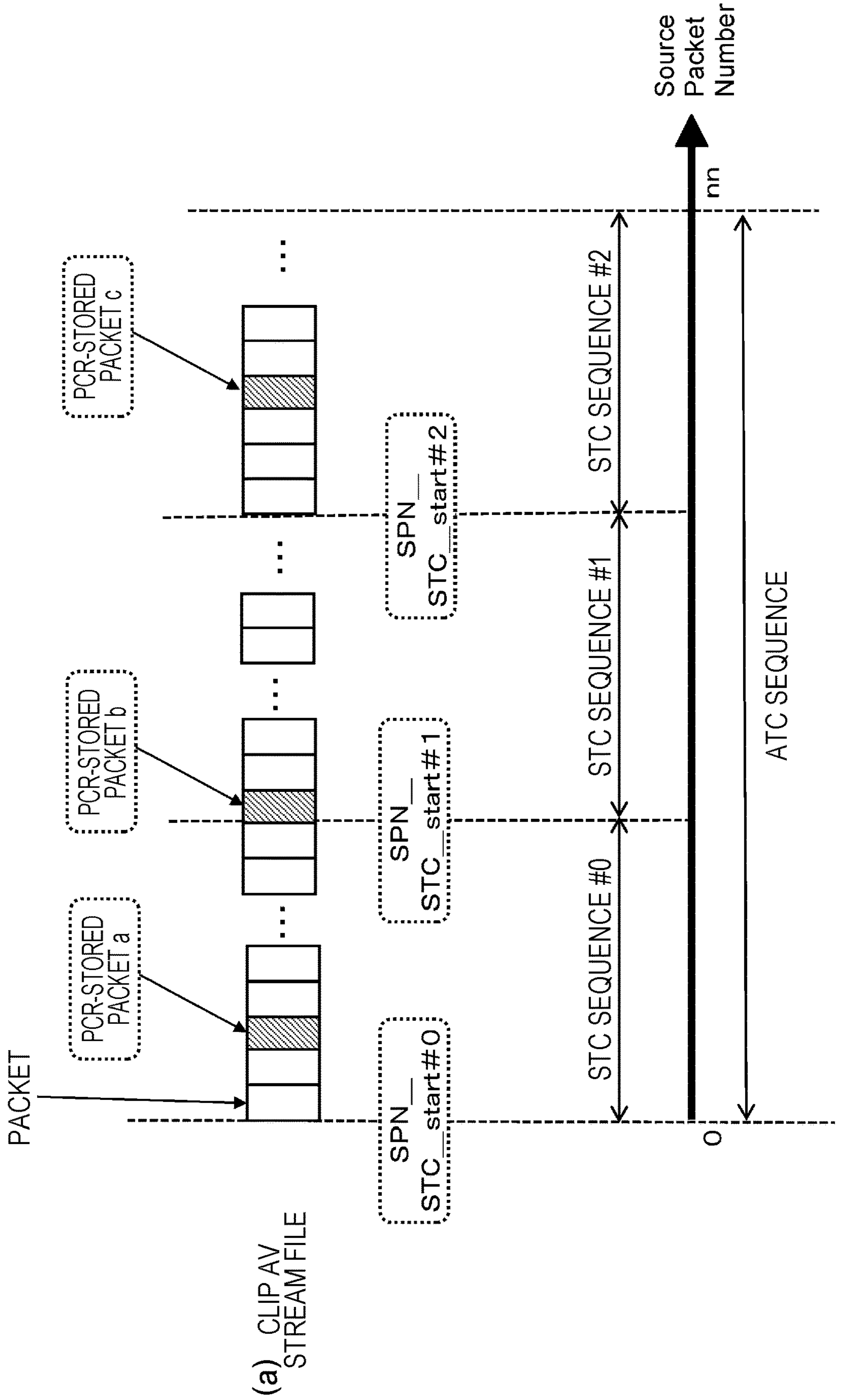
FIG. 28 is a diagram for describing an ATC and an STC recorded in sequence information [SequenceInfo( )] of a clip information file.

FIG. 28 illustrates a packet sequence stored in (a) the clip AV stream file. In the case of the MPEG-2 TS format data, one rectangle corresponds to one TS packet.

In the example of FIG. 28, packet numbers 0 to nn are configuration data of one clip AV stream file.

The packets of the one clip AV stream are a packet sequence arranged in accordance with one an arrival time clock (ATC).

The packet sequence arranged in accordance with the one ATC is referred to as an ATC sequence.

One or more STC sequences are included in the packet 0 to nn of one clip information file illustrated in FIG. 28. In the example illustrated in FIG. 28, three STC sequences are included. They are STC sequence #0 to #2.

One STC is a clock which is specified on the basis of one PCR, and the source packets belonging to one STC sequence undergo the reproduction control by one STC (for example, 45 KHz).

The STC sequence #0 illustrated in FIG. 28 is a sequence of packets which can be continuously reproduced in accordance with an STC which is a clock specified on the basis of a PCR stored in a PCR-stored packet a.

The STC sequence #1 is a sequence of packets which can be continuously reproduced in accordance with an STC which is a clock specified on the basis of a PCR stored in a PCR-stored packet b.

Further, the STC sequence #2 is a sequence of packets which can be continuously reproduced in accordance with an STC specified on the basis of each of PCRs stored in a PCR-stored packet c.

Further, in the example illustrated in FIG. 28, three STC sequences are included in one ATC sequence, but the number of STC sequences included in one ATC sequence can be set variously.

Returning to FIG. 27, the record data of the sequence information [SequenceInfo( )] 202 recorded in the clip information file will be described.

(a) The ATC start position SPN (SPN_ATC_start) 221 is a region in which the SPN of the ATC start position of the clip AV stream file serving as the reproduction target by the clip information file is recorded.

In the example described with reference to FIG. 28, the ATC start position SPN (SPN_ATC_start)=0.

(b) The number of STC sequences included in the clip AV stream file serving as the reproduction target by the clip information file is recorded in the number of STC sequences (num_of_STC_sequence) 222.

In the example described with reference to FIG. 28, the number of STC sequences (num_of_STC_sequence)=3.

(c) A packet identifier of a packet storing a PCR corresponding to each STC sequence included in the clip AV stream file serving as the reproduction target by the clip information file is recorded in the program clock reference packet ID (PCR_PID) 223.

(d) The SPN of the start position of each STC sequence included in the clip AV stream file serving as the reproduction target by the clip information file is recorded in the STC start position SPN (SPN_STC_start) 224.

A display start time and a display end time of each STC sequence included in the clip AV stream file serving as the reproduction target by the clip information file are recorded in the following fields:

(e) a display start time (presentation_start_time) 225; and (f) a display end time (presentation_end_time) 226.

Further, both STC time information (stc_id) and ATC time information (atc_id) are recorded as the time information.

The above description is an example of the record data in a case where the reproduction target data by the clip information file is the MPEG-2 TS format data.

Next, each piece of record data in a case where the reproduction target data by the clip information file is the MMT format data will be described.

(a) The ATC start position SPN (SPN_ATC_start) 221 is a region in which the SPN of the ATC start position of the clip AV stream file serving as the reproduction target by the clip information file is recorded as described above.

As described above with reference to FIG. 6, the TS packet has a fixed length unlike the MMTP packet, and the packet size of one TS packet is fixed to 188 byte.

Therefore, there is a feature that the data size can be detected on the basis of the number of packets.

However, in a case where the reproduction target data is the MMT format data, the MMTP packet serving as the configuration packet of the MMT format data has a variable length and can be set to various packet sizes as described above with reference to FIG. 7.

Therefore, even though the packet number is recorded in the field of the ATC start position SPN (SPN_ATC_start) 221, the data size is unable to be detected.

For the reason, in a case where the reproduction target data is the MMT format data, in the ATC start position SPN (SPN_ATC_start) 221 of the MMT format data-compatible clip information file, the number of bytes from the beginning of the AV stream file (=the beginning of a first MMTP packet stored in a file) is recorded. For example, the number of bytes is recorded with 64 bits.

(b) The number of STC sequences (num_of_STC_sequence) 222 is a region in which the number of STC sequences included in the clip AV stream file serving as the reproduction target by the clip information file is recorded.

In a case where the reproduction target data is the MMT format data, the number of STC sequences (num_of_STC_sequence)=1.

In other words, a setting in which only one STC sequence is included in one ATC sequence is performed.

(c) The program clock reference packet ID (PCR_PID) 223 is a region in which the packet identifier of the packet storing the PCR corresponding to each STC sequence included in the clip AV stream file serving as the reproduction target by the clip information file is recorded.

In a case where the reproduction target data is the MMT format data, since a data position from the packet identifier is unable to be specified, a setting in which an invalid value is recorded in this field so that it is not used is performed.

(d) The STC start position SPN (SPN_STC_start) 224 is a region in which the SPN of the start position of each STC sequence included in the clip AV stream file serving as the reproduction target by the clip information file is recorded.

In a case where the reproduction target data is the MMT format data, similarly to (a) the ATC start position SPN (SPN_ATC_start) 221 described above, the number of bytes from the beginning of the clip AV stream file (=the beginning of the first MMTP packet stored in the file) is recorded. For example, the number of bytes is recorded with 64 bits.

The following fields are regions in which a display start time and a display end time of each STC sequence included in the clip AV stream file serving as the reproduction target by the clip information file are recorded:

(e) a display start time (presentation_start_time) 225; and (f) a display end time (presentation_end_time) 226.

In a case where the reproduction target data is the MMT format data, the time information according to the NTP is recorded as the time information.

The time information according to the NTP is acquired from, for example, the MPT described with reference to FIG. 18 and other drawings, that is, the MMT package table (MPT) specified in the MMT format.

Next, a data configuration (syntax) of the program information [ProgramInfo( )] 203 recorded in the clip information file described above with reference to FIG. 23 will be described with reference to FIG. 29.

As described above, the program information [ProgramInfo( )] 203 records information related to a program including definition information of a reproduction interval or a time interval of the clip AV stream reproduced by the clip information file or the like.

Main data recorded in the program information [ProgramInfo( )] illustrated in FIG. 29 will be described.

(a) The number of program sequences (program_sequence) included in the clip information file is recorded in the number of program sequence [num_of_program_sequences] 231.

(b) A relative address of a location at which the program sequence starts on the AV stream file is recorded in an SPN program sequence start address [SPN_program_sequence_start[i]] 232.

(c) Storage position information of a map of the program sequence (program_sequence) is recorded in a program map PID [program_map_PID [i]] 233.

Further, the program sequence refers to an interval in which encoded information in the AV stream included in the clip AV stream file is continuous.

For example, a video data interval which is encoded in one image encoding mode, an audio data interval which is encoded in one audio encoding mode, or the like is specified as an individual program sequence.

The record data of the program information [ProgramInfo( )] illustrated in FIG. 29, that is, (a) the number of program sequences [num_of_program_sequences] 231, (b) the SPN program sequence start address [SPN_program_sequence_start [i]] 232, and (c) the program map PID [program_map_PID [i]] 233, are specified for a case where the reproduction target data by the clip information file is the MPEG-2 TS format, but the data is not specified in a case where the reproduction target data is the MMT format data, and thus it is necessary to specify them newly.

(a) For the number of program sequences [num_of_program_sequences] 231, it is desirable to record the number of program sequences in a case where the reproduction target data is any of the MPEG-2 TS format or the MMT format.

(b) For the SPN program sequence start address [SPN_program_sequence_start [i]] 232, in a case where the reproduction target data is the MPEG-2 TS format, the SPN at the start position of the SPN program sequence is recorded.

On the other hand, in a case where the reproduction target data is the MMT format data, the number of bytes from the beginning of the clip AV stream file (=the beginning of the first MMTP packet stored in the file) is recorded. For example, the number of bytes is recorded with 64 bits.

(c) For the program map PID [program_map_PID [i]] 233, in a case where the reproduction target data is the MPEG-2 TS format, the identifier (PID) of the packet storing the map of the program sequence (program_sequence) is recorded.

On the other hand, in a case where the reproduction target data is the MMT format data, a setting in which an invalid value is recorded so that it is not used is performed.

Next, a data configuration (syntax) of the CPI information [CPI( )] 204 recorded in the clip information file described above with reference to FIG. 23 will be described with reference to FIG. 30 and subsequent drawings.

The CPI information [CPI( )] 204 is, for example, data for acquiring the data address of the reproduction start point, and EP_map and TU_map described above with reference to FIGS. 12 to 14 are recorded.

As described above, the CPI is the record data of the clip information file, and is, for example, data for acquiring the data address of the reproduction start point.

As illustrated in FIG. 30, in a case where the CPI type=1, the EP map is recorded, and in a case where the CPI type=2, the TU map is recorded.

Further, in the example illustrated in FIG. 30, the reproduction target data is the MPEG-2 TS format data. As described above with reference to FIG. 15, in a case where the reproduction target data is the MPEG-2 TS format data, there is a setting in which the CPI type=1, 2, and both the EP map and the TU map are set to be usable.

On the other hand, in a case where the reproduction target data is the MMT format data, the setting in which the CPI type=3 is performed, and only the EP map can be used as described above with reference to FIG. 15.

As described above with reference to FIGS. 12 to 14, the EP map is a map in which the access point information corresponding to the reproduction start position at which the random reproduction can be started or the reproduction end position in the reproduction data stored in the clip AV stream file is recorded.

In other words, the correspondence data of the time stamp (PTS) indicating the reproduction start position on the time axis and the address information (SPN) acquiring the packet corresponding to the packet position information is recorded in the EP map.

By using the EP map, the reproducing device can acquire the packet number (SPN) of the packet storing the data corresponding to the data position on the basis of the time stamp (PTS) corresponding to the random accessible data position, acquire the setting packet of the acquired SPN, and perform the reproduction.

A data configuration (syntax) of the EP map will be described with reference to FIG. 31 and subsequent drawings.

FIG. 31 is a diagram illustrating a data configuration (syntax) of the EP map stored in the clip information file.

As described above with reference to FIG. 13(A), in the clip AV stream (Clip AV stream), the video stream constituted by the source packet identified by the packet identifier (PID) is multiplexed. The video stream is distinguished for each source packet by a PID included in a header of a transport packet in the source packet.

The EP map is set one stream PID (one_stream_PID) unit identified by each PID.

In other words, the EP map (EP_map_for_one_stream_PID) of one stream PID (one_stream_PID) unit is recorded in an EP map recording region 242 of FIG. 31.

A specific data example of the EP map recording region 242 is illustrated in FIG. 32.

As illustrated in FIG. 32, the EP map has the following data recording regions:

(1) fine EP map reference data (ref_to_EP_fine) 251;

(2) a PTS of a coarse EP map (PTS_EP_coarse) 252;

(3) an SPN of a coarse EP map (SPN_EP_coarse) 253;

(4) a PTS of a fine EP map (PTS_EP_fine) 254; and (5) an SPN of a fine EP map (SPN_EP_fine) 255.

The EP map is constituted by two tables in order to reduce a data amount and realize efficient search process of the SPN from the PTS.

The two table configurations will be described with reference to FIG. 33.

Figure 33:
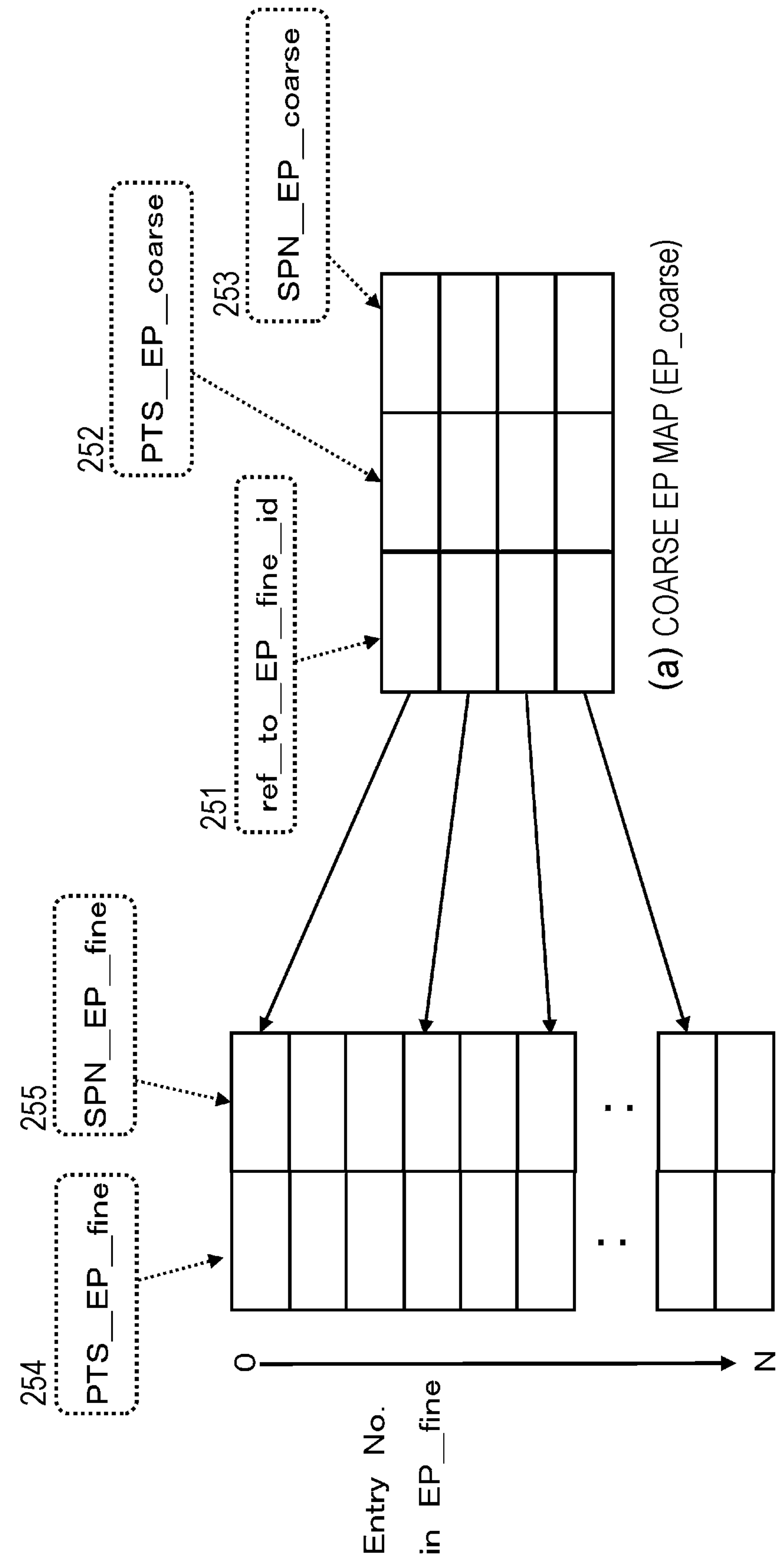
FIG. 33 is a diagram for describing a data configuration of two tables constituting an EP map.

As illustrated in FIG. 33, the EP map is constituted by the following two tables:

(a) a coarse EP map (EP_coarse)

(b) a fine EP map (EP_fine).

(a) The coarse EP map (EP_coarse) stores correspondence data including only upper bit for each of bit data of the PTS and bit data of the SPN.

It is correspondence data of (PTS_EP_coarse) 252 and (SPN_EP_coarse) 253.

On the other hand, (b) the fine EP map (EP_fine) stores correspondence data including only lower bits of the bit data of the PTS and the bit data of the SPN.

It is correspondence data of (PTS_EP_fine) 254, and (SPN_EP_fine) 255.

Further, the fine EP map reference data (ref_to_EP_fine) 251 is stored in the coarse EP map (EP_coarse) in association with each piece of PTS-SPN correspondence data.

The reproducing device that desires to acquire the SPN on the basis of the PTS first acquires a corresponding entry with reference to the coarse EP map (EP_coarse) on the basis of the upper bits of the PTS, further acquires the fine EP map reference data (ref_to_EP_fine) 251 set in the acquired entry, accesses the data position of the fine EP map (EP_fine) corresponding to the reference position, and acquires a detailed SPN on the basis of the lower bits of the PTS.

The following data for executing the process using the two tables described with reference to FIG. 33 are recorded in the EP map data illustrated in FIG. 32:

(1) the fine EP map reference data (ref_to_EP_fine) 251;

(2) the PTS of a coarse EP map (PTS_EP_coarse) 252;

(3) the SPN of a coarse EP map (SPN_EP_coarse) 253;

(4) the PTS of a fine EP map (PTS_EP_fine) 254; and (5) the SPN of a fine EP map (SPN_EP_fine) 255.

However, the EP data is data which is applicable in a case where the reproduction target data is the MPEG-2 TS format data, and the EP data can be used without change in a case where the reproduction target data is the MMT format data.

Therefore, it is necessary to record the MMT format data-compatible EP map in the clip information file corresponding to the MMT format data.

This specific example will be described with reference to FIG. 34 and subsequent drawings.

As a specific example of the MMT format data-compatible EP map, a plurality of specific examples will be described below. The following four specific examples are sequentially described:

(a) an MMT format data-compatible EP map example 1;

(b) an MMT format data-compatible EP map example 2 (compression example);

(c) an MMT format data-compatible EP map example 3 (division example); and (d) an MMT format data-compatible EP map example 4 (division & compression example).

First, the following two specific examples will be described with reference to FIG. 34:

(a) the MMT format data-compatible EP map example 1; and (b) the MMT format data-compatible EP map example 2 (compression example).

(a) The MMT format data-compatible EP map example 1 illustrated in FIG. 34 has the following fields as the data recording field:

an NTP time recording region (NTP_time) 261; and an MMT byte address recording region (MMT_byte_adress) 262.

A 64-bit NTP time is recorded in the NTP time recording region (NTP_time) 261.

The time information according to the NTP is acquired from, for example, the MPT described above with reference to FIG. 18 and other drawings, that is, the MMT package table (MPT) specified in the MMT format.

The number of bytes from the beginning of the clip AV stream file (=the beginning of the first MMTP packet stored in the file) is recorded in the MMT byte address recording region (MMT_byte_adress) 262. For example, the number of bytes is recorded with 64 bits.

The MPEG-2 TS format-compatible EP map described above with reference to FIGS. 32 and 33 has a configuration in which the correspondence data of PTS (presentation time stamp) and SPN is recorded.

On the other hand, the MMT format has a configuration in which the network time protocol (NTP) time is used instead of the PTS, and the MMT byte address is used instead of the SPN.

The reason for replacing data as described above is because there is no data coinciding with the PTS or the SPN specified in the MPEG-2 TS format in the data transmitted from the broadcast station or the like in accordance with the MMT format. Further, it is because the size of the TS packet in the MPEG-2 TS format is fixed (188 bytes), whereas the MMTP packet according to the MMT format is an unfixed variable length packet.

Further, the MPEG-2 TS-compatible EP map described above with reference to FIGS. 32 and 33 has a configuration of the following two maps:

(a) coarse EP map (EP_coarse); and (b) fine EP map (EP_fine), but the MMT format data-compatible EP map illustrated in FIG. 34(*a*) has a setting in which it is constituted by one map.

In a case where it is selected as the stored clip AV stream reproduction target storing the MMT format data, for example, the reproduction process to which the EP map-recorded clip information file illustrated in FIG. 34(*a*) is applied, specifically, the random access reproduction process is performed.

The reproducing device detects the data position serving as the random access point using the EP map illustrated in FIG. 34(*a*), that is, the EP map having correspondence information of the following data:

the NTP time recording region (NTP_time) 261; and the MMT byte address recording region (MMT_byte_adress) 262.

The reproducing device can acquire the MMT byte address corresponding to the NTP time serving as the random access point on the basis of the EP map and execute the random access reproduction process from the data position specified by the acquired address information.

Next, the following specific example illustrated in FIG. 34 will be described:

(b) the MMT format data-compatible EP map example 2 (compression example)

The example 2 illustrated in FIG. 34(*b*) has the following fields as the data recording field, similarly to the example 1 illustrated in FIG. 34(*a*):

an NTP time recording region (NTP_time) 263; and an MMT byte address recording region (MMT_byte_adress) 264.

In the example 2 illustrated in FIG. 34(*b*), a 64-bit NTP time is recorded in the NTP time recording region (NTP_time) 263, similarly to the example 1 illustrated in FIG. 34(*a*).

On the other hand, in the MMT byte address recording region (MMT_byte_adress) 264, for a first entry, the number of bytes from the beginning of the clip AV stream file (=the beginning of the first MMTP packet stored in the file) is recorded, and for a second or later entry, the number of bytes corresponding to a difference from the preceding entry is recorded.

With this setting, the MMT byte address recording region (MMT_byte_adress) 264 rerecording region is reduced to 32-bit data.

In the example 1, the number of bytes is recorded in the MMT byte address recording region with 64 bytes, but in the example 2, it is a configuration of recording with 32 bits, and the data amount of the EP map can be reduced.

Next, the following specific example will be described with reference to FIG. 35:

(c) the MMT format data-compatible EP map example 3 (division example)

The EP map illustrated in FIG. 35 is a setting having two maps, that is, a configuration of the following two map, similarly to the MPEG-2 TS-compatible EP map described with reference to FIGS. 32 and 33:

(a) a coarse EP map (EP_coarse); and (b) a fine EP map (EP_fine).

The MMT format data-compatible EP map example 3 (division example) illustrated in FIG. 35 has the following data:

(1) an NTP time of a coarse EP map (NTP_coarse) 265;

(2) an MMT byte address of a coarse EP map (MMT_byte_coarse) 266;

(3) a fine EP map reference data (ref_to_fine_id) 267;

(4) an NTP time of a fine EP map (NTP_fine) 268; and (5) an MMT byte address of a fine EP map (MMT_byte_fine) 269.

Further, (1) The NTP time of the coarse EP map (NTP_coarse) 265 is upper 32-bit data constituting a 64-bit NTP time described with reference to FIG. 34(*a*), that is, data of a second unit.

(2) The MMT byte address of the coarse EP map (MMT_byte_coarse) 266 is byte address from the beginning of a first MMTP packet stored in a stream file, similarly to the MMT byte address described with reference to FIG. 34(*a*) and is 64-bit byte address information indicating a data position corresponding to the NTP time of the coarse EP map (NTP_coarse) 265.

(3) The fine EP map reference data (ref_to_fine_id) 267 is reference data indicating a specific entry of the fine EP map similar as the fine EP map reference data (ref_to_EP_fine) 251 used for the MPEG-2 TS format-compatible EP map described with reference to FIGS. 32 and 33.

(4) The NTP time of the fine EP map (NTP_fine) 268 is lower-32 bit data constituting the 64-bit NTP time described with reference to FIG. 34(*a*), that is, data of a second unit or less.

(5) The MMT byte address of the fine EP map (MMT_byte_fine) 269 is byte address from the beginning of a first MMTP packet stored in a stream file (clip AV stream file), similarly to the MMT byte address described with reference to FIG. 34(*a*) and is 64-bit byte address information indicating a data position corresponding to the NTP time of the fine PP map (NTP_fine) 268.

The data correspond to the configuration data of the two EP maps described above with reference to FIG. 33.

In other words, (1) The PTS of the coarse EP map (PTS_EP_coarse) 252 illustrated in FIG. 33 is replaced with the NTP time of the coarse EP map (NTP_coarse) 265.

(2) The SPN of the coarse EP map (SPN_EP_coarse) 253 illustrated in FIG. 33 is replaced with the MMT byte address of the coarse EP map (MMT_byte_coarse) 266.

(3) The fine EP map reference data (ref_to_EP_fine) 251 of the coarse EP map illustrated in FIG. 33 is replaced with the fine FP map reference data (ref_to_fine_id) 267.

Further, (4) The PTS of the fine EP map (PTS_EP_fine) 254 illustrated in FIG. 33 is replaced with the NTP time of the fine EP map (NTP_fine) 268.

(5) The SPN of the fine EP map (SPN_EP_fine) 255 illustrated in FIG. 33 is replaced with the MMT byte address of the fine EP map (MMT_byte_fine) 269.

With such a change, the EP map including two tables corresponding to the MMT format data is constructed.

Next, the following specific example will be described with reference to FIG. 36:

(d) the MMT format data-compatible EP map example 4 (division & compression example)

The EP map illustrated in FIG. 36 is a combination of (c) the MMT format data-compatible EP map example 3 (division example) described with reference to FIG. 35 and (b) the MMT format data-compatible EP map example 2 (compression example) described with reference to FIG. 34(*b*).

The MMT format data-compatible EP map example 4 (division & compression example) illustrated in FIG. 36 includes the following data:

(1) an NTP time of a coarse EP map (NTP_coarse) 271;

(2) an MMT byte address of the coarse EP map (MMT_byte_coarse) 272;

(3) fine EP map reference data (ref_to_fine_id) 273;

(4) an NTP time of a fine EP map (NTP_fine) 274; and (5) an MMT byte address of a fine EP map (MMT_byte_fine) 275.

The data configuration is similar as (c) the MMT format data-compatible EP map example 3 (division example) described above with reference to FIG. 35.

Here, in (d) the MMT format data-compatible EP map example 4 (division & compression example) illustrated in FIG. 36, each of the following data is compressed to 32-bit data.

(2) the MMT byte address of the coarse EP map (MMT_byte_coarse) 272; and (5) the MMT byte address of fine EP map (MMT_byte_fine) 275.

Each of the data is set to 32-bit data, similarly to the compression example described above with reference to FIG. 34(2).

Specifically, similarly to the compression example described above with reference to FIG. 34(2), for a first entry, the number of bytes from the beginning of the clip AV stream file (=the beginning of the first MMTP packet stored in the file) is recorded, and for a second or later entry, the number of bytes corresponding to a difference from the preceding entry is recorded.

In other words, the following setting is performed.

In (2) the MMT byte address of the coarse EP map (MMT_byte_coarse) 272, similarly to the MMT byte address described with reference to FIG. 34(*b*), for a first entry, the number of bytes from the beginning of the clip AV stream file (=the beginning of the first MMTP packet stored in the file) is recorded, and for a second or later entry, 32-bit byte information which is the number of bytes corresponding to a difference from the preceding entry and indicates a data position corresponding to the NTP time of the coarse EP map (NTP_coarse) 271 is recorded.

In (5) the MMT byte address of the fine EP map (MMT_byte_fine) 275, similarly to the MMT byte address described with reference to FIG. 34(*b*), for a first entry, the number of bytes from the beginning of the clip AV stream file (=the beginning of the first MMTP packet stored in the file) is recorded, and for a second or later entry, 32-bit byte information which is the number of bytes corresponding to a difference from the preceding entry and indicates a data position corresponding to the NTP time of the fine EP map (NTP_fine) 274 is recorded.

With this setting, the data amount of the entire EP map can be reduced.

In the MPEG-2 TS format-compatible EP map described above with reference to FIGS. 32 and 33, the correspondence data between the PTS and the SPN is recorded, but as described with reference to FIGS. 34 to 36, the NTP time, the MMT byte address information, and the correspondence data thereof are recorded in the MMT format data-compatible EP map.

The NTP time or the MMT byte address information recorded in the EP map has to be a time or an address (data position) serving as the random access point.

For example, in the information processing device 30 which receives the MMT format data from the transmitting device 20 such as the broadcast station, generates the EP map, and records the EP map in the information recording medium (medium), it is necessary to acquire the position information which can be the random access point.

This process example will be described with reference to FIG. 37 and subsequent drawings.

FIG. 37 is a diagram illustrating a data configuration (syntax) of the MMTP packet constituting the MMT format data transmitted from the transmitting device 20 such as the broadcast station to the information processing device 30, for example.

As described above with reference to FIG. 3, the MMTP packet is constituted by an MMTP header and the MMTP payload. One type of data is stored in the MMTP payload of one MMTP packet. Specifically, data of any one type of, for example, the video (V), the audio (A), the subtitle (S), and the signaling information (MMT-SI) stored in the MMTP packet is stored in an individual MMTP packet.

FIG. 37 illustrates a data configuration of one MMTP packet which is constituted by a header portion 281 and a payload portion 282.

Information such as a type of data stored in the payload portion 282 is recorded in the header portion 281. A random access point information flag (RAP_flag) 283 is recorded as one of the record data of the header portion 281.

The random access point information flag (RAP_flag) 283 is a flag indicating whether or not the MMTP packet is a packet storing data serving as the random access point, and a flag of the following setting is recorded:

1 in a case where the MMTP packet is a packet storing data serving as the random access point; and 0 in a case where the MMTP packet is not a packet storing data serving as the random access point.

For example, the information processing device 30 which receives the MMT format data from the transmitting device 20 such as the broadcast station, generates the EP map, and records the EP map in the information recording medium (medium) checks the random access point information flag (RAP_flag) and acquires the position information which can be the random access point.

Figure 38:
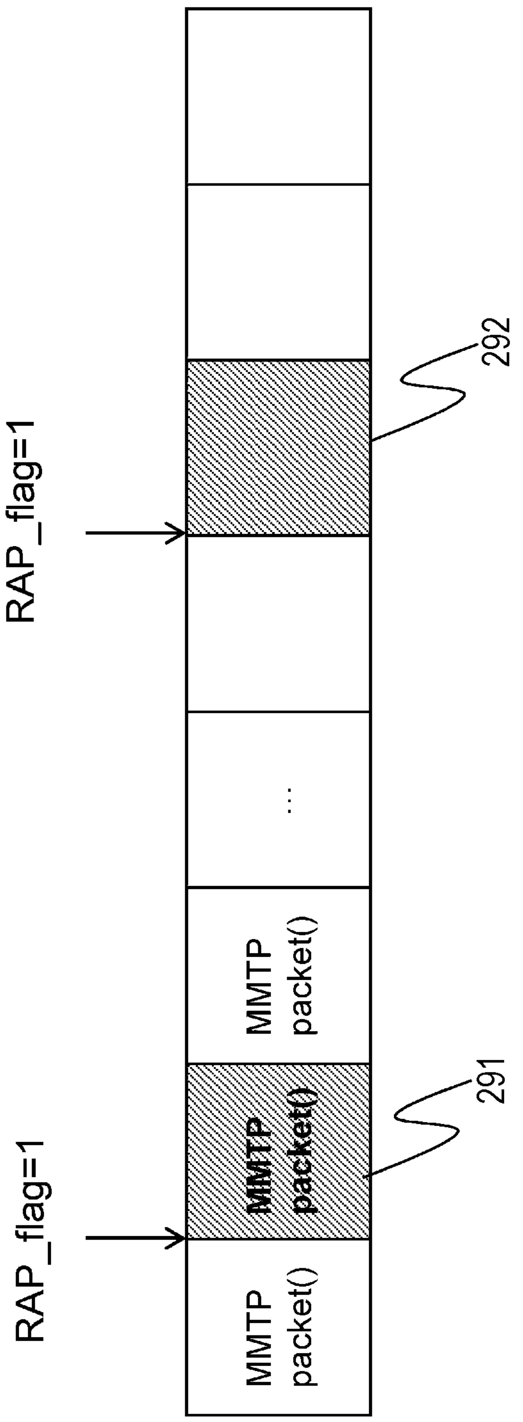
FIG. 38 is a diagram for describing a process of acquiring random access point information necessary for generating an MMT format data-compatible EP map.

FIG. 38 illustrates a specific process example.

The transmitting device 20 such as the broadcast station transmits an MMTP packet sequence constituting the MMT format data, and the information processing device 30 receives the MMTP packet sequence.

The information processing device 30 checks a setting value of RAP_flag stored in the header information of each MMTP packet and detects a setting packet with RAP_flag=1.

In the example illustrated in FIG. 38, MMTP packets 291 and 292 are setting packets with RAP_flag=1.

The information processing device 30 acquires or calculates the following information corresponding to the setting packets 291 and 292 with RAP_flag=1:

the NTP time; and the MMT byte address information, records the acquired or calculated information in the EP map in the clip information file corresponding to the MMT format data, and records it in information recording medium (medium).

Further, as described above, the NTP time can be acquired from, for example, the NPT described with reference to FIG. 18 and other drawings, that is, the MMT package table (MPT) specified in the MMT format.

The MMT byte address information can be acquired by calculating the number of bytes from the beginning of the first MMTP packet stored in the stream file (clip AV stream file) when the process of generating the clip information file including the MMTP packet is performed.

Next, a clip mark (ClipMark) which is another element recorded in the clip information file will be described with reference to FIG. 39.

As described above with reference to FIG. 21, the mark is data which can be recorded in the playlist file or the clip information file, for example, as a chapter delimiter, a scene change point, a book mark, a highlight, or time designation information of a characteristic scene of video data stored in the clip AV stream file.

The mark is recorded in the playlist file or the clip information file by a process of recording a time stamp indicating a time of the mark.

FIG. 39 is a diagram illustrating a data configuration (syntax) of the clip mark (ClipMark) which is an element of the clip information file.

A clip mark number (number_of_Clip_marks) 294 indicates the number of marks stored in the clip mark (ClipMark).

A mark type (mark_type) 295 is a field indicating a type of mark. For example, information indicating a mark type to which each mark such as a chapter start position, a chapter end position, a scene change position, or an edit position is recorded.

A mark time stamp (mark_time_stamp) 296 is a field in which a time stamp indicating a point at which the mark is set is recorded.

An elementary stream packet ID entry (entry_ES_PID) 297 is a field in which an identifier of a packet in which the mark is set is recorded.

A representative picture time stamp (representative_picture_time_samp) 298 is time stamp information indicating a point of an image representing the mark.

A duration 299 is a field in which a time interval between adjacent marks, for example, a length of a chapter is recorded.

The record data of the clip mark (ClipMark) illustrated in FIG. 39 in a case where the MPEG-2 TS format data of the related art is recorded as the clip AV stream file is specified, but in a case where the MMT format data is recorded as the clip AV stream file, it is not particularly specified.

Therefore, it is necessary to specify the record data of the clip mark (ClipMark) in a case where the MMT format data is recorded as the clip AV stream file.

Specifically, as illustrated in FIG. 39, time information according to a 64-bit NTP is recorded in the following time information recording fields:

the mark time stamp (mark_time_stamp) 296; and the representative picture time stamp (representative_picture_time_same) 298.

In a case where data recorded in the information recording medium (medium) as the clip AV stream file is the MMT format data, the information processing device 30 acquires the NTP time information recorded in the MMT package table (MPT) and records the NTP time information in the time information recording field of the clip mark (ClipMark) of the clip information file which is the reproduction control information file.

[7. Full Recording and Partial Recording of MMT Format Data]

Next, full recording and partial recording of the MMT format data will be described.

The above-described process is a process of generating the playlist file or the clip information file storing the reproduction control information, the attribute information, or the like related to the MMT format data stored in the clip AV stream file in the BDAV format illustrated in FIG. 4 or the SPAV format illustrated in FIG. 8.

Next, data stored in the clip AV stream file will be described.

For example, the information processing device 30 illustrated in FIG. 1 executes a process of recording the MMT format data transmitted from the transmitting device 20 such as the broadcasting server (broadcast station) 21 illustrated in FIG. 1 in an information recording medium (medium) such as a BD, an HD, or the like.

The information processing device 30 generates the clip AV stream file storing the MMT format data when the data is recorded. For example, it is the MMT format data-stored clip AV stream file 71 illustrated in FIG. 10.

Further, in the process example described above with reference to FIG. 9, the setting in which all pieces of information recorded in the control information (MMT-SI and TLV-SI) included in the delivery data according to the MMT format is recorded in the database file such as the playlist file or the clip information file has been described, but a configuration in which some pieces of the control information are stored in the clip AV stream file is also possible.

An example described below is a process example in a case where the clip AV stream file including the control information as described above is generated.

The following two data recording forms are assumed as a data recording process form for the MMT format data-stored clip AV stream file 71.

(1. Full Recording Process)

A full recording process of storing all of a video, an audio, a subtitle, further various control information, and other applications included in the received MMT format data in the clip AV stream file and recording them in the medium.

(2. Partial Recording Process)

A partial recording process of stores storing some of a video, an audio, a subtitle, further various control information, and other applications included in the received MMT format data in the clip AV stream file and recording them in the medium.

These two data recording processes are possible.

Figure 40:
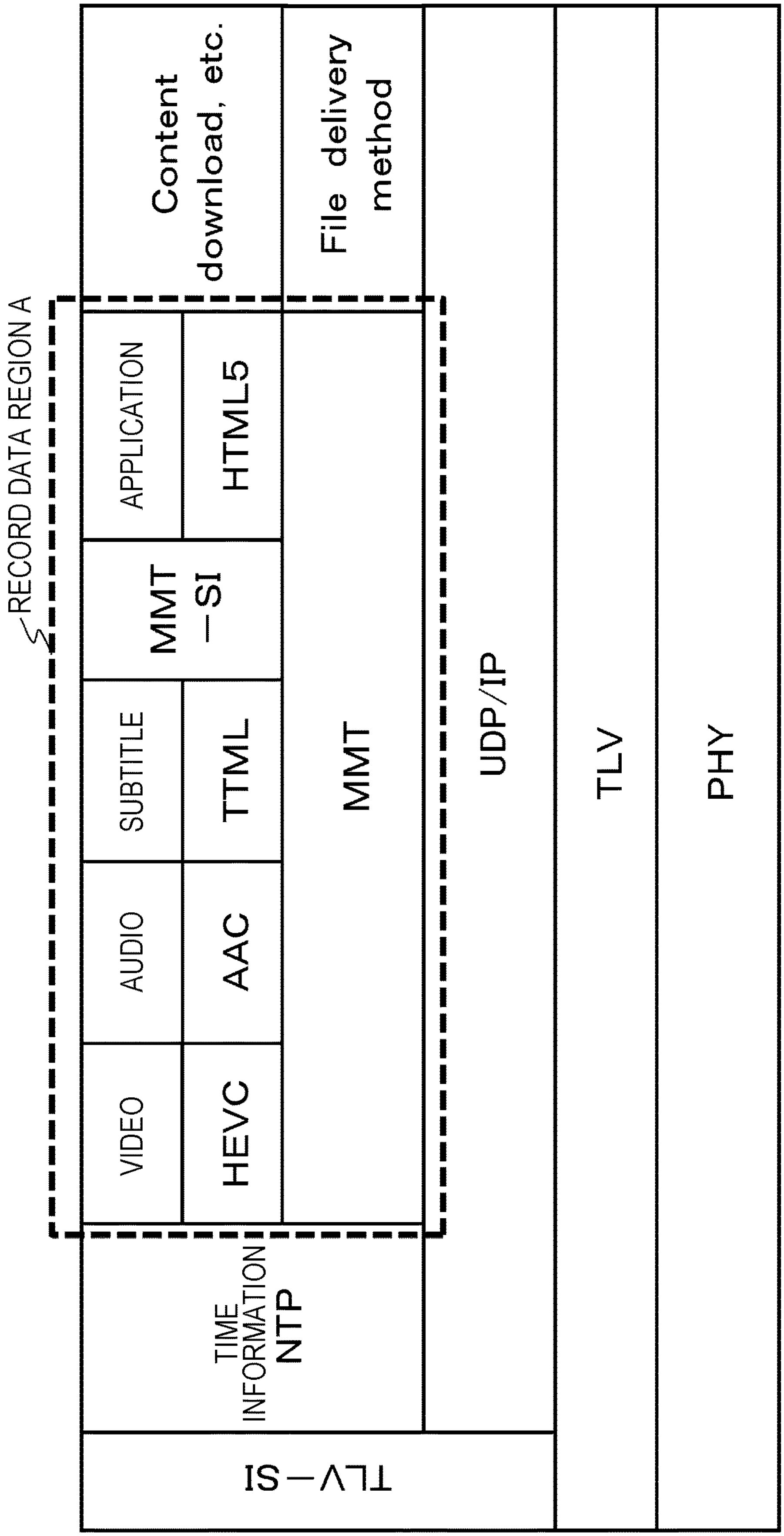
FIG. 40 is a diagram for describing an example of MMT format data recorded in a clip AV stream file.

For example, the full recording process is a process of storing all of the video, the audio, the subtitle, the control information (MMT-SI), and the application included in a record data region A illustrated in FIG. 40 in the clip AV stream file and recording them in the medium.

Figure 41:
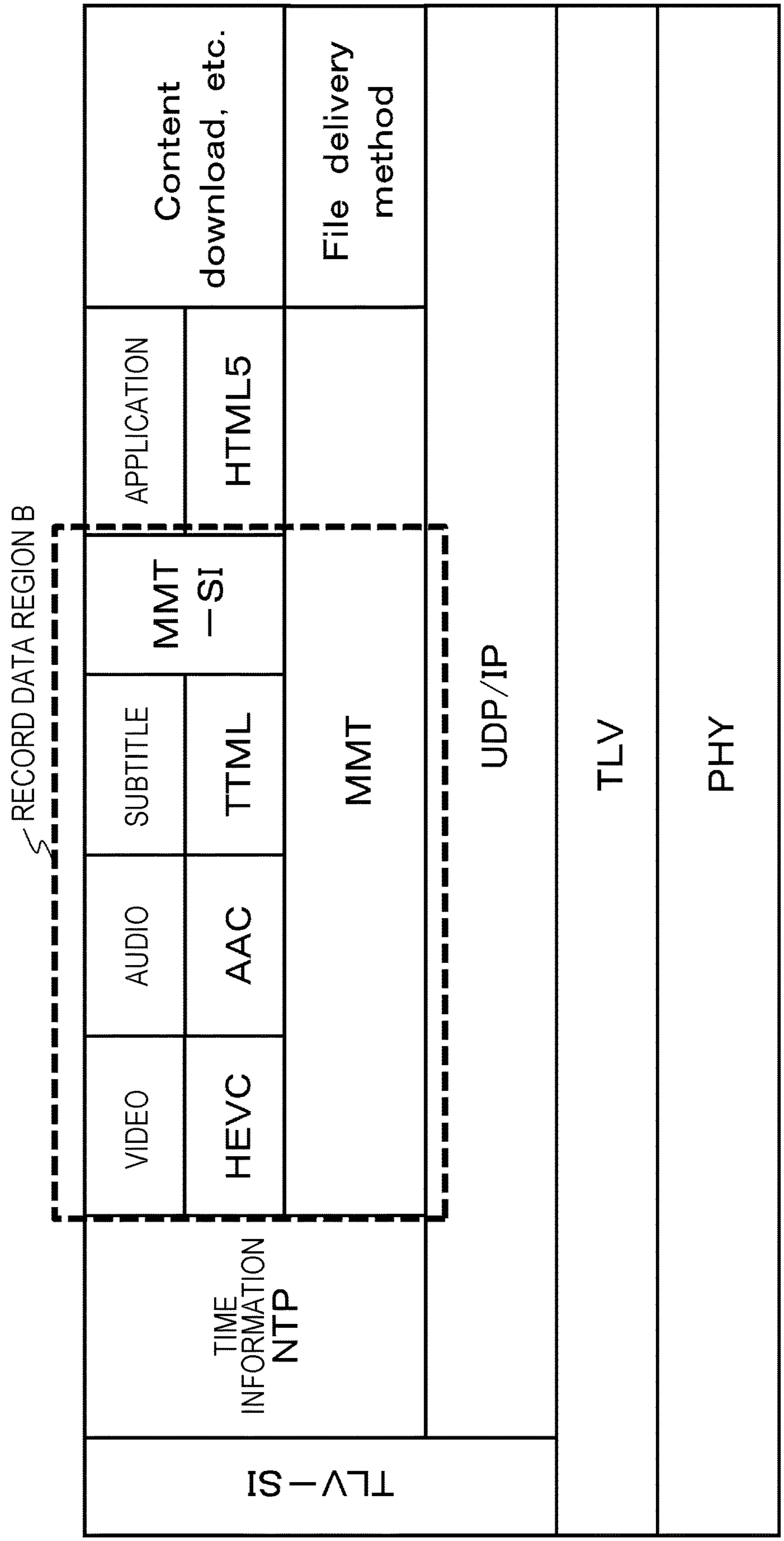
FIG. 41 is a diagram for describing an example of MMT format data recorded in a clip AV stream file.

Meanwhile, the partial recording process is a process of storing only the video, the audio, the subtitle, and the control information (MMT-SI) included in a record data region B illustrated in FIG. 41 in the clip AV stream file and recording them in the medium.

Further, it is also possible to perform the process of storing some of the video, the audio, the subtitle, and the control information (MMT-SI) in the clip AV stream file and recording them in the medium.

A specific partial recording process example will be described with reference to FIG. 42.

FIG. 42 is a diagram for describing a variation of a specific example of the partial recording process.

For example, (1) for the video, at least one video stream is recorded.

(2) For the audio, (2a) at least one audio stream is recorded.

(2b) A plurality of audio streams corresponding to a plurality of languages are recorded.

(3) For the subtitle, (3a) A maximum of two subtitle streams are recorded.

(3b) No subtitle stream is recorded.

(4) For the control information. (MMT-SI)

(4a) Only the MPT (see FIG. 18) is recorded.

(4b) Necessary information is selected in accordance with a record video, audio, or subtitle and recorded.

For example, the process of selecting record data is possible in accordance with a data type is possible as described above.

As an example of recording the control information, FIG. 42 illustrates the following two examples.

(4a) Only the MPT (see FIG. 18) is recorded.

(4b) Necessary information is selected in accordance with a record video, audio, or subtitle and recorded.

FIG. 43 illustrates the MPT.

The MPT illustrated in FIG. 43 is one of the signaling information (MMT-SI) transmitted through the MMTP packet as described above with reference to FIG. 18.

Various control information or attribute information are recorded in the MPT.

A descriptor corresponding to a type of control information is defined, and the control information or the attribute information is recorded for each defined descriptor.

As the descriptor, there are the following two types of descriptors:

an MPT descriptor (MPT_descriptor); and an asset descriptor (asset_descriptor).

In a data recording region of the asset descriptor, the control information or the attribute information of data are recorded for each data type (asset type) such as a video, an audio, a subtitle, or the like.

In a recording region of the MPT descriptor, the control information or the attribute information common to all assets are recorded regardless of the asset type.

Further, in the MMT format, several tens of types of descriptors are specified as a type of descriptor to be recorded in the MPT.

In a case where the full recording process described above is performed, the control information related to all the descriptors is recorded in the medium.

However, in a case where the partial recording process is performed, the process of selecting only data which is highly likely to be used at the time of data reproduction from the medium from the descriptors recorded in the MPT and recording the selected data is performed.

An example of the descriptor to be selected and recorded will be described with reference to FIG. 44.

FIG. 44 illustrates the following descriptors as an example of a target descriptor to be selected and recorded.

(A) an MPT descriptor (a1) an MH-parental rate descriptor (a2) a content copy control descriptor (a3) a content use control descriptor (B) an asset descriptor (b1) an MPU time stamp descriptor (b2) an MPU time stamp extension descriptor (b3) an MH-MPEG-4 audio descriptor (b4) an MH-MPEG-4 audio extension descriptor (b5) an MH-HEVC video descriptor (b6) a video component descriptor (b7) an MH-stream identification descriptor (b8) an MH-audio component descriptor (b9) an MH-data encoding scheme descriptor The descriptors are descriptors including the control information which is essential or highly likely to be used when the MMT format data recorded in the information recording medium (medium) is reproduced.

The descriptors will be described below.

(a1) The MH-parental rate descriptor of (A) the MPT descriptor is a descriptor indicating parental control information according to an age.

(a2) The content copy control descriptor is a descriptor indicating the copy control information of content.

(a3) The content use control descriptor is a descriptor indicating the use control information of content.

(b1) The MPU time stamp descriptor of (B) the asset descriptor indicates a presentation time of a first access unit of the MPU.

(b2) The MPU time stamp extension descriptor indicates a decoding time of the access unit of the MPU.

(b3) The MH-MPEG-4 audio descriptor describes basic information for specifying an encoding parameter of the audio stream of ISO/IEC 14496-3 (MPEG-4 audio).

(b4) The MH-MPEG-4 audio extension descriptor describes a profile and a level of the MPEG-4 audio stream and a setting specific to an encoding scheme.

(b5) The MH-HEVC video descriptor describes a basic encoding parameter of the video stream (HEVC stream) of ITU-T recommendation H.265|ISO/IEC 23008-2.

(b6) The video component descriptor indicates description of a parameter related to a video component and is also used to express an elementary stream in a character format.

(b7) The MH-stream identification descriptor is used to refer to description content (for example, a component stream of a certain service is "the number of pixels in the vertical direction is 4320, an aspect ratio is 16:9, there is a pan vector, and a frame rate is 60/1.001") indicated by a video component descriptor in an MH-EIT (an event information table transmitted as the control information (MMT-SI)) by a label assigned to a component stream of a service.

(b8) The MH-audio component descriptor indicates each parameter of the audio elementary stream and is also used to express the elementary stream in the character format.

(b9) The MH-data encoding scheme descriptor is used to identify the data encoding scheme.

For example, each of the descriptors is the control information which is necessary or likely to be necessary for the reproduction process of the content recorded in the information recording medium (medium), and a setting in which the descriptors are selected from the MTP and recorded in the information recording medium (medium) is desirable.

Further, it is necessary to record the MPT according to the MMT format the control information table which can be understood by the BDAV format data reproducing application which executes the data reproduction process according to the BDAV format.

A recording form of the control information table recorded in the information recording medium will be described with reference to FIG. 45.

FIG. 45 is a diagram illustrating items to be noted in a case where the information processing device 30 receives the MPT transmitted from the transmitting device 20 such as the broadcast station and stores the MPT in the clip AV stream file to be recorded in the information recording medium (medium).

The items will be described below.

A table ID (table_id) described in the MPT is an identifier of the table and has a fixed value of (0x20).

An MPT mode (MPT_mode) is a recording region of information specifying a processing order in a case where the MPT is divided into a plural itv of subsets. This value is assumed to be a value (00) indicating that the process is performed in accordance with an order of the subsets.

An MMT package ID length (MMT_package_id_length) indicates a byte length of a package ID and has a 2-byte fixed value.

An MMT package ID byte (MMT_packege_id_byte) indicates a package ID and records data recorded in the MPT without change.

The number of assets (number_of_assets) is the number of assets recorded in the following region, and records a numerical value coinciding with the number of assets to be recorded.

An identifier type (identofier_type) is an ID system of an MMTP packet flow, and has a value (0x00) indicating that it is an ID system indicating an asset ID.

An asset ID scheme (asset_id_scheme) is a format of an asset ID, and records data recorded in the MPT without change.

An asset ID (asset_id_byte) is an asset ID recording region, and records data recorded in the MPT without change.

An asset clock information flag (asset_clock_relation_flag) is information indicating the presence or absence of a clock information field of an asset and is set to a value (0) indicating that there is no clock information field of an asset.

A location count (location_count) is the number of asset locations and is fixed to 1.

Location information (MMT_general_location_info) is location information of an asset, and records data recorded in the MPT without change.

As described above, the information processing device 30 which executes the process of receiving the MMT format data from the transmitting device 20 such as the broadcast station and recording the MMT format data in the information recording medium records the data recorded in the MPT as the control information table which can be understood by the BDAV format data reproducing application that executes the data reproduction process according to the BDAV format.

As such a recording process is performed, it is possible to perform the process of reproducing the data recorded in the information recording medium by applying the control information or the attribute information provided by the transmitting device 20.

[8. Configuration and Process of Information Processing Device Which Executing Data Recording Process to Information Recording Medium]

Next, a configuration and a process of the information processing device which executes the data recording process to the information recording medium will be described with reference to FIG. 46 and subsequent drawings.

As described above, the information processing device of the present disclosure records input data according to the MMT format in the information recording medium such as a BD, an HD, or a flash memory as the BDAV format data.

Further, when the data recording process is performed, the control information, the attribute information, or the like corresponding to the MMT format data is recorded in the database file such as the playlist or the clip information file.

For example, the information is acquired from various information recording tables constituting the TLV-SI or the MMT-SI which is the control information included in the input data according to the MMT format. The information processing device acquires various information from the received data and records information corresponding to content recorded in the medium in the database file such as the playlist or the clip information file specified in the BDAV format.

A configuration and a process sequence of the information processing device which executes a process of generating an information recording medium in which the playlist or the clip information file is recorded, specifically, the data recording process to the information recording medium such as a BD will be described below.

Figure 46:
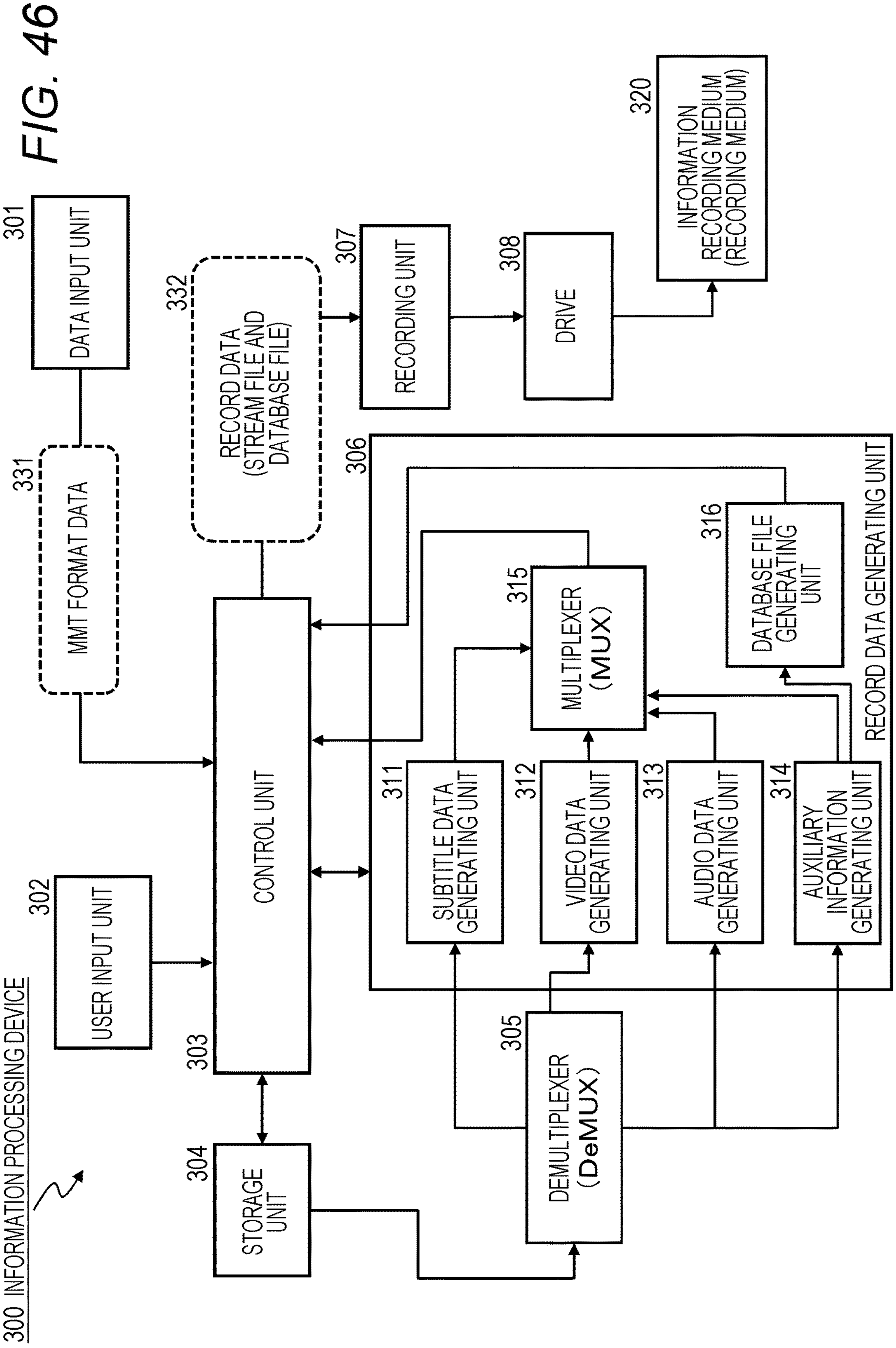
FIG. 46 is a diagram for describing a configuration example of an information processing device which executes a data recording process to an information recording medium (medium).

FIG. 46 is a diagram illustrating a configuration of an information processing device 300 which executes a data recording process to an information recording medium such as a BD.

The information processing device 300 records the clip AV stream file and further the database file such as the playlist or the clip information file in an information recording medium (recording medium) 320.

A data input unit 301 receives MMT format data 331 for the information recording medium 320, that is, the MMT format data 331 including video data, audio data, subtitle data, or the like.

The data input unit 301 is constituted by a receiving unit that receives transmission data from, for example, a broadcast station, a content server or the like which transmits the MMT format data 331, a medium reading unit that reads data from a medium storing the MMT format data 331, or the like.

The MMT format data 331 input from the data input unit 301 is data according to the data format described above with reference to FIG. 2, and includes high definition video data such as, for example, an HEVC image.

The MMT format data 331 is stored in a storage unit 304 under control of a control unit 303.

A user input unit. 302 receives, for example, a request to start data recording to the information recording medium 320, or the like.

Upon receiving the data recording start request from the user input unit 302, the MMT format data 331 stored in the storage unit 304 is input to a demultiplexer (DeMUX) 305 using the input as a trigger.

The demultiplexer (DeMUX) 305 acquires a packet storing data of each of a video, an audio, a subtitle, or the like, and auxiliary information such as the signaling information (TLV-SI and MMT-SI) storing the notification information, the control information, or the like from MMT format data 331, classifies the packets into packets of data types, and inputs the packets to a subtitle data generating unit 311, a video data generating unit 312, an audio data generating unit 313, and an auxiliary information generating unit 314 of a record data generating unit 306 in accordance with a data type.

The subtitle data generating unit 311 acquires the subtitle data from the MMT format data 331 which is input by the data input unit 301 and stored in the storage unit 304, and generates stream file storage data specified in the BDAV format.

The video data generating unit 312 acquires the video data from the MMT format data 331 which is input by the data input unit 301 and stored in the storage unit 304, and generates stream file storage data specified in the BDAV format.

The audio data generating unit 313 acquires the audio data from the MMT format data 331 which is input by the data input unit 301 and stored in the storage unit 304, and generates stream file storage data specified in the BDAV format.

The auxiliary information generating unit 314 acquires the auxiliary information such as the signaling information (TLV-SI and MMT-SI) storing the notification information, the control information, or the like from MMT format data 331 which is input by the data input unit 301 and stored in the storage unit 304, and generates data to be stored in the playlist file or the clip information file serving as the database file or the clip AV stream file specified in the BDAV format.

A multiplexer (MUX) 315 receives the data of each of the subtitle, video, and audio data converted by the subtitle data generating unit 311, the video data generating unit 312, and the audio data generating unit 313 and various information acquired from the signaling information (TLV-SI and MMT-SI) and the like of the MMT format data 331 by the auxiliary information generating unit 314, and generates a stream file storing the data.

A database file generating unit 316 generates the database file such as the playlist file or the clip information file in which various information acquired from the signaling information (TLV-SI and MMT-SI) of the MMT format data 331 by the auxiliary information generating unit 314 is recorded.

Record data 332 including the stream file data generated by the record data generating unit 306 and the database file such as the playlist file, the clip information file, or the like is output to and recorded in the information recording medium 320 via a drive 307 through a recording unit 306 under the control of the control unit 303.

Next, a sequence of the data recording process to the information recording medium 320 executed by the information processing device 300 illustrated in FIG. 46 will be described with reference to a flowchart illustrated in FIG. 47.

Figure 47:
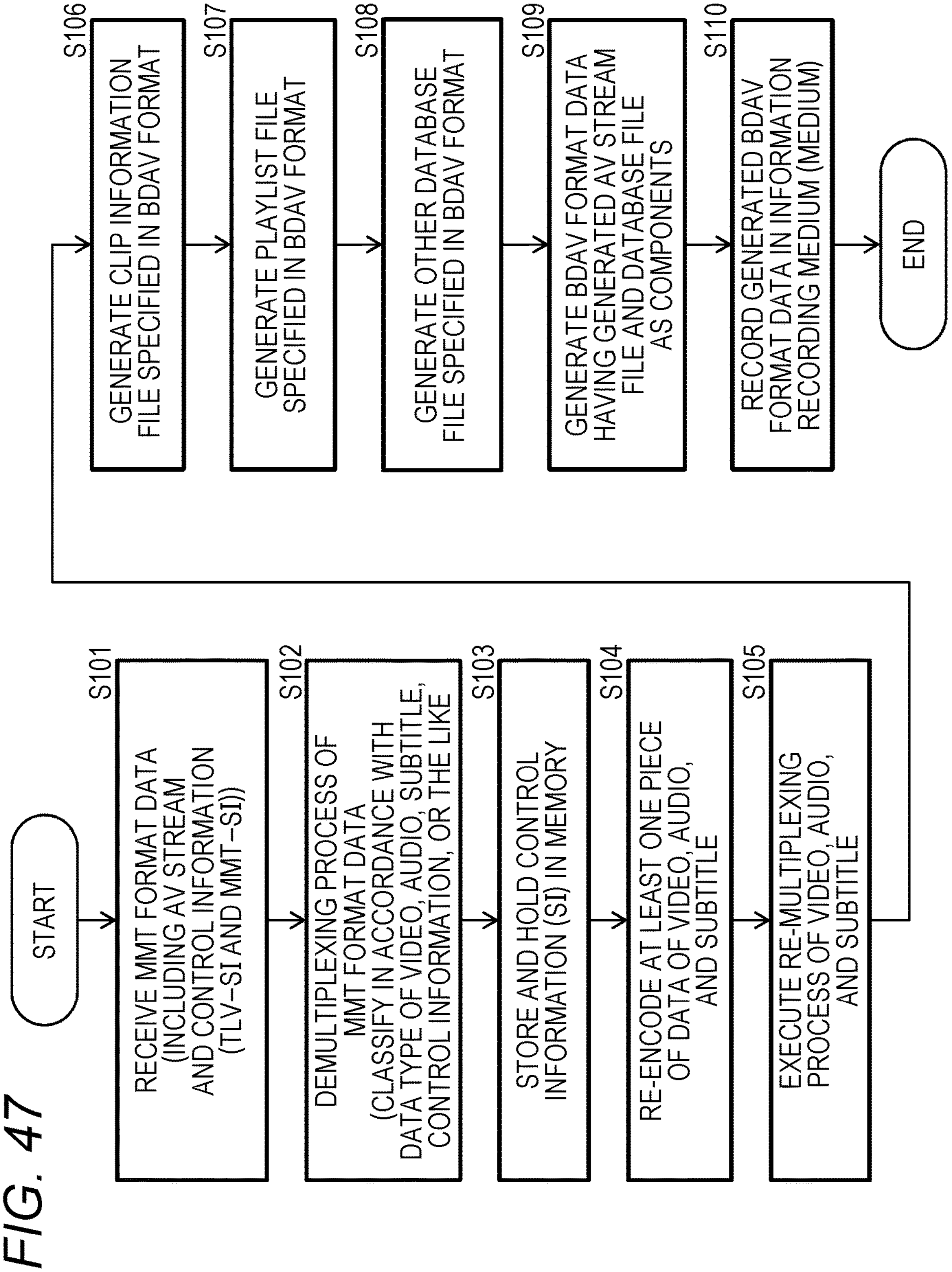
FIG. 47 is a flowchart for describing a process sequence of a data recording process to an information recording medium (medium).

For example, the process according to the flow illustrated in FIG. 47 can be executed under the control of a data processing unit (control unit) including a CPU having a program execution function in accordance with a program stored in a storage unit of the information processing device.

Processes of respective steps illustrated in the flow of FIG. 47 will be sequentially described below.

(Step S101)

First, in step S101, the information processing device 300 receives the MMT format data which is recording data via the data input unit 301.

Further, the recording data includes the video data, the audio data, the subtitle data, and further the signaling information (TLV-SI and MMT-SI) or the like storing the notification information, the control information, and the like.

(Step S102)

Then, in step S102, the information processing device 300 performs a demultiplexing process of the input MMT format data, that is, a data separating process of a data type unit. A separating process of the video, the audio, the subtitle, the control information, or the like is executed.

(Step S103)

Then, in step S103, the information processing device 300 stores the control information separated in step S102, for example, the signaling information (TLV-SI and MMT-SI) in a memory.

(Step S104)

Then, in step S104, the information processing device 300 executes a process of re-encoding data of at least one of the video, the audio, or the subtitle separated in step S102.

Further, thus process is a process performed in a case where an encoding form of data to be recorded in the information recording medium is changed, and the re-encoding process is unnecessary in a case where the received data is recorded without change.

(Step S105)

Then, in step S105, the information processing device 300 executes a process of multiplexing data including the video, the audio, or the subtitle, and further the reproduction control information or the like including encoded data in step S103. In other words, the process of generating the clip AV stream file is executed.

Further, the reproduction control information to be stored in the clip AV stream file is, for example, information or the like acquired from the MPT described with reference to FIGS. 40 to 45.

(Step S106)

Then, in step S106, the information processing device 300 generates the clip information file by using the configuration data of the input MMT format data.

For example, the clip information file described with reference to FIGS. 23 to 39, that is, the clip information file corresponding to the clip AV stream file storing the MMT format data, is generated.

Further, a detailed sequence of the process of generating the clip information file in step S106 will be described in detail later with reference to the flow illustrated in FIG. 48.

(Step S107)

Then, in step S107, the information processing device 300 generates the playlist file using a configuration data of the input MMT format data.

For example, the playlist file described above with reference to FIGS. 11 to 22, that is, the playlist file corresponding to the clip AV stream file storing the MMT format data is generated.

Further, the playlist file generation process of step S107 will be described later in detail in reference to FIG. 49.

(Step S108)

Then, in step S108, the information processing device 300 generates other database files using the input MMT format data.

(Step S109)

Then, in step S109, the information processing device 300 generates the BDAV format data using the generated AV stream file and the database file.

(Step S110)

Then, in step S110, the information processing device 300 records the BDAV format data generated in step S109 in the information recording medium (medium).

Next, a detailed sequence of the clip information file generation process executed in step S106 will be described with reference to a flowchart illustrated in FIG. 48.

Figure 48:
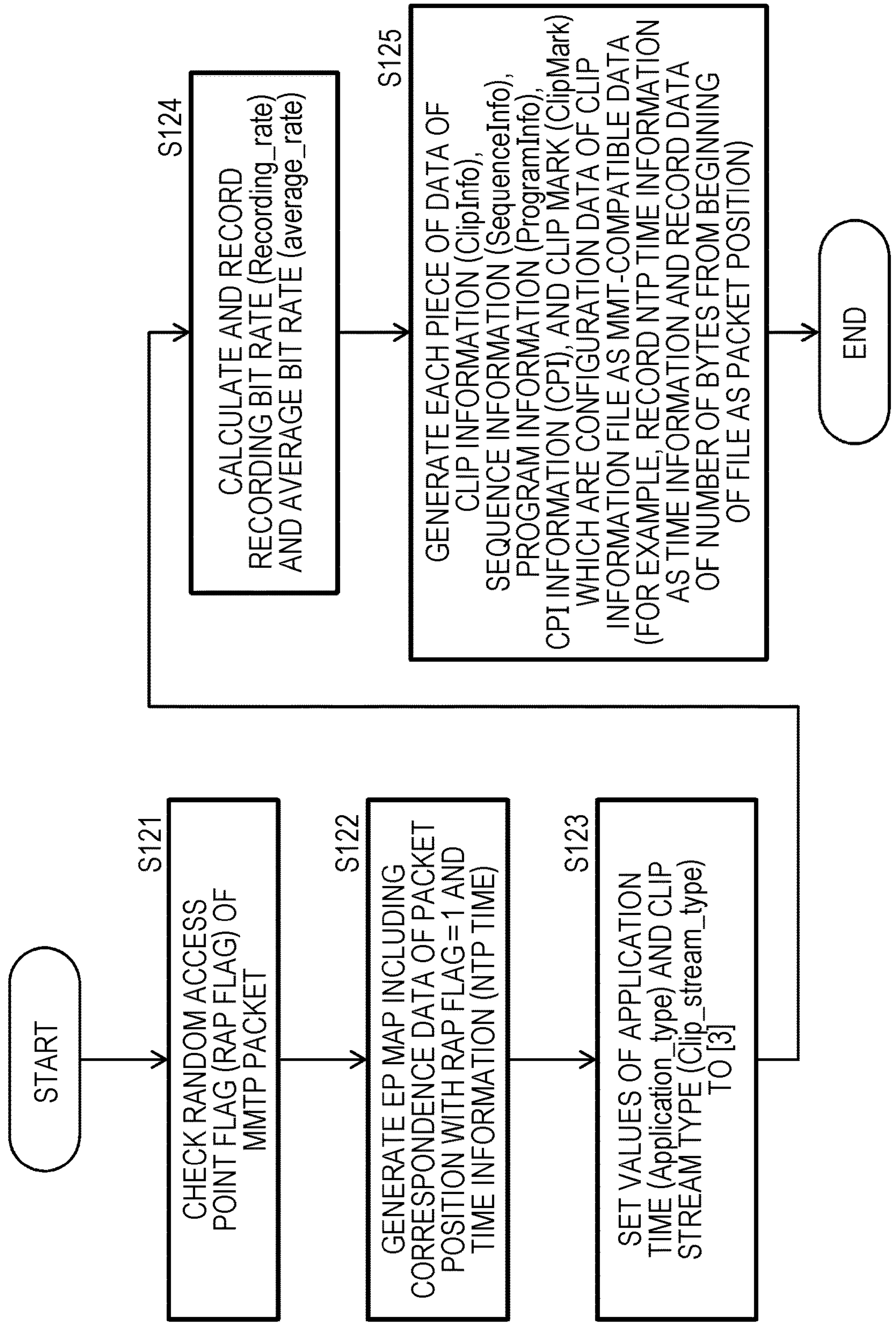
FIG. 48 is a flowchart for describing a process sequence of a data recording process to an information recording medium (medium).

Further, the flowchart illustrated in FIG. 48 is a sequence of generating the clip information used for controlling clip AV stream file storing the MMT format data.

Processes of respective steps of the flow illustrated in FIG. 48 will be sequentially described.

(Step S121)

First, in step S121, the information processing device 300 checks the random access point (RAP) flag of the MMTP packet which is the MMT format data stored in the clip AV stream file.

This process is the process described above with reference to FIG. 38.

The MMTP packet in which RAP flag=1 is set is data including the random access point.

(Step S122)

Then, in step S122, the information processing device 300 generates the EP map including the correspondence data of the packet position of the MMTP packet in which RAP flag=1 is set and the time information (NTP time).

This process is the process of generating the MMT format data-compatible EP map described above with reference to FIGS. 34 to 38. The byte position from the beginning of the clip AV stream file (=the beginning of the first MMTP packet stored in the file) is used as the packet position information. Further, the NTP time is used as the time information.

(Step S123)

Then, in step S123, the information processing device 300 sets values of the application type (Application_type) of the clip information file and the clip stream type (Clip_stream_type) to [3].

This process is the process described above with reference to FIGS. 24 to 26, and is the process of recording the setting value for identifying that the storage data of the clip AV stream file serving as the control target data of the clip information file is the MMT format data.

(Step S124)

Then, in step S124, the information processing device 300 records the recording rate (recording_rate) and the average rate (average_rate) of the clip information file.

This process is the data recording process of the following information described above with reference to FIG. 24:

the TS average rate (TS_avrage_rate) 214; and the TS recording rate (TS_recording_rate) 215.

As described above, the average bit rate and the recording rate of the transport stream of the clip AV stream file which is the reproduction target data by the clip information file are indicated in units of bytes or seconds.

This bit rate information is assumed to be calculated on the basis of the TS packet, and in a case where the reproduction target data is the MMT format having the MMT packet, the bit rate corresponding to the MMT format is calculated and recorded. Alternatively, in a case where the reproduction target data is the MMT format, a setting in which an invalid value is recorded in the field so that the bit rate information is not used may be performed.

(Step S125)

Then, in step S125, the information processing device 300 generates the following data which is the configuration information of the clip information file:

the clip information (ClipInfo);

the sequence information (SequenceInfo);

the program information (ProgramInfo);

the CPI information (CPI); and the clip mark (ClipMark).

Further, in a case where the reproduction target data is the MMT format data in the process of generating each pieces of data, for example, the NTP time information is acquired and recorded as the time information, and data indicating the number of bytes from the beginning of the first MMTP packet stored in the stream file (clip AV stream file) is acquired and recorded as the packet position.

With these processes, the clip information file corresponding to the MMT format data is generated.

Further, in a case where the control target is the clip AV stream file storing the MPEG-2 TS format data, the clip information file generation process similar to that of the related art may be performed.

Next, a detailed sequence of the playlist file generation process executed in step S107 in the flow illustrated in FIG. 47 will be described with reference to the flowchart illustrated in FIG. 49.

Figure 49:
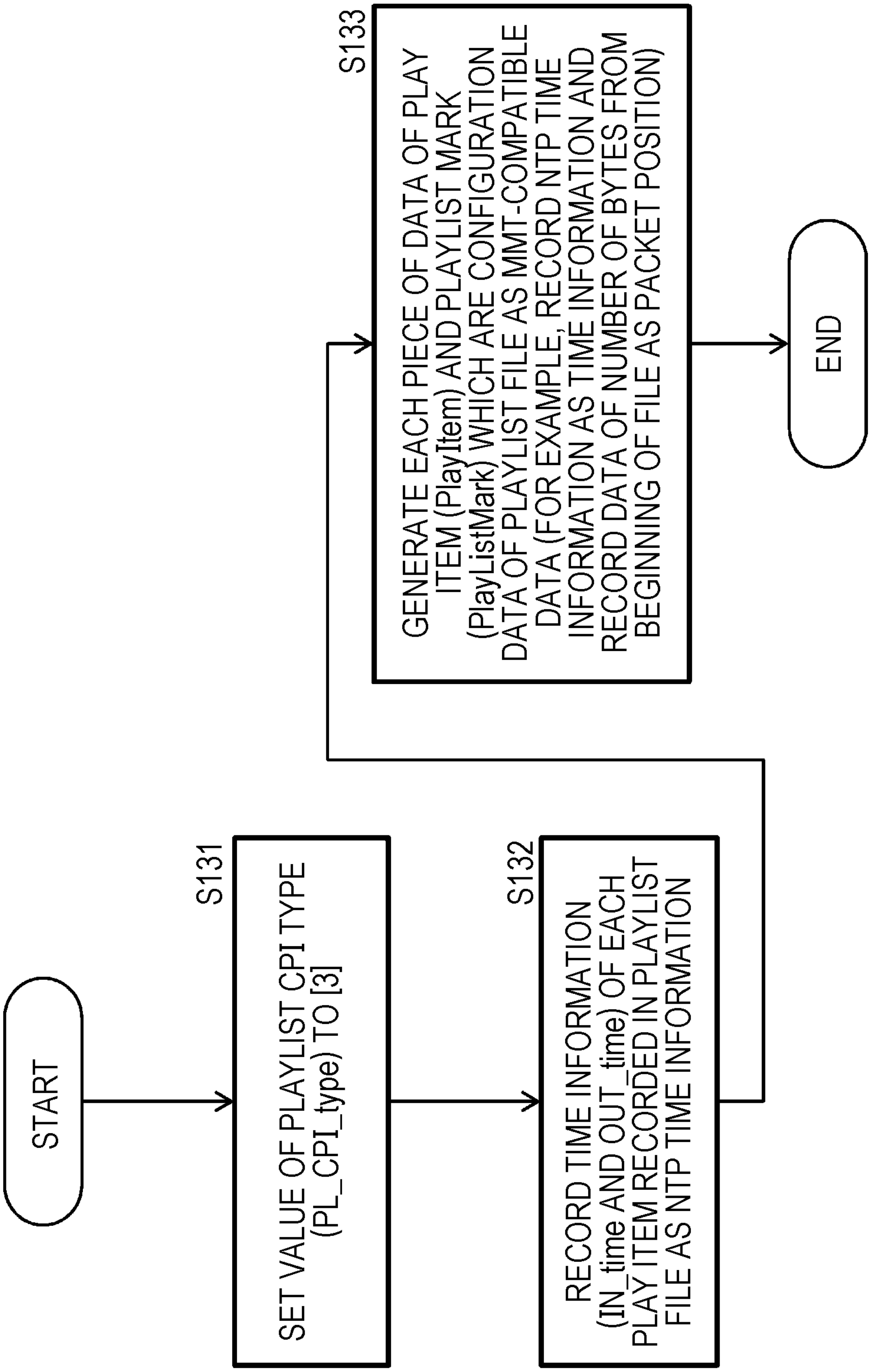
FIG. 49 is a flowchart for describing a process sequence of a data recording process to an information recording medium (medium).

Further, the flowchart illustrated in FIG. 49 is a generation sequence of the playlist used for controlling the clip AV stream file storing the MMT format data.

Processes of respective steps of the flow illustrated in FIG. 49 will be sequentially described.

(Step S131)

First, in step S131, the information processing device 300 sets the value of the CPI type (PL_CPI_type) to be recorded in the playlist file to [3].

This process corresponds to the process described above with reference to FIGS. 11 to 15.

As described above with reference to "(2) New CPI type record data (MPEG-2 TS-compatible data and MMT-compatible data are recorded)" of FIG. 15, the PL_CPI type (PL_CPI_type)=3 means that the CPI type in the clip information file which is referred to by the play item. (PlayItem) specified in the playlist file is the MMT-compatible EP map.

(Step S132)

Then, in step S132, the information processing device 300 records the time information (IN_time and OUT_time) of each play item recorded in the playlist file as the NTP time information.

This process corresponds to the process described above with reference to FIGS. 16 and 17.

As illustrated in "(2) New play item information record data (MMT-compatible playlist)" of FIG. 17(2), the start time (IN_time) is the reproduction start time information of the play item (PlayItem) reproduction start point. In a case where the reproduction target data is the MMT format data, the time information according to the NTP is recorded.

The end time (OUT_time) is the reproduction end time information of the play item (PlayItem) reproduction end point. In a case where the reproduction target data is the MMT format data, the time information according to the NTP is recorded.

For example, the time information according to the NTP is transmitted along with the MMT format data including broadcast content or the like transmitted by the transmitting device 20 such as the broadcasting server (broadcast station) 21 illustrated in FIG. 1.

The information processing device 30 such as the television (TV) 32 acquires the time information according to the NTP transmitted by the transmitting device 20 and records the time information in the playlist.

(Step S133)

Then, in step S133, the information processing device 300 generates the following data which is the configuration data of the playlist file:

the play item (PlayItem); and the playlist mark (PlayListMark).

Further, in a case where the reproduction target data is the MMT format data in the process of generating each piece of data, for example, the NTP time information is acquired and recorded as the time information, and data indicating the number of bytes from the beginning of the first MMTP packet stored in the stream file (clip AV stream file) is acquired and recorded as the packet position.

With these processes, the playlist file corresponding to the MMT format data is generated.

Further, in a case where the control target is the clip AV stream file storing the MPEG-2 TS format data, the playlist file generation process similar to that of the related art may be performed.

The information processing device 300 can record and reproduce the input MMT format data as the playlist file, the clip information file, and the clip AV stream file according to the BDAV format by performing the process according to the flow described with reference to FIGS. 47 to 49.

[9. Configuration and Process of Information Processing Device Which Executes Data Reproduction Process from Information Recording Medium]

Next, a configuration and a process of the information processing device which executes the data reproduction process from the information recording medium will be described with reference to FIG. 50 and subsequent drawings.

The information processing device that executes the reproduction process executes the reading process and the reproduction process of the data recorded in the information recording medium installed in the device.

Figure 50:
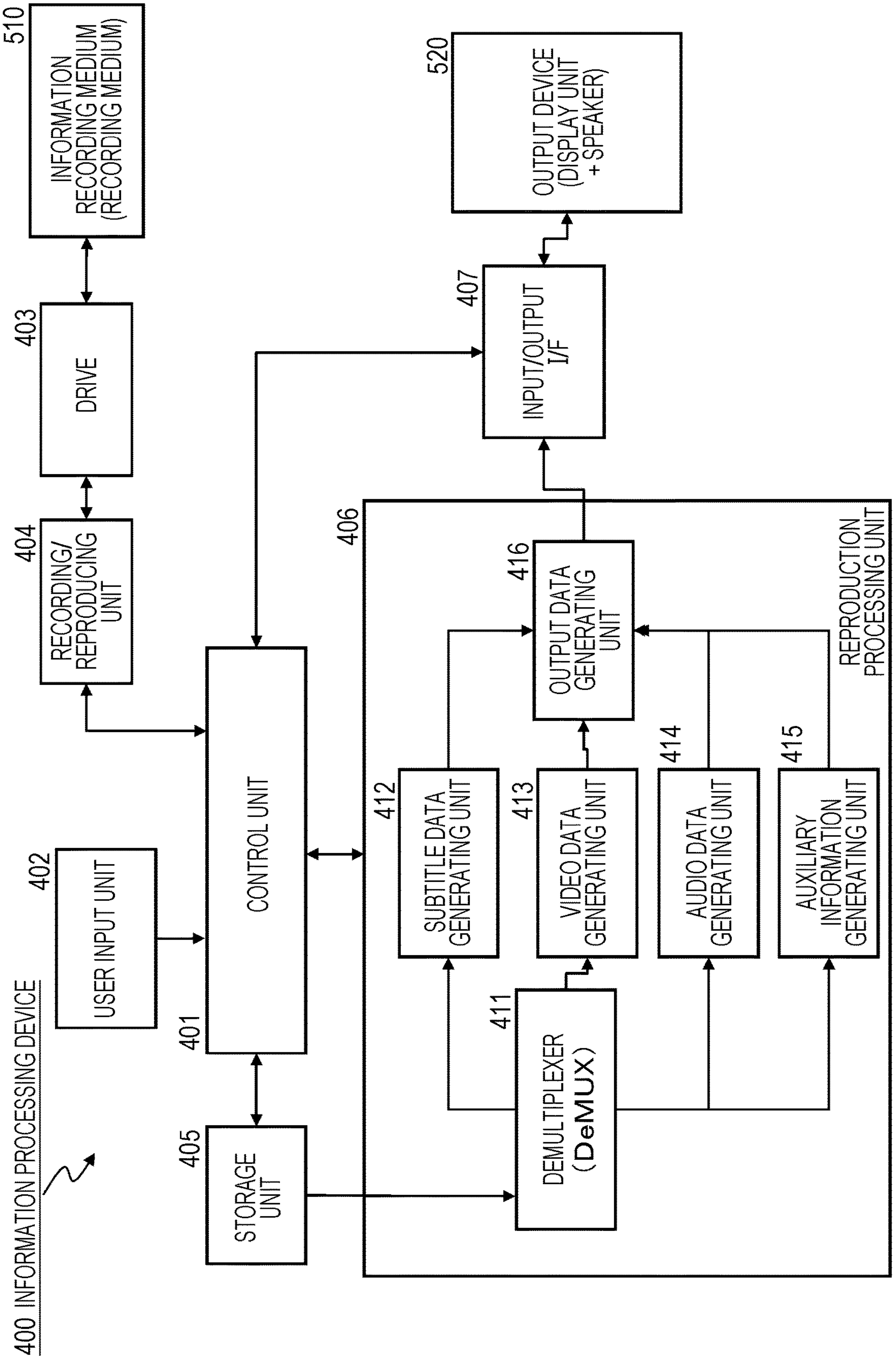
FIG. 50 is a diagram for describing a configuration example of an information processing device which executes a data reproduction process from an information recording medium (medium).

FIG. 50 is a diagram illustrating a configuration of an information processing device 400 which executing a reproduction process of data recorded in an information recording medium 510 such as a BD.

The information processing device 400 reads data recorded in the information recording medium (recording medium) 510 illustrated in FIG. 50 and outputs the read data to an output device (display unit+speaker) 520. Further, the output device 520 is, for example, a television or the like, and is a display device including a display, a speaker, or the like.

Further, the information processing device 400 may be the same device as the information processing device 300 which performs the data recording described above with reference to FIG. 46. In other words, the information processing device 400 is an information processing device having both functions of data recording/reproducing.

The information recording medium (recording medium) 510 is a recording medium in which the AV stream file generated by the process described with reference to FIGS. 46 to 49 and a database such as the playlist or the clip information file are recorded.

A control unit 401 reads the record data of the information recording medium 510 via a recording/reproducing unit 404 and a drive 403, for example, on the basis of an input of reproduction instruction information from a user input unit 402, stores the record data in a storage unit 405 serving as a data buffer, and outputs the storage data to a reproduction processing unit 406.

Under the control of the control unit 401, the reproduction processing unit 406 acquires each piece of data from the clip AV stream file storing the reproduction data read from the information recording medium 510, that is, data of each of the video, the audio, the subtitle, or the like, and generates the reproduction data.

A demultiplexer (DeMUX) 411 acquires data-stored packets storing each piece of data such as the video, the audio, the subtitle, the playlist file, the clip information file, the like, classifies the packets into packets of data types, and inputs the packets to a subtitle data generating unit 412, a video data generating unit 413, an audio data generating unit 414, and an auxiliary information generating unit 415.

The subtitle data generating unit 412, the video data generating unit 413, and the audio data generating unit 414 execute a process of decoding the data stored in the packet or the like, and output decoded data to an output data generating unit 416.

The output data generating unit 416 outputs each piece of data of the subtitle, the video, and the audio to the output device (display unit+speaker) 520 via an input/output interface 407.

Further, the information recording medium 510 may store the following files as the stream file storing the reproduction target data:

the stream file storing the MPEG-2 TS format data; and the stream file storing the MMT format data.

In the case, the information processing device 400 can execute the process of reproducing the stream file storing the MPEG-2 TS format data and the stream file storing the MMT format data by applying the playlist file or the clip information file specified in the BDAV format.

The auxiliary information generating unit 415 acquires, for example, recording content list display data stored in the playlist file or the clap information file, generates a recording content list, and outputs the generated list to the output device (display unit+speaker) 520.

The output device (display unit+speaker) 520 outputs data of each of the subtitle, the video, the audio, or the like input from the information processing device 400 via the output device (display unit+speaker) 520.

Further, the information recording medium 510 stores data in which the MMT format data is recorded in accordance with the BDAV format, and the information processing device 400 acquires the recording information of the playlist file or the clip information which is the database file specified in the BDAV format and executes the reproduction control process.

Next, a sequence of the data reproduction process from the information recording medium 510 executed by the information processing device 400 illustrated in FIG. 50 will be described with reference to a flowchart illustrated in FIG. 51.

Figure 51:
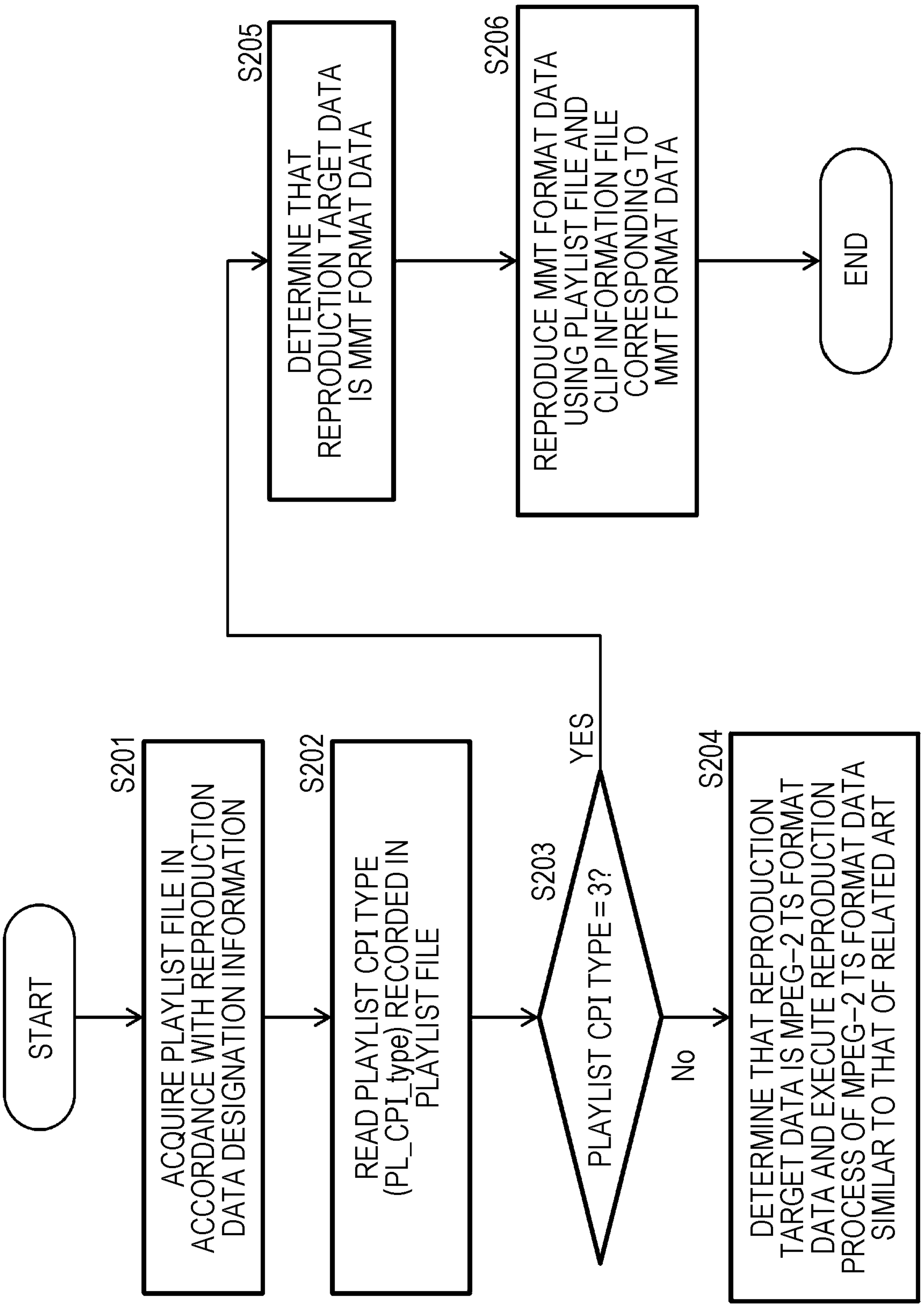
FIG. 51 is a flowchart for describing a process sequence of a data reproduction process from an information recording medium (medium).

A process according to the flow illustrated in FIG. 51 can be executed under the control of a data processing unit (control unit) having a CPU having a program execution function in accordance with a program stored in the storage unit of the information processing device 400, for example.

Further, the information processing device which executes the process according to the flow illustrated in FIG. 51 is the information processing device 400 illustrated in FIG. 50, the information recording medium (recording medium) 510 is installed in the information processing device, and the information processing device reads the data recorded in the installed information recording medium 510 and outputs the data to the output device (display unit+speaker) 520. Further, the output device 520 is, for example, a television or the like, and is a display device including a display, a speaker, and the like.

The information recording medium (recording medium) 510 is a recording medium in which the AV stream generated by the process described with reference to FIGS. 46 to 49 and a database such as the playlist or the clip information file are recorded.

Processes of respective steps illustrated in the flow of FIG. 51 will be sequentially described below.

(Step S201)

First, in step S201, for example, the control unit 401 of the information processing device 400 reads the playlist file storing the reproduction control information corresponding to reproduction data designated in accordance with reproduction data designation information input by the user from the information recording medium (medium).

(Step S202)

Then, in step S202, the control unit 401 of the information processing device 400 reads the PL_CPI type (PL_CPI_type) recorded in the playlist file.

As described above with reference to FIGS. 11 to 15, the PL_CPI type (PL_CPI_type) is the information indicating the CPI type in the clip information file which is referred to by the play item (PlayItem) specified in the playlist file.

Further, the CPI is the record data of the clip information file, and is, for example, data for acquiring the data address of the reproduction start point.

As illustrated in FIG. 15, the PL_CPI type (PL_CPI_type)=1 means that the CPI type in the clip information file which is referred to by the play item (PlayItem) specified in the playlist file is an MPEG-2 TS-compatible EP map.

The PL_CPI type (PL_CPI_type)=2 means that the CPI type in the clip information file which is referred to by the play item (PlayItem) specified in the playlist file is an MPEG-2 TS-compatible TU map.

The PL_CPI type (PL_CPI_type)=3 means that the CPI type in the clip information file which is referred to by the play item (PlayItem) specified in the playlist file is an MMT-compatible EP map.

As described above, as three CPI types of PL_CPI type (PL_CPI_type)=1 to 3 can be defined, three CPI types can be identified.

(Step S203)

Then, in step S203, the control unit 401 of the information processing device 400 determines whether or not the setting value of the PL_CPI type (PL_CPI_type) read in step S202 is [3].

In other words, it is determined whether or not the CPI type in the clip information file which is referred to by the play item (PlayItem) specified in the playlist file is the MMT-compatible EP map.

In a case where the PL_CPI type (PL_CPI_type)=3, determination of step S203 is Yes, and the process proceeds to step S205.

On the other hand, in a case where the PL_CPI type (PL_CPI_type) is not 3, determination of step S203 is No, and the process proceeds to step S204.

(Step S204)

In a case where the PL_CPI type (PL_CPI_type) is not 3, the process of step S204 is executed.

In a case where the PL_CPI type is not 3, the CPI type in the clip information file which is referred to by the play item (PlayItem) specified in the playlist file is 1 or 2, and the reproduction target data is the MPEG-2 TS format data.

In the case, the information processing device 400 executes the reproduction process of the MPEG-2 TS format data by applying the reproduction process technique of the related art.

(Step S205)

On the other hand, in a case where the PL_CPI type (PL_CPI_type) is 3, in step S205, it is determined that the reproduction target data by the playlist file is the MMT format data.

(Step S206)

Then, in step S206, the information processing device 400 executes the reproduction process of the storage data of the clip information file storing the MMT format data by applying the playlist and the clip information file corresponding to the MMT format data.

Figure 52:
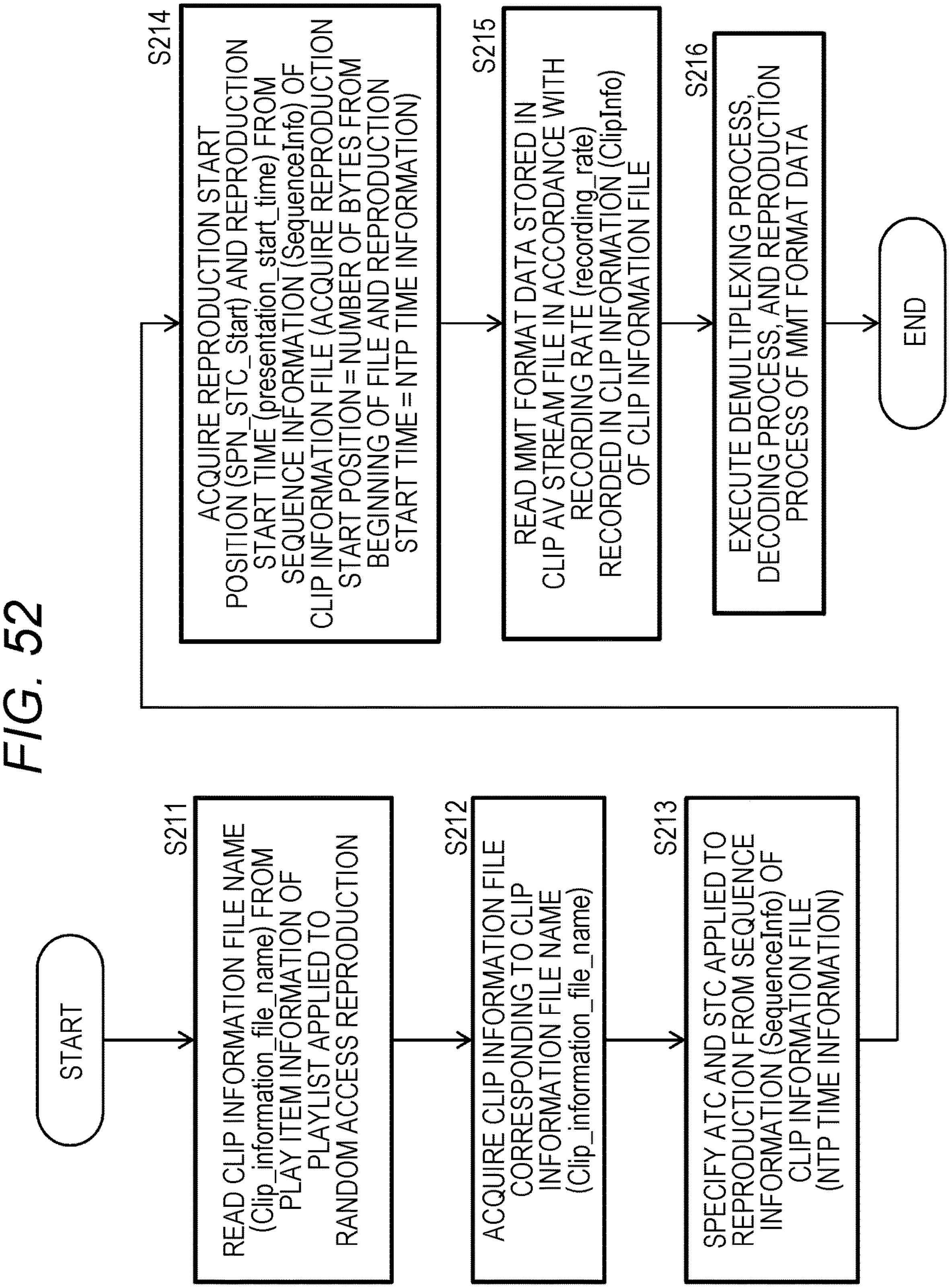
FIG. 52 is a flowchart for describing a process sequence of a data reproduction process from as information recording medium (medium).

Next, as a specific example of the reproduction process of the MVIT format data, a sequence of a random access reproduction process to which the MMT format data-compatible EP map recorded in the clip information file is applied will be described with reference to a flowchart illustrated in FIG. 52.

Further, the MMT format data-compatible EP map is, for example, an EP map having one of the configurations described above with reference to FIGS. 34 to 36, that is, an EP map constituted by the correspondence data of the time information corresponding to the random accessible data position and the byte position information from the beginning o£ the first MMTP packet stored in stream file (clip AV stream file) or the like.

Processes of respective steps of the flowchart illustrated in FIG. 52 will be described.

(Step S211)

First, in step S211, the information processing device 400 reads a clip information file name (Clip_information_file_name) from the play item information of the playlist applied to the random access reproduction.

This is the data recorded in the play item (PlayItem) information in the playlist file described above with reference to FIG. 16.

(Step S212)

Then, in step S212, the information processing device 400 reads the clip information file having the clip information file name (Clip_information_file_name) read from the playlist file in step S211 from the information recording medium (medium).

(Step S213)

Then, in step S213, the information processing device 400 specifies the ATC and the STC which are clock information applied to the reproduction from the sequence information (SequenceInfo) of the clip information file. Further, the time information is recorded as the NTP time information in a case where the reproduction target data is the MMT format data.

Further, the sequence information (SequenceInfo) of the clip information file has the data configuration described above with reference to FIG. 27, and the information related to the ATC and the STC is specified.

The ATC and the STC have been described above with reference to FIG. 28, and are the clock information applied to the data reproduction.

(Step S214)

Then, in step S214, the information processing device 400 acquires the reproduction start position (SPN_STC_Start) and the reproduction start time (presentation_start_time) from the sequence information (SequenceInfo) of the clip information file.

In a case where the reproduction target data is the MMT format data, the reproduction start position information is, for example, the number of bytes from the beginning of the first MMTP packet stored in the stream file (clip AV stream file), and the reproduction start time is the NTP time information. The information is recorded as the sequence information (SequenceInfo) of the clip information file.

(Step S215)

Then, in step S215, the information processing device 400 reads the MMT format data stored in the clip AV stream file in accordance with the recording rate (recording_rate) recorded in the clip information (ClipInfo) of the clip information file.

The recording rate (recording_rate) information is recorded in the clip information (ClipInfo) of the ciip information file as described with reference to FIG. 24, and the MMT format data stored in the clip AV stream file recorded in the information recording medium (medium) is read in accordance with this information.

Further, although TS_recording_rate is described as the recording rate information in FIG. 24, in a case where the reproduction target data is the MMT format having MMT packet, the bit rate corresponding to the MMT format is recorded here.

(Step S216)

Then, in step S216, the information processing device 400 executes the demultiplexing process, the decoding process, and the reproduction process of the MMT format data stored in the clip AV stream file read from the information recording medium (medium).

[10. Configuration Example of Information Processing Device]

Figure 53:
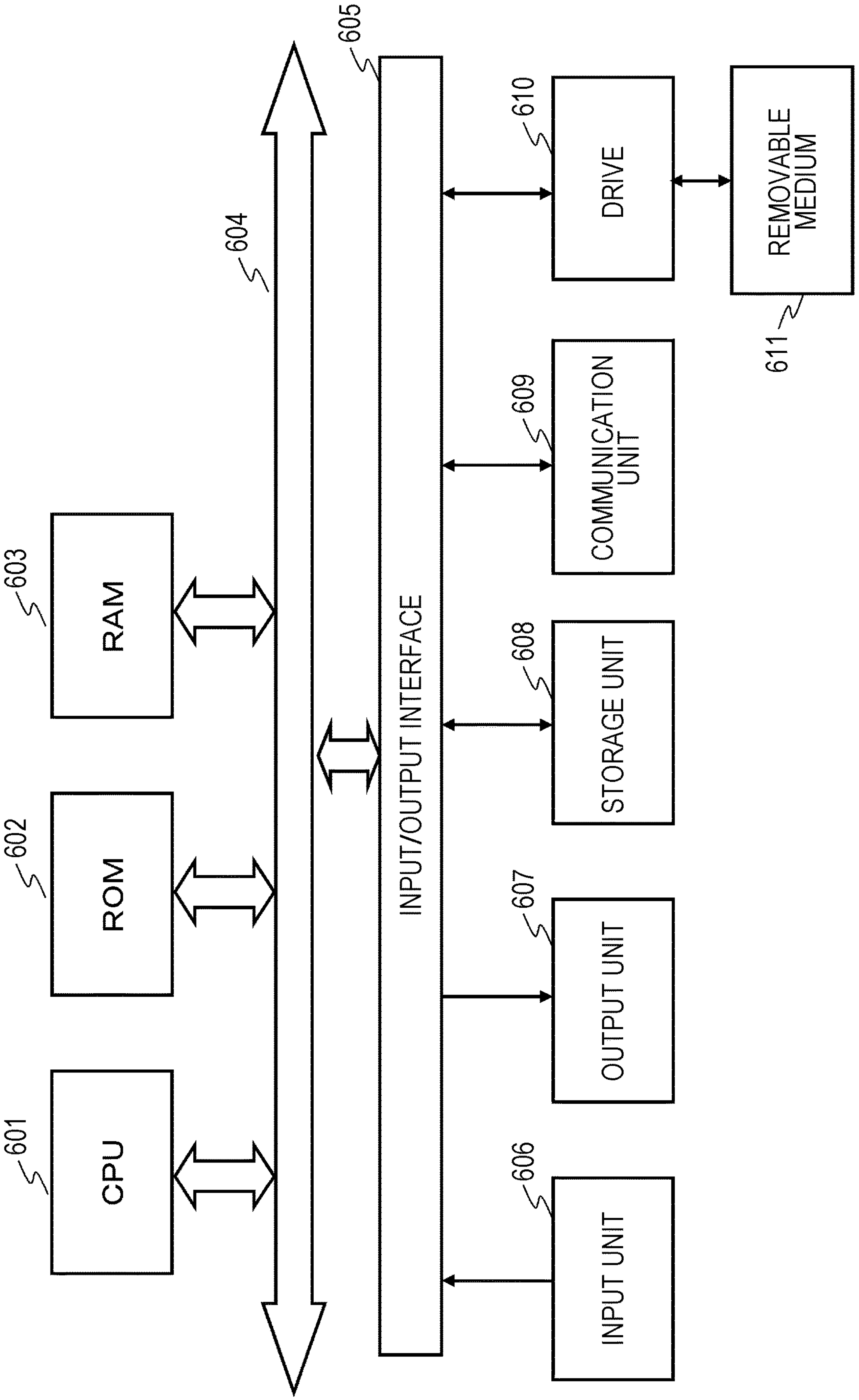
FIG. 53 is a diagram for describing a hardware configuration example of as information processing device applied to the present disclosure process.

Next, a hardware configuration example of an information processing device applicable as the information processing device which executes data recording to an information recording medium and executes data reproduction from an information recording medium will be described with reference to FIG. 53.

A central processing unit (CPU) 601 functions as a data processing unit that executes various kinds of processes in accordance with a program, stored in a read only memory (ROM) 602 or a storage unit 608. For example, the processes according to the sequences described in the above-described embodiment are executed. A random access memory (RAM) 603 stores programs executed by the CPU 601, data, or the like. The CPU 601, the ROM 602, and the RAM 603 are connected to one another via a bus 604.

The CPU 601 is connected to an input/output interface 605 via the bus 604, and an input unit 606 including various kinds of switches, a keyboard, a mouse, a microphone, or the like and an output unit 607 including a display, a speaker, to the like are connected to the input/output interface 605. For example, the CPU 601 executes various kinds of processes in accordance with a command input from the input unit. 606, and outputs a processing result to the output unit 607.

A storage unit 608 connected to the input/output interface 605 includes, for example, a hard disk or the like, and stores programs executed by the CPU 601 and various kinds of data. A communication unit 609 functions as a transceiving unit for data communication via a network such as the Internet or a local area network (LAN) and further a broadcast wave transceiving unit, and performs communication with an external device.

A drive 610 connected to the input/output interface 605 drives a removable medium 611 such as a magnetic disk, an optical disk, a magneto-optical disk, or a semi conductor memory such as a memory card, and executes recording or reading of data.

[11. Conclusion of Configuration of the Present Disclosure]

The embodiment of the present disclosure has been described above in detail with reference to the specific examples. However, it is apparent that those skilled in the art can make modifications or substitutions of the embodiment without departing from the gist of the present disclosure. In other words, the present invention has been disclosed in the form of example and not intended to be interpreted restrictively. In order to determine the gist of the present disclosure, claims set forth below should be taken into consideration.

Further, the technology disclosed in the specification may have the following configurations.

(1) An information processing device, including:

a data processing unit that receives MPEG media transport (MMT) format data and generates record data according to a BDAV format or an SPAV format which is a data recording format for an information recording medium, in which the data processing unit generates an MMT format stream file in which the MMT format data is stored as reproduction data, and further generates an MMT format-compatible reproduction control information file storing reproduction control information of the MMT format stream file.

(2) The information processing device according to (1), in which the data processing unit generates a playlist file and a clip information file as the MMT format-compatible reproduction control information file.

(3) The information processing device according to (2), in which the data processing unit records an identifier indicating a control information file corresponding to the MMT format data in the playlist file and the clip information file generated as the MMT format-compatible reproduction control information file.

(4) The information processing device according to any of (1) to (3), in which the data processing unit acquires or generates record data of the MMT format-compatible reproduction control information file using signaling information received together with the MMT format data.

(5) The information processing device according to any of (1) to (4), in which the data processing unit records network time protocol (NTP) time information received together with the MMT format data as time information recorded in the MMT format-compatible reproduction control information file.

(6) The information processing device according to (5), in which the data processing unit acquires the network time protocol (NTP) time information from an MMT package table (MPT) received together with the MMT format data.

(7) The information processing device according to any of (1) to (6), in which the data processing unit calculates and records byte information from a beginning position of an MMTP packet specified in an MMT format as data position information to be recorded in the MMT format-compatible reproduction control information file.

(8) The information processing device according to any of (1) to (7), in which the data processing unit.

generates a playlist file as the MMT format-compatible reproduction control information file, and records an identifier indicating a type using an MMT format data-compatible EP map as a CPI type identifier to be recorded in the playlist file.

(9) The information processing device according to any of (1) to (8), in which the data processing unit generates a clip information file as the MMT format-compatible reproduction control information file, is configured to generate an EP map including correspondence data of reproduction tame information of a random access point and reproduction position information as record data for the clip information file, uses network time protocol (NTP) time information as the reproduction time information, and generates an EP map in which byte information from a beginning position of an MMTP packet specified in an MMT format is used as the reproduction position information.

(10) An information processing device, including:

a data processing unit that executes a reproduction process of record data of an information recording medium, in which the information recording medium is an information recording medium storing data in which MPEG media transport (MMT) format data is recorded according to a BDAV format or an SPAV format, and the data processing unit executes reproduction control by applying an MMT format-compatible reproduction control information file in which reproduction control information of an MMT format stream file is stored when a data reproduction process using the MMT format stream file storing the MMT format data is performed.

(11) The information processing device according to (10), in which the data processing unit executes the reproduction control by applying a playlist file and a clip information file which are the format-compatible reproduction control information file.

(12) The information processing device according to (10) or (11), in which the data processing unit executes the reproduction control by applying a playlist file and a clip information file in which an identifier indicating a control information file corresponding to the MMT format data is recorded.

(13) The information processing device according to any of (10) to (12), in which the data processing unit executes the reproduction control using network time protocol (NTP) time information recorded in the MMT format-compatible reproduction control information file.

(14) The information processing device according to any of (10) to (13), in which the data processing unit executes the reproduction control using byte information from a beginning position of an MMTP packet specified in an MMT format as data position n formation to be recorded in the MMT format-compatible reproduction control information file.

(15) The information processing device according to any of (10) to (14), in which the data processing unit executes the reproduction control by applying an MMT format-compatible playlist file in which a CPI type identifier indicating a type using an MMT format data-compatible EP map is recorded.

(16) The information processing device according to any of (10) to (15), in which the data processing unit is configured to execute the reproduction control using an MMT format-compatible clip information file which is the MMT format-compatible reproduction control information file, the MMT format-compatible clip information file has a configuration in which an EP map including correspondence data of reproduction time information of a random access point and reproduction position information is recorded, and the EP map is an EP map including correspondence data of network time protocol (NTP) time information and byte information from a beginning position of an MMTP packet specified in an MMT format.

(17) An information processing method executed in an information processing device, the information processing device including a data processing unit that receives MPEG media transport (MMT) format data and generates record data according to a BDAV format or an SPAV format which is a data recording format for an information recording medium, the information processing method including:

generating, by the data processing unit, an MMT format stream file in which the MMT format data is stored as reproduction data, and further generating, by the data processing unit, an MMT format-compatible reproduction control information file storing reproduction control information of the MMT format stream file.

(18) An information processing method executed in an information processing device, the information processing device including a data processing unit that receives MPEG media transport (MMT) format data and generates record data according to a BDAV format or an SPAV format which is a data recording format for an information recording medium, the information processing method including:

generating, by the data processing unit, an MMT format stream file in which the MMT format data is stored as reproduction data, and further generating, by the data processing unit, an MMT format-compatible reproduction control information file storing reproduction control information of the MMT format stream file.

(19) A program causing an information processing to be executed in an information processing device, the information processing device including a data processing unit that receives MPEG media transport (MMT) format data and generates record data according to a BDAV format or an SPAV format which is a data recording format for an information recording medium, the program causing the data processing unit to:

generate an MMT format stream file in which the MMT format data is stored as reproduction data, and further generate an MMT format-compatible reproduction control information file storing reproduction control information of the MMT format stream file.

(20) A program causing an information processing to be executed in an information processing device, the information processing device including a data processing unit that executes a reproduction process of record data of an information recording medium, the information recording medium being an information recording medium storing data in which. MPEG media transport (MMT) format data is recorded according to a BDAV format or an SPAV format, the program causing the data processing unit to:

execute reproduction control by applying an MMT format-compatible reproduction control information file in which reproduction control information of an MMT format stream file is stored when a data reproduction process using the MMT format stream file storing the MMT format data is performed.

Further, a series of processes described in the specification can be executed by hardware, software, or a combined configuration thereof. In a case where a process by software is executed, it is possible to install a program having a process sequence recorded therein in a memory in a computer incorporated into dedicated hardware and execute the program or install the program in a general-purpose computer which can execute various kinds of processes and execute the program. For example, the program can be recorded in the recording medium in advance. Instead of installing the program from the recording medium to computer, it is possible to receive the program via a network such as a LAN, the Internet, or the like and install the program in a recording medium such as an internal hard disk.

Further, various kinds of processes described in the specification are not only executed chronologically in accordance with the description but also may be executed in parallel or individually depending on a processing capability of a device which executes the process or in accordance with necessity. Further, in this specification, a system refers to a logical aggregate configuration of a plurality of devices and not limited to one in which devices of respective components are within a single housing.

INDUSTRIAL APPLICABILITY

As described above, according to the configuration of one embodiment of the present disclosure, a configuration capable of recording MMT format data in a medium as BDAV or SPAV format data and enabling the MMT format data to be reproduced is realized.

Specifically, MMT format data input via a broadcast wave or the like is input, and record data according to a BDAV format or an SPAV format is generated. A data processing unit generates an MMT format stream file storing the MMT format data as reproduction data and further generates a playlist file storing reproduction control information of the MMT format stream file and a clip information file.

With the present configuration, a configuration capable of recording MMT format data in a medium as BDAV or SPAV format data and enabling the MMT format data to be reproduced is realized.

REFERENCE SIGNS LIST

20 Transmitting device
21 Broadcasting server
22 Data delivery server
30 Information processing device
31 BD player
32 TV
33 PC
34 Mobile terminal
40 Information recording medium (medium)
41 BD
42 HDD
43 Flash memory

300 Information processing device
301 Data input unit
302 User input unit
303 Control unit
304 Storage unit
305 Demultiplexer
306 Record data generating unit
307 Recording unit
308 Drive
311 Subtitle data generating unit
312 Video data generating unit
313 Audio data generating unit
314 Auxiliary information generating unit
315 Multiplexer
316 Database file generating unit
320 Information recording medium
400 Information processing device
401 Control unit
402 User input unit
403 Drive
404 Recording/reproducing unit
405 Storage unit
406 Reproduction processing unit
407 Input/output I/F
411 Demultiplexer
412 Subtitle data generating unit
413 Video data generating unit
414 Audio data generating unit
415 Auxiliary information generating unit
416 Output data generating unit
510 information recording medium.
520 Output device (display unit+speaker)
601 CPU
602 ROM
603 RAM
604 Bus
605 Input/output interface
606 input unit
607 Output unit
608 Storage unit
609 Communication unit
610 Drive
611 Removable medium

The invention claimed is:

1. An information processing device, comprising:
a data processing unit configured to
receive MPEG media transport (MMT) format data and generate record data according to a BDAV format or an SPAV format which is a data recording format for an information recording medium,
generate an MMT format stream file in which the MMT format data is stored as reproduction data,
generate an MMT format-compatible reproduction control information file storing reproduction control information of the MMT format stream file, and
record an identifier indicating a control information file corresponding to the MMT format data in the MMT format-compatible reproduction control information file,
wherein the data processing unit is implemented via at least one processor.

2. The information processing device according to claim 1, wherein the data processing unit is further configured to generate a playlist file and a clip information file as the MMT format-compatible reproduction control information file.

3. The information processing device according to claim 2, wherein the data processing unit is further configured to record the identifier indicating the control information file corresponding to the MMT format data in the playlist file and the clip information file generated as the MMT format-compatible reproduction control information file.

4. The information processing device according to claim 1, wherein the data processing unit is further configured to acquire or generate record data of the MMT format-compatible reproduction control information file using signaling information received together with the MMT format data.

5. The information processing device according to claim 1, wherein the data processing unit is further configured to record network time protocol (NTP) time information received together with the MMT format data as time information recorded in the MMT format-compatible reproduction control information file.

6. The information processing device according to claim 5, wherein the data processing unit is further configured to acquire the NTP time information from an MMT package table (MPT) received together with the MMT format data.

7. The information processing device according to claim 1, wherein the data processing unit is further configured to calculate and record byte information from a beginning position of an MMT protocol (MMTP) packet specified in an MMT format as data position information to be recorded in the MMT format-compatible reproduction control information file.

8. The information processing device according to claim 1, wherein the data processing unit is further configured to
generate a playlist file as the MMT format-compatible reproduction control information file, and
record an identifier indicating a type using an MMT format data-compatible entry point (EP) map as a Characteristic point information (CPI) type identifier to be recorded in the playlist file.

9. The information processing device according to claim 1, wherein the data processing unit is further configured to
generate a clip information file as the MMT format-compatible reproduction control information file,
generate an entry point (EP) map including correspondence data of reproduction time information of a random access point and reproduction position information as record data for the clip information file,
use network time protocol (NTP) time information as the reproduction time information, and
generate an entry point (EP) map in which byte information from a beginning position of an MMT protocol (MMTP) packet specified in an MMT format is used as the reproduction position information.

10. An information processing device, comprising:
a data processing unit configured to execute a reproduction process of record data of an information recording medium,
wherein the information recording medium is an information recording medium storing data in which MPEG media transport (MMT) format data is recorded according to a BDAV format or an SPAV format,
the data processing unit is further configured to
execute reproduction control by applying an MMT format-compatible reproduction control information file in which reproduction control information of an MMT format stream file is stored when a data reproduction process using the MMT format stream file storing the MMT format data is performed, and
execute the reproduction control by applying the MMT format-compatible reproduction control information file in which an identifier indicating a control information file corresponding to the MMT format data is recorded, and the data processing unit is implemented via at least one processor.

11. The information processing device according to claim 10, wherein the data processing unit is further configured to execute the reproduction control by applying a playlist file and a clip information file which are the MMT format-compatible reproduction control information file.

12. The information processing device according to claim 10, wherein the data processing unit is further configured to execute the reproduction control by applying a playlist file and a clip information file in which the identifier indicating the control information file corresponding to the MMT format data is recorded.

13. The information processing device according to claim 10, wherein the data processing unit is further configured to execute the reproduction control using network time protocol (NTP) time information recorded in the MMT format-compatible reproduction control information file.

14. The information processing device according to claim 10, wherein the data processing unit is further configured to execute the reproduction control using byte information from a beginning position of an MMT protocol (MMTP) packet specified in an MMT format as data position information to be recorded in the MMT format-compatible reproduction control information file.

15. The information processing device according to claim 10, wherein the data processing unit is further configured to execute the reproduction control by applying an MMT format-compatible playlist file in which a Characteristic point information (CPI) type identifier indicating a type using an MMT format data-compatible entry point (EP) map is recorded.

16. The information processing device according to claim 10, wherein the data processing unit is further configured to execute the reproduction control using an MMT format-compatible clip information file which is the MMT format-compatible reproduction control information file, the MMT format-compatible clip information file has a configuration in which an entry point (EP) map including correspondence data of reproduction time information of a random access point and reproduction position information is recorded, and the EP map is an EP map including correspondence data of network time protocol (NTP) time information and byte information from a beginning position of an MMT protocol (MMTP) packet specified in an MMT format.

17. An information processing method executed in an information processing device, the method comprising:

receiving MPEG media transport (MMT) format data and generating record data according to a BDAV format or an SPAV format which is a data recording format for an information recording medium;

generating an MMT format stream file in which the MMT format data is stored as reproduction data;

generating an MMT format-compatible reproduction control information file storing reproduction control information of the MMT format stream file; and recording an identifier indicating a control information file corresponding to the MMT format data in the MMT format-compatible reproduction control information file.

18. An information processing method executed in an information processing device, the method comprising:

executing a reproduction process of record data of an information recording medium, wherein the information recording medium stores MPEG media transport (MMT) format data recorded according to a BDAV format or an SPAV format;

executing reproduction control by applying an MMT format-compatible reproduction control information file in which reproduction control information of an MMT format stream file is stored when a data reproduction process using the MMT format stream file storing the MMT format data is performed; and executing the reproduction control by applying the MMT format-compatible reproduction control information file in which an identifier indicating a control information file corresponding to the MMT format data is recorded.

19. A non-transitory computer-readable medium having embodied thereon a program, which when executed by a computer causes the computer to execute an information processing method, the method comprising:

receiving MPEG media transport (MMT) format data and generating record data according to a BDAV format or an SPAV format which is a data recording format for an information recording medium;

generating an MMT format stream file in which the MMT format data is stored as reproduction data;

generating an MMT format-compatible reproduction control information file storing reproduction control information of the MMT format stream file; and recording an identifier indicating a control information file corresponding to the MMT format data in the MMT format-compatible reproduction control information file.

20. A non-transitory computer-readable medium having embodied thereon a program, which when executed by a computer causes the computer to execute an information processing method, the method comprising:

executing a reproduction process of record data of an information recording medium, wherein the information recording medium stores data in which MPEG media transport (MMT) format data is recorded according to a BDAV format or an SPAV format;

executing reproduction control by applying an MMT format-compatible reproduction control information file in which reproduction control information of an MMT format stream file is stored when a data reproduction process using the MMT format stream file storing the MMT format data is performed; and executing the reproduction control by applying the MMT format-compatible reproduction control information file in which an identifier indicating a control information file corresponding to the MMT format data is recorded.

* * * * *